US007897045B2

(12) United States Patent
Nguyen

(10) Patent No.: US 7,897,045 B2
(45) Date of Patent: Mar. 1, 2011

(54) SHIP-SIDE BALLAST WATER TREATMENT SYSTEMS INCLUDING RELATED APPARATUS AND METHODS

(75) Inventor: Hap Nguyen, Westminster, CA (US)

(73) Assignee: MARENCO Technology Group, Inc., Costa Mesa, CA (US)

(*) Notice: Subject to any disclaimer, the term of this patent is extended or adjusted under 35 U.S.C. 154(b) by 165 days.

(21) Appl. No.: 12/080,246

(22) Filed: Mar. 31, 2008

(65) Prior Publication Data

US 2008/0283467 A1 Nov. 20, 2008

Related U.S. Application Data

(63) Continuation-in-part of application No. 11/046,554, filed on Jan. 29, 2005, now Pat. No. 7,351,336, which is a continuation of application No. 10/610,328, filed on Jun. 28, 2003, now Pat. No. 7,005,074.

(60) Provisional application No. 60/392,388, filed on Jun. 29, 2002.

(51) Int. Cl.
*B63B 13/00* (2006.01)
*C02F 1/32* (2006.01)

(52) U.S. Cl. ............... 210/205; 210/242.1; 210/261; 210/931

(58) Field of Classification Search ............ 210/748.11, 210/198.1, 205, 242.1, 251, 259, 348, 931; 210/262, 483, 488, 499; 141/121, 125, 382; 250/432 R, 436; 422/24, 186.3
See application file for complete search history.

(56) References Cited

U.S. PATENT DOCUMENTS

| | | | | |
|---|---|---|---|---|
| 2,568,085 A | * | 9/1951 | Naugle | 210/333.01 |
| 3,182,193 A | * | 5/1965 | Marx et al. | 250/430 |
| 4,394,265 A | * | 7/1983 | van Drimmelen et al. | 210/242.3 |
| 4,471,225 A | * | 9/1984 | Hillman | 250/436 |
| 4,525,277 A | * | 6/1985 | Poulin | 210/601 |
| 5,106,495 A | | 4/1992 | Hughes | |

(Continued)

FOREIGN PATENT DOCUMENTS

CA 2 341 089 7/2001

(Continued)

OTHER PUBLICATIONS

Darren Oemcke, The Treatment of Ships' Ballast Water, EcoPorts Monograph, Mar. 1999, 92pp, Series No. 18, Ports Corp. Queensland, Australia.

(Continued)

*Primary Examiner*—Frank M Lawrence
(74) *Attorney, Agent, or Firm*—DB Technical Consulting; Donald Bollella

(57) ABSTRACT

Ballast water treatment apparatus and methods for preventing foreign aquatic invasive species form entering marine ecological zones by translocation in ship's ballast water. The apparatus includes a housing, a filter member, and UV water treatment chambers. Methods include use of a ship's fire hydrant system or ballast water discharge port for moving ballast water from the ship's ballast tanks into the apparatus for filtration and treatment. In-port service vessels and barges as well as dock-side service vehicles are equipped with the various treatment and filtration apparatus to provided in-port or dock-side ballast water treatment services. Related methods are also provided.

40 Claims, 35 Drawing Sheets

U.S. PATENT DOCUMENTS

| | | | | |
|---|---|---|---|---|
| 5,266,280 A | * | 11/1993 | Hallett | 422/186.3 |
| 5,427,693 A | * | 6/1995 | Mausgrover et al. | 210/739 |
| 5,578,116 A | * | 11/1996 | Chang | 96/194 |
| 5,616,172 A | * | 4/1997 | Tuckerman et al. | 96/16 |
| 5,942,110 A | * | 8/1999 | Norris | 210/198.1 |
| 5,979,012 A | | 11/1999 | Fritz | |
| 6,080,313 A | * | 6/2000 | Kelada | 210/631 |
| 6,120,691 A | * | 9/2000 | Mancil | 210/748.11 |
| 6,171,508 B1 | * | 1/2001 | Browning, Jr. | 210/750 |
| 6,402,965 B1 | | 6/2002 | Sullivan et al. | |
| 6,423,215 B1 | * | 7/2002 | Stein | 210/131 |
| 6,432,304 B1 | | 8/2002 | Nguyen | |
| 6,464,884 B1 | * | 10/2002 | Gadgil | 210/748.11 |
| 6,613,232 B2 | * | 9/2003 | Chesner et al. | 210/650 |
| 6,773,611 B2 | * | 8/2004 | Perlich et al. | 210/758 |
| 7,005,074 B2 | * | 2/2006 | Nguyen et al. | 210/748.11 |
| 7,025,889 B2 | * | 4/2006 | Brodie | 210/748.11 |
| 7,351,336 B2 | * | 4/2008 | Nguyen et al. | 210/205 |
| 2004/0026336 A1 | * | 2/2004 | Yuri et al. | 210/748 |
| 2005/0167369 A1 | * | 8/2005 | Robinson et al. | 210/760 |

FOREIGN PATENT DOCUMENTS

| | | |
|---|---|---|
| DE | 296 03 926 U1 | 9/1996 |
| GB | 1 495 016 | 12/1977 |
| WO | WO 01/30706 A1 | 5/2001 |

OTHER PUBLICATIONS

Glosten-Herbert, Full-Scale Design Studies of Ballast Water Treatment Systems, Apr. 2002, 45pp, Northeast-Midwest Institute, Washington, DC.

* cited by examiner

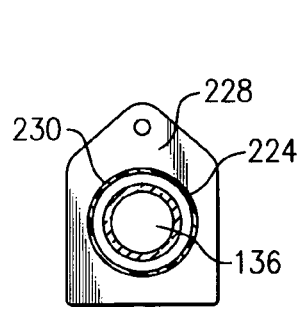
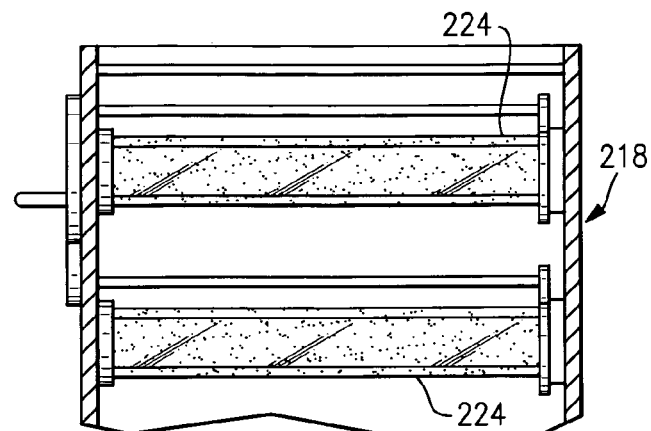
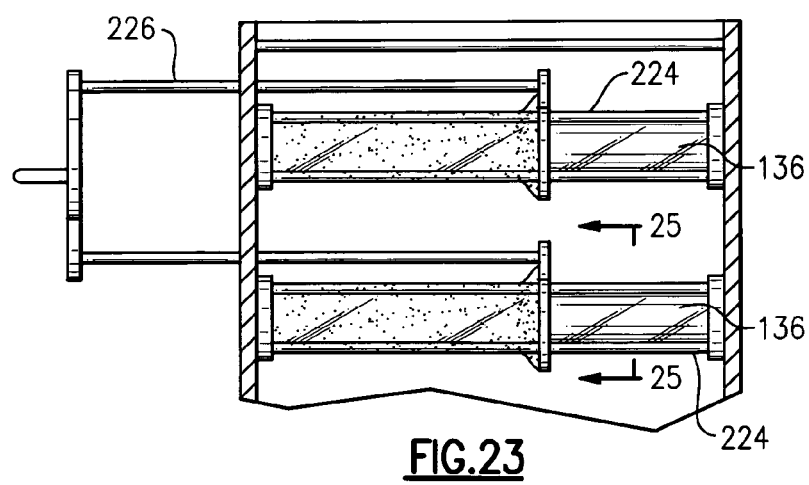
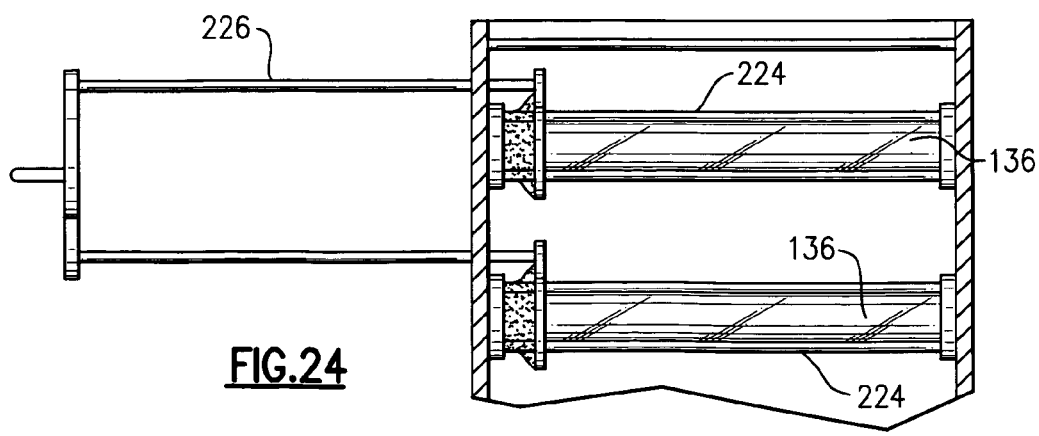

SHIP-SIDE BALLAST WATER TREATMENT SYSTEMS INCLUDING RELATED APPARATUS AND METHODS

CROSS-REFERENCE TO RELATED APPLICATIONS

The present application is a continuation-in-part of U.S. patent application Ser. No. 11/046,554 filed Jan. 29, 2005, now U.S. Pat. No. 7,351,336, which is a continuation of U.S. patent application Ser. No. 10/610,328 filed Jun. 28, 2003, now U.S. Pat. No. 7,005,074, which claimed the benefit of priority from U.S. Provisional Application Ser. No. 60/392,388 filed Jun. 29, 2002. This application also includes subject matter from U.S. Provisional Application Ser. No. 60/840,529 filed Aug. 26, 2006. All of the above disclosures are herein incorporated by reference in their entirety.

BACKGROUND OF THE INVENTION

1. Field of the Invention

This invention relates in general to water treatment and, in particular, to ballast water treatment for ships. More specifically, but without restriction to the particular embodiments hereinafter described in accordance with the best mode of practice, this invention relates to in-port water treatment systems directed to filtering ballast water and deactivating biological material to prevent translocation of aquatic invasive species.

2. General Discussion and Related Art

Over the past 25 years, the introduction of foreign aquatic invasive species (AIS) into ports and waterways has increased significantly throughout the globe. Ships from around the world pump 40,000 gallons of foreign ballast water into U.S. waterways every minute.

This discharged ballast water contains countless species of foreign marine life including fish, shellfish, plants, and microorganisms. More than 200 AIS are now established in the San Francisco Bay and Delta areas in California and 150 AIS in the Great Lakes of North America alone.

Many of these foreign AIS are disrupting the local marine ecosystems. Invading organisms are steadily replacing native species by competition or predation. Viruses and bacteria carried in ships ballast water have the potential to cause the destruction of native species as well as create human health problems.

The Zebra Mussel, Chinese Mitten Crab, Sea Lamprey, and Purple Loosestrife are just some of the AIS causing serious and costly problems globally by clogging canals and water intake and/or outlet systems. Billions of dollars have been spent on problems arising from these organisms. The primary source comes from the discharge of ships' ballast water, taken in as ballast in one port then discharged into another port.

Globally, there are seven major marine ecological zones, each having distinct marine species which have evolved in those zones over many millennia. In recent years, however, there has been significant displacement of indigenous species from one zone to other zones around the globe. Today, no country has escaped from the widespread impact of aquatic invasive species arriving from other marine environments. In many instances, these translocated species have prospered in their newly found environment with damaging economic and ecological consequences. According to recent studies conducted by marine scientists, the most significant contributing factor for these undesired re-locations is the discharge of ballast water contained in vessels of commerce. Typically, an ocean going vessel takes sea water into its ballast tanks prior to departing its port of origin to stabilize the vessel during its voyage. This ballast water from the home port may then be discharged at ports of call in other ecological locations. Currently at least 162 non-indigenous aquatic species have colonized the Great Lakes alone. Thus far, the economically most significant aquatic invader to arrive in the Great Lakes system is the zebra mussel. A 1988 import from the Black Sea, the zebra mussel has become an economic and ecological disaster in this region. In addition to ecologically contaminating the Great Lakes, the zebra mussel is now spreading rapidly to other waters within the United States in spite of massive efforts and methodology deployed to control this invasive species. For all foreign aquatic species invading United States waters, the U.S. Coast Guard estimates the collective domestic economic impact of these undesired AIS arrivals at more than $7.3 billion per year.

The world's nations and different states of the United States are responding to this threat by promoting treaties and state legislation directed to setting standards for halting the spread of aquatic invasive species. On the international front, the International Maritime Organization (IMO) is developing an IMO Convention relating to ballast water management requirements. This Convention is expected to be signed within a few years then ratified by national legislative bodies and entered into force as domestic law in several of the world's nations. It is currently anticipated that after the year 2008, all international trading vessels using seawater as ships ballast will fall under the IMO Convention. Royal Haskoning Report, *Global Market Analysis of Ballast Water Treatment Technology*, Oct. 24, 2001, Reference No. 42810/001R/HSC/SKO.

On the U.S. domestic front, the states of Washington and California are leading state legislative development efforts directed to regulating the discharge of ballast water into their respective state ports. These regulations are technical in nature and will provide specific standards relative to the discharge of particulate matter and active biological organisms.

Prior to current state legislative activities and collective international concern, the shipping industry had shown an acceptable degree of compliance to pre-existing standards. However AIS are still being introduced into the world's ports and waterways. Thus prior standards and technical measures implemented over the past years have proven inadequate. Currently, no known economically viable system has been found to prevent these organisms from entering or leaving ships' ballast water tanks.

Some of the prior methods and devices that have been employed in an attempt to control the AIS problem include (1) the mid-ocean ballast water exchange method, (2) ozone and nitrogen systems, (3) cyclone systems, (4) heat systems, and (5) use of biocides. These prior methods and systems are briefly described in further detail immediately herein below.

Mid-ocean Ballast Water Exchange: The U.S. Congress has passed legislation requiring ships carrying ballast water from foreign ports to exchange this point-of-origin ballast water with mid-ocean sea water before entering the Great Lakes. This method has not proven effective in killing freshwater organisms. Very small quantities of survivors, one per several thousand, were found sufficient to start an invasion.

Ozone and Nitrogen Systems: These gases, when introduced to the ship's ballast water, were found to be effective in controlling bacteria and other small organisms. However, they have proven to be less effective at controlling adult crustaceans and fish. Other disadvantages of these systems include those next enumerated. (1) Problems of uniformity in mixing the gases with the ballast water. Several days are required to kill the organisms. Ballast water exchange sometimes takes place within several hours. (2) Unable to treat the organisms in the sediments which are disturbed during ballasting. (3) Requires modification to the ship and significant space on board for system installation. (4) High cost.

Cyclone Systems: Water drawn into the system for ballasting is spun to remove organisms. The filtered water is allowed to flow into the ballast tanks and the removed organisms and unfiltered water returned to its source. These types of systems are capable of removing sediments, large particles, and some organisms. The disadvantages of these systems include the following. (1) Centrifugation does not work effectively with organisms that have densities close to that of water. (2) The system is prone to clogging and must be back flushed to clean. (3) An inability to treat or remove organisms that passed through the system. Once in the ballast tanks, these organisms may continue to grow and multiply. (4) Requires modification to the ship and significant space on board for system installation. (5) High cost.

Heat Systems: Heat energy high enough to kill organisms is added to the ballast water. Disadvantages of these systems are next briefly listed. (1) Huge quantity of energy is required to raise the temperature high enough to kill organisms. The energy required to kill bacteria and viruses make this system impractical for ballast water treatment. (2) Problems of uniformity in mixing the heated water with the ballast water, requiring many hours to kill the organisms. Ballast water exchange may have to take place within several hours. (3) Enough energy to run the system may not be available from the ship's power system. (4) High cost to install and operate.

Use of Biocides: Biocides such as vitamin K and chlorine are effective at killing AIS when added to the ballast water. Disadvantages of these systems include the following. (1) Problems of uniformity in mixing the biocide with the ballast water, requiring many hours to kill the organisms. Ballast water exchange may have to take place within several hours. (2) Some bacteria and viruses may not be killed by the biocides used. (3) Treated ballast water may be toxic to the environment when discharged.

In addition to the above technical limitations and cost considerations, none of the known prior art ballast water treatment systems will meet the newly emerging regulatory standards. Therefore it is desired to provide a cost effective, technically efficient ballast water treatment system that is acceptable by the marine shipping industry and that satisfies the emerging more stringent regulatory standards.

SUMMARY OF THE INVENTION

It is, therefore, an object of the present invention to improve ballast water treatment systems in a cost effective and technically efficient manner that also meets the anticipated future standards of currently developing legislative mandates.

Another object of this invention is to reduce the negative impact aquatic invasive species have on the marine environment.

It is a further object of the present invention to apply filtering methods to ballast water to aid in the removal of aquatic invasive species from ballast water before the ballast water is returned to the marine environment.

Still another object of the present invention is to apply UV treatment methods to ballast water to aid in the elimination of aquatic invasive species from ballast water before the ballast water is returned to the marine environment.

It is still a further object of the present invention to utilize the existing fire hydrant systems on board ship as the pumping system for ballast water transfer to treatment apparatus to thereby avoid the need for additional on-board pumping equipment for ballast water treatment purposes.

Yet another object of the present invention is to utilize the existing ballast water discharge systems on board ship as the pumping system for ballast water transfer to treatment apparatus to thereby avoid the need for additional on-board pumping equipment for ballast water treatment purposes.

An additional object of the present invention is to enable the use of portable on ship ballast water filter systems with ballast water supplied from the ship's fire hydrant system.

Still yet another object of this invention is to shift the burden of ballast water filtration operations from the ship owner to an in-port service provider with local knowledge.

Yet a further object of the present invention is to enable the use of dock-side ballast water filter systems with ballast water supplied from the ship's fire hydrant system.

It is yet an additional and further object of the present invention to enable the use of ballast water filter systems on in-port service vessels that utilize ballast water supplied from the ship's fire hydrant system.

Still another object of the present invention is to enable the use of dock-side ballast water filter systems with ballast water supplied from the ship's existing ballast water discharge system.

And yet still a further object of the present invention is to enable the use of ballast water filter systems on in-port service barges that utilize ballast water supplied from the ship's existing ballast water discharge system.

These and many other objects and advantages are attained in accordance with the present invention wherein there is provided a dock-side service vehicle for treating discharged ballast water from a ship in port. In one embodiment, this vehicle includes (1) a water treatment processing platform accessible to a respective ship docked in port; (2) a housing tank positioned within said water treatment processing platform, said housing tank having at least one inlet port and one discharge port, said at least one inlet port being adapted to receive ballast water from a ballast discharge port of said respective ship by connecting a hose between the ballast discharge port on said respective ship and said at least one inlet port of said housing tank; (3) a filter positioned within said housing tank, said filter employed to filter particulate matter from said ballast water received from said respective ship's ballast discharge port; and (4) a source of electromagnetic radiation maintained within said housing tank for irradiating said ballast water to thereby deactivate biological organisms contained therein.

According to another aspect of this invention, there is provided a method of treating discharged ballast water from a ship using an in-port service barge. In one particular embodiment this method includes the steps of providing a ballast water treatment apparatus on board said service barge; positioning said service barge adjacent a respective ship requiring ballast water treatment; and directing ballast water from a ballast tank of said respective ship into said ballast water treatment apparatus on board said service barge to thereby treat said respective ship's ballast water before discharging said ship's ballast water.

This invention is further directed to an in-port service barge for treating discharged ballast water from a ship. In one preferred embodiment the barge includes (1) a ballast water treatment apparatus on board said service barge, said apparatus including an inlet port, a discharge port, means for filtering ballast water, and means for directing UV energy at said ballast water; (2) a hoisting system for positioning a supply hose between a ballast water discharge port of the ship and said inlet port of said ballast water treatment apparatus.

According to yet another aspect of this invention, there is further provided a dock-side service vehicle for treating discharged ballast water from a ship in port. This vehicle may advantageously include (1) a water treatment processing platform accessible to a respective ship docked in port; (2) a housing tank positioned within said water treatment processing platform, said housing tank having at least one inlet port and one discharge port, said at least one inlet port being adapted to receive ballast water from a ballast discharge port of said respective ship by connecting a hose between the ballast discharge port on said respective ship and said at least one inlet port of said housing tank; (3) a filter positioned within said housing tank, said filter employed to filter particulate matter from said ballast water received from said respective ship's ballast discharge port; (4) a source of electromagnetic radiation maintained within said housing tank for irradiating said ballast water to thereby deactivate biological organisms contained therein; and (5) an articulating arm for positioning said hose a hose between the ballast discharge port on said respective ship and said at least one inlet port of said housing tank.

In accordance with yet a further aspect hereof, there is also provided a ballast water filtration and treatment system. In one preferred embodiment thereof, this system may include (1) an inlet reservoir having an inlet port; (2) a main tank member fluidly connected to said inlet reservoir, said main tank member having filter means positioned in an upper portion thereof; (3) a side channel tank in fluid communication with said main tank member; (4) a side fill tank in fluid communication with said side channel tank; and (5) a UV containment chamber in fluid communication with said side fill tank, said UV containment chamber including a source of UV light directed into filtered ballast water contained in the chamber.

According to still an addition aspect hereof, there is further provided a ballast water filtration and treatment system alternatively including (1) an upper flow chamber for receiving ballast water and including a plurality of filter bag compartments, each filter bag compartment including valve means to fluidly isolate a respective filter bag compartment from ballast water maintained with in said upper flow chamber; (2) a filter bag associated with each of said of filter bag compartments; (3) a lower tank chamber in fluid communication with said upper flow chamber, each of said filter bags depending downwardly from a respective filter bag compartment into said lower tank chamber; and (4) at least one UV tank fluidly connected to said lower tank chamber implemented so that ballast water filtered through said filter bags is directed into said least one UV tank for further treatment. In this system, said at least one UV tank fluidly may be positioned below said lower tank chamber so that filtered ballast in said lower tank chamber is moved by gravity to flow from said lower tank chamber into said at least one UV tank. Alternatively, the system may include a pump to move filtered ballast in said lower tank chamber into said at least one UV tank.

In accordance with a further aspect hereof, this invention is direct to an apparatus for connecting a hose to a ballast water discharge port located in the hull of a ship. The apparatus may advantageously include a ring member sized to mate with the ballast water discharge port in the ship; at least two hook arms positioned around the circumference of said ring member; and means for making a water-tight seal between said ring member and the hull of the ship. In an alternative embodiment thereof, the apparatus a ring member including a nipple extension sized to mate with the ballast water discharge port in the ship; and means for making a water-tight seal between said ring member and the hull of the ship. In this embodiment the ring member of the apparatus may include at least one electro-magnet associated therewith so that when said electro-magnet is activated a magnetic holding force is applied between said ring member and the hull of the ship.

According to still yet another aspect hereof, there is further provided a method of retro-fitting a ballast water discharge port located in the hull of a ship to receive a hose connection. One embodiment of this method includes the steps of obtaining measurements relating to the size of a respective ballast water discharge port; providing a flat annular ring sized to fit said respective ballast water discharge port; welding said flat annular ring into said respective ballast water discharge port to thereby form a lip onto which a hose connector may be secured.

Still according to yet additional aspects of this invention there is provided a UV tank system for use in treating ballast water. This tank system may advantageously include a tank member having an inlet port and a discharge port; at least one UV lamp positioned within said tank member between said inlet port and discharge port; and an electronic circuit operatively connected to said at least one UV lamp to control operation thereof. The electronic circuit may further include a processor, a controller, and a memory. And the tank system may further include means for wiping clean said at least one UV lamp after a predetermined amount of use.

Other aspects of the present invention are further directed to a portable deck apparatus for treating ballast water discharged from the fire hydrant system of a ship. Different embodiments of the apparatus are provided.

According to another aspect of the present invention, there is provided a method of distributing portable water treatment devices around the deck of a ship to process ballast water discharged from the fire hydrant system of the ship.

In accordance with another aspect of this invention, there is also provided a built-in water treatment assembly for processing ballast water discharged from the fire hydrant system of a ship. This assembly is manufactured and installed during the ship building process rather than adapted as a retro-fit device or intended for use on pre-existing ships. There also provided methods related to this built-in water treatment aspects of the present invention.

According to yet another aspect of the present invention there is further provided a marine service vessel for treating discharged ballast water from a ship. Related methods include a method of treating discharged ballast water from a ship using the in-port marine service vessel and methods of deriving financial revenue for services provided for treating discharged ballast water from a ship using the in-port service vessel of the present invention.

In accordance with still yet another aspect of this invention, the inventors hereof have also provided a dock-side service vehicle for treating discharged ballast water from a ship in port. Related methods include a method of treating discharged ballast water from a ship using the dock-side service vehicle and methods of deriving financial revenue for services provided for treating discharged ballast water from a ship using the dock-side service vehicle as out-fitted according to the teachings of the present disclosure.

In addition to the above, the present invention further provides methods for processing, filtering, or treating ballast water discharged from a ship, and related methods directed to using the fire hydrant system of a ship to process, filter, or treat ballast water before directing the ballast water into an open water environment to thereby protect the environment form undesired aquatic invasive species.

More particularly, the present invention is directed to a portable deck apparatus for treating ballast water discharged from the fire hydrant system of a ship. This apparatus includes (1) a housing having at least one inlet port and one discharge port, the at least one inlet port being adapted to receive ballast water from the fire hydrant system of a ship, (2) a filter positioned within the housing, the filter employed to filter particulate matter from the ballast water received from the fire hydrant system, and (3) a source of electromagnetic radiation maintained within the housing for irradiating the ballast water to thereby deactivate biological organisms contained therein.

According to another aspect of the present invention there is provided a method of distributing portable water treatment devices around the deck of a ship to process ballast water discharged from the fire hydrant system of the ship, each of the water treatment devices having a known processing rate. This method includes the steps of (1) determining the number and location of fire hydrant outlets on the deck of a ship, (2) ascertaining the flow rate of each of the located fire hydrant outlets, (3) determining an amount of the ship's ballast water requiring treatment, (4) setting a maximum duration of time during which the determined amount of ballast water requiring treatment is to be processed, (5) determining the number of water treatment devices necessary to process the determined amount of ballast water within the maximum duration of time, and (6) distributing the determined number of water treatment devices around the deck of the ship proximate selected fire hydrant outlets to direct ballast water from the fire hydrant outlets into respective water treatment devices for processing.

In accordance with yet another aspect of the present invention, there is further provided a marine service vessel for treating discharged ballast water from a ship. This vessel includes a water treatment processing area accessible to a respective ship docked in port; a housing tank positioned within the water treatment processing area, the housing tank having at least one inlet port and one discharge port, the at least one inlet port being adapted to receive ballast water from the fire hydrant system of the respective ship by connecting a fire hose between a fire hydrant on the respective ship and the at least one inlet port of the housing tank; a filter positioned within the housing tank, the filter employed to filter particulate matter from the ballast water received from the respective ship's fire hydrant system; and a source of electromagnetic radiation maintained within the housing tank for irradiating the ballast water to thereby deactivate biological organisms contained therein.

According to certain methods of the present invention associated with the service vessel aspect thereof, there is further provided a method of treating discharged ballast water from a ship using an in-port service vessel. This method includes the steps of (1) providing a ballast water treatment apparatus on board the service vessel, (2) positioning the service vessel adjacent a respective ship requiring ballast water treatment, (3) and directing ballast water from a ballast tank of the respective ship into the ballast water treatment apparatus on board the service vessel to thereby treat the respective ship's ballast water before discharging the ship's ballast water. In this method, the respective ship's ballast water is directed from the ballast tank through the ship's fire hydrant system and into the ballast water treatment apparatus on board the service vessel. The method may include the further step of connecting at least one fire hose between a fire hydrant outlet on a deck of the respective ship and an inlet port provided on the ballast water treatment apparatus on board the service vessel.

According to the business method aspects of the present invention, there is provided a method of deriving financial revenue for services provided for treating discharged ballast water from a ship using an in-port service vessel. This method includes the steps of positioning the service vessel adjacent a respective ship requiring ballast water treatment; directing ballast water from a ballast tank of a respective ship into a ballast water treatment apparatus maintained on board the service vessel to thereby treat the respective ship's ballast water before discharging the ship's ballast water into the environment; determining an amount of time required to treat the respective ship's ballast water; and calculating a water treatment service fee based on the amount of time required to treat the respective ship's ballast water.

In accordance with yet another aspect of the present invention, there is further provided another method of deriving financial revenue for services provided for treating discharged ballast water from a ship using an in-port service vessel. This method includes the steps of positioning the service vessel adjacent a respective ship requiring ballast water treatment; directing ballast water from a ballast tank of a respective ship into a ballast water treatment apparatus maintained on board the service vessel to thereby treat the respective ship's ballast water before discharging the ship's ballast water into the environment; determining a total volume of treated ballast water processed from the respective ship's ballast water tanks; and calculating a water treatment service fee based on the total volume of treated ballast water.

According to still yet another aspect of the present invention, there is also provided a dock-side service vehicle for treating discharged ballast water from a ship in port. This vehicle may advantageously include a water treatment processing platform accessible to a respective ship docked in port; a housing tank positioned within the water treatment processing platform, the housing tank having at least one inlet port and one discharge port, the at least one inlet port being adapted to receive ballast water from the fire hydrant system of the respective ship by connecting a fire hose between a fire hydrant on the respective ship and the at least one inlet port of the housing tank; a filter positioned within the housing tank, the filter employed to filter particulate matter from the ballast water received from the respective ship's fire hydrant system; and a source of electromagnetic radiation maintained within the housing tank for irradiating the ballast water to thereby deactivate biological organisms contained therein.

A method of treating discharged ballast water from a ship using a dock-side service vehicle is also provided. This method includes the steps of providing a ballast water treatment apparatus on the dock-side service vehicle; positioning the service vehicle adjacent a respective ship requiring ballast water treatment; and directing ballast water from a ballast tank of the respective ship into the ballast water treatment apparatus on the dock-side service vehicle to thereby treat the respective ship's ballast water before discharging the ship's ballast water into an open water environment. In this method, the respective ship's ballast water may be directed from the ballast tank through the ship's fire hydrant system and into the ballast water treatment apparatus on the dock-side service vehicle. The method may further include the further step of connecting at least one fire hose between a fire hydrant outlet on a deck of the respective ship and an inlet port provided on the ballast water treatment apparatus on the dock-side service vehicle.

There is still also provided a method of deriving financial revenue for services provided for treating discharged ballast water from a ship using a dock-side service vehicle. This method includes the steps of (1) positioning the dock-side service vehicle adjacent a respective ship requiring ballast water treatment, (2) directing ballast water from a ballast tank of a respective ship into a ballast water treatment apparatus maintained on the dock-side service vehicle to thereby treat the respective ship's ballast water before discharging the ship's ballast water into an open environment, (3) determining an amount of time required to treat the respective ship's ballast water, and (4) calculating a water treatment service fee based on the amount of time required to treat the respective ship's ballast water.

There is also provided another method of deriving financial revenue for services provided for treating discharged ballast water from a ship using a dock-side service vehicle. This method includes the steps of (1) positioning the dock-side service vehicle adjacent a respective ship requiring ballast water treatment, (2) directing ballast water from a ballast tank of a respective ship into a ballast water treatment apparatus maintained on the dock-side service vehicle to thereby treat the respective ship's ballast water before discharging the ship's ballast water into an open environment, (3) determining a total volume of treated ballast water processed from the respective ship's ballast water tanks, and (4) calculating a water treatment service fee based on the total volume of treated ballast water.

According to yet a further aspect of this invention there is also provided a method of processing ballast water discharged from a ship. This method includes the steps of accessing ballast water requiring treatment from a ship's ballast tank through a fire hydrant system of the ship, directing the ballast water from the fire hydrant system through a filter to thereby remove undesired particulate matter from the ballast water, and directing the filtered ballast water into an open water environment. This method may further include the step of directing electromagnetic radiation at the ballast water before directing the filtered ballast water into the open water environment to thereby deactivate biological organisms contained within ballast water.

There is yet still provided a method of using the fire hydrant system of a ship to treat ballast water. This method includes the steps of accessing ballast water requiring treatment from a ship's ballast tank through a fire hydrant located on a deck of the ship, directing the ballast water from the fire hydrant through a filter to thereby remove undesired particulate matter from the ballast water, and directing the filtered ballast water into an open water environment. This method may include the further step of directing electromagnetic radiation at the ballast water before directing the filtered ballast water into the open water environment to thereby deactivate biological organisms contained within ballast water.

BRIEF DESCRIPTION OF THE DRAWING

Further objects of the present invention together with additional features contributing thereto and advantages accruing therefrom will be apparent from the following description of preferred embodiments of the invention which are shown in the accompanying drawing with like reference numerals indicating like components throughout, wherein:

FIG. 22 is a detailed partial plan view of the UV lamp assembly utilized in conjunction with the ballast water treatment apparatus shown in FIG. 20 illustrating build-up of UV-irradiated biological material on the lamp assembly;

FIG. 23 is a view similar to FIG. 22 showing a tube wiper system and actuator assembly cleaning the build-up of UV-irradiated biological material on the lamp assembly according to another aspect of the present invention;

FIG. 24 is a view similar to FIG. 23 showing the lamp assembly in a fully cleaned or wiped condition after full activation of the tube wiper system;

FIG. 25 is a detailed isolated elevation view of a wiper plate employed in the tube wiper system illustrated in FIGS. 22-24;

DETAILED DESCRIPTION OF THE INVENTION

Figure 1:
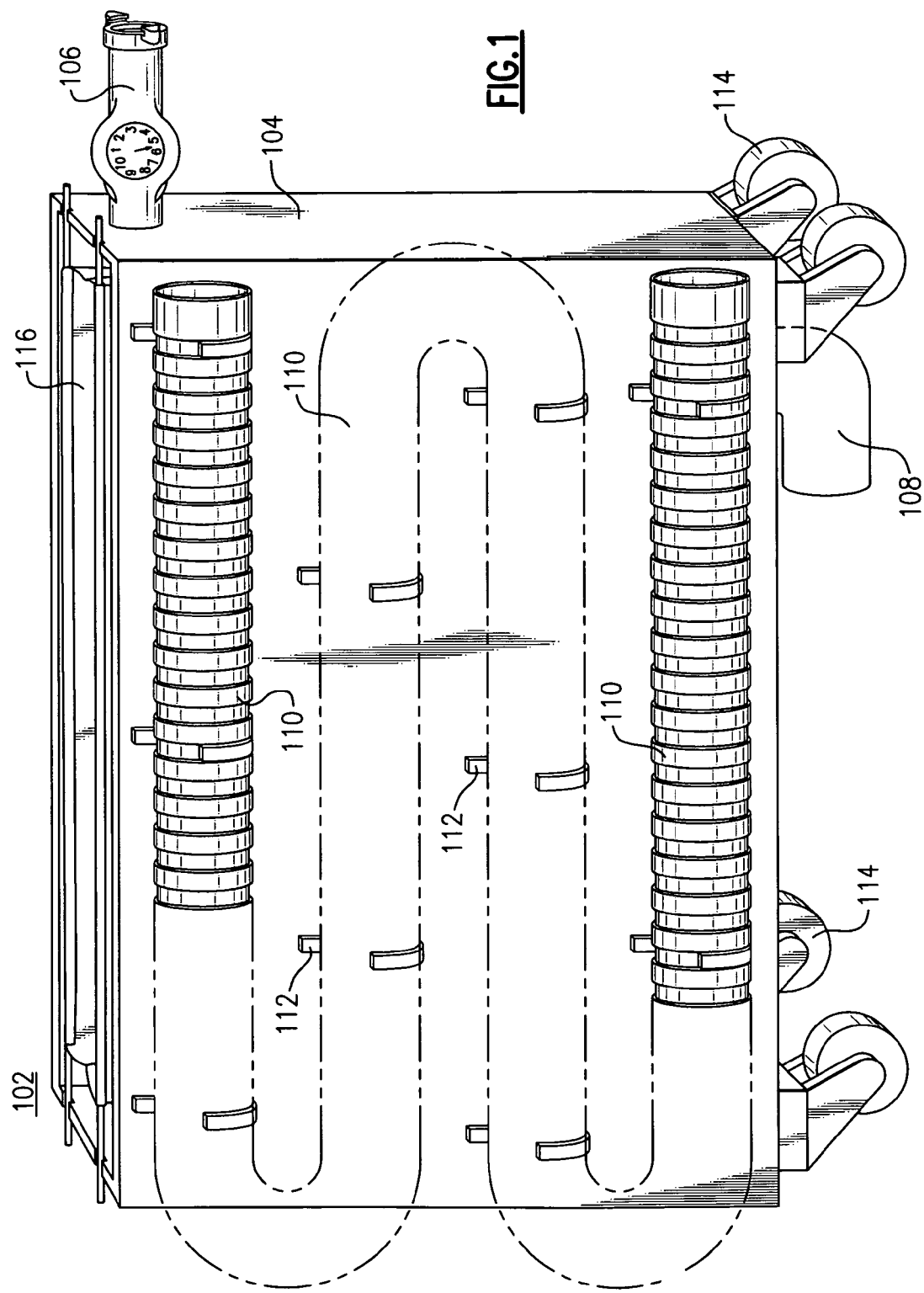
FIG. 1 is a perspective view of a one embodiment of a ballast water treatment apparatus according to the present invention.

With reference to FIG. 1, there is shown a ballast water treatment apparatus or device 102 according to the present invention. The ballast water treatment apparatus 102 includes a tank housing 104 as illustrated. The housing 104 includes an inlet port 106 having a gallon metered device as shown. The housing 104 further includes a discharge port 108. In the embodiment illustrated in FIG. 1, the housing member 104 is further provided with a discharge hose 110 mounted thereon by use of hook brackets 112. During use of the ballast water treatment apparatus 102 as described in further detail below, the discharge hose 110 is connected to the discharge port 108. With continuing reference to FIG. 1, there is further shown transport wheels 114 integrally arranged with the housing member 104 to thereby provide mobility during use of the apparatus on a ship's deck. As also shown in FIG. 1, the housing member 104 is provided with a filter apparatus which is discussed in further detail in connection with FIGS. 2-5.

Figure 2:
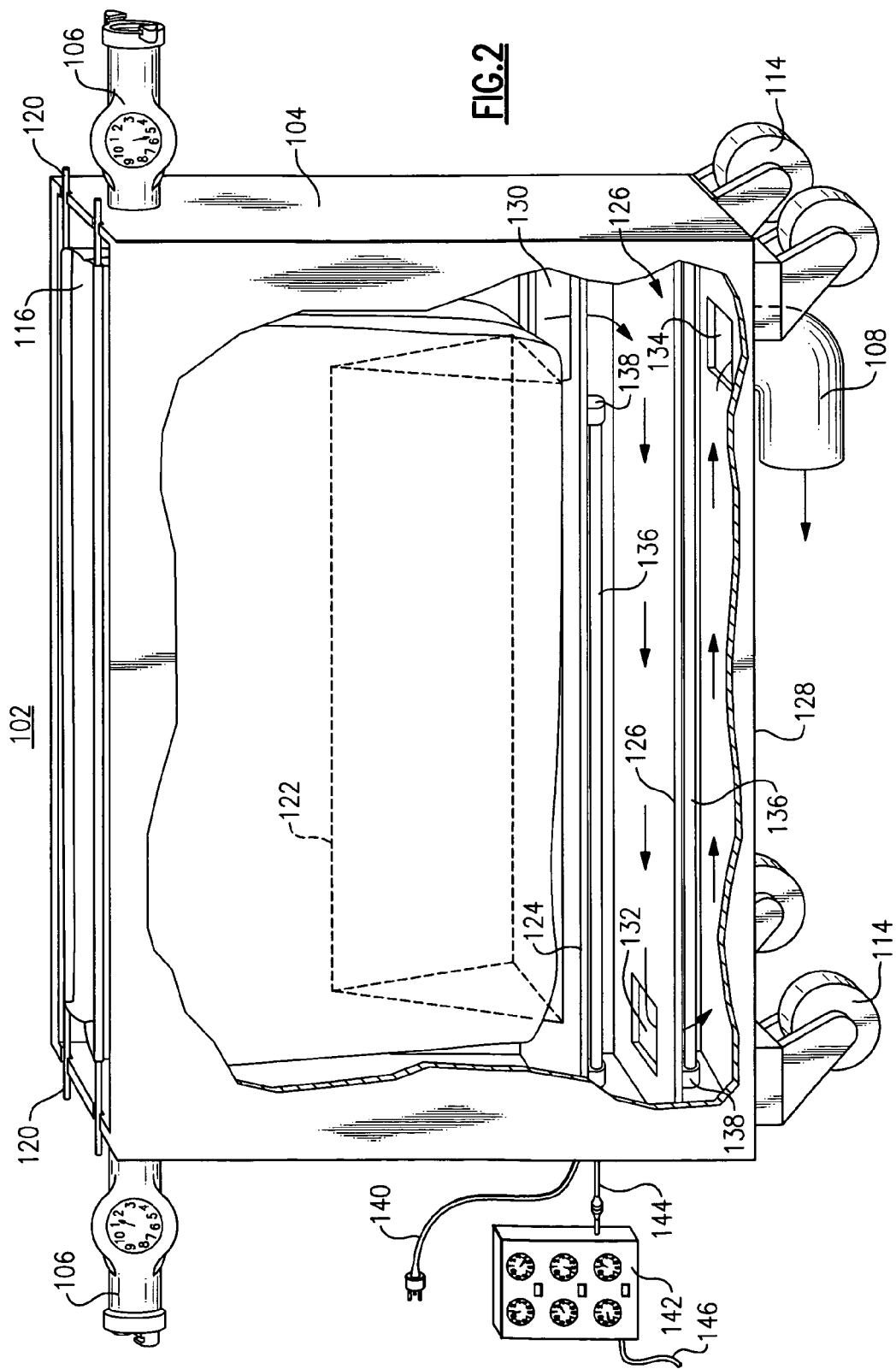
FIG. 2 is a view similar to FIG. 1 including a cut-away section to illustrate the interior of a more particular embodiment of the ballast water treatment apparatus according to this invention.

With reference now to FIG. 2, there is shown the filter apparatus 116 including a filter bag 118, support rods 120, and a support frame 122. The support frame 122 is positioned on a first platform 124 as illustrated. The first platform 124 divides the interior housing 124 into an upper filter chamber 125 and a lower treatment chamber. According to this embodiment of the present invention, there is also provided a second platform 126 positioned below the first platform 124 and above the bottom 128 of the housing 104. The first platform 124 fluidly isolates the upper filter chamber from the lower chambers. The first platform 124 includes a first flow aperture 130 which allows filtered water to pass from the upper chamber into a first lower flow channel formed between the first platform member 124 and the second platform member 126. As further illustrated in FIG. 2, the second platform member 126 includes a flow aperture 132 allowing fluid flow from the first treatment channel into the second treatment channel formed between the second platform 126 and the tank bottom 128. As further indicated by the arrows in FIG. 2 representing the direction of flow of ballast water through the ballast water treatment apparatus 102, the filtered water exits the housing 104 through a third flow aperture 134. As illustrated, water flow is through the aperture 134 in the tank bottom 128 and then through the discharge port 108.

As discussed above in conjunction with FIG. 1, during use of the device 102, the discharge hose 110 is connected to the discharge elbow 108 to direct filtered and treated water over the side of the ship as further discussed in detail below. As further illustrated in FIG. 2, each of the lower flow chambers includes at least one ultraviolet (UV) lamp 136 which is secured to either side of the housing 104 by UV lamp sockets 138. Each of the individual UV lamps 136 is provided with an electrical feedback connection 140 that connects into an electrical control box 132 as illustrated. The electrical control box 132 further includes an electrical power supply 134 that provides power to the UV lamps 136. Electrical power is provided to the control box 132 by an electrical connection 146 that connects to the ship's power supply. During use of the ballast water treatment apparatus 102, the control box 142 includes an hour meter to monitor and record UV bulb usage time. FIG. 2 illustrates one UV lamp in each of the lower treatment chambers. It would be readily understood by those of skill in the art, however, that a greater number of UV bulbs may be situated within these treatment chambers to provide additional electromagnetic UV energy into the chamber. Thus during the operation of the ballast water treatment apparatus 102, after the ballast water has passed through the filter bag 118, it is directed by gravity flow into the lower UV treatment chambers wherein electrical energy is applied to the UV bulbs and UV energy is directed in all directions into the flowing filtered water.

The UV energy is selected to be of sufficient power so that any micro-organisms or other biological organisms passing through the filter-bag 118 will be deactivated by the application of the UV energy. As used herein, "deactivation" means rendering any harmful or undesired biological organisms inactive in a manner that either kills the organisms, renders them unable to reproduce, or otherwise prevents them from causing harm to the open water environment into which the ballast water is discharged. The UV lamps utilized in one specific embodiment preferably number 8 in each chamber and are preferably 2000 watts (2 KW) with an operating voltage of 1,454 volts AC running at 1.35 amps. Thus in this embodiment of the present invention, UV radiation is principally employed to deactivate any biological organisms contained within the ballast water.

As further illustrated in FIG. 2, the ballast treatment apparatus 102 may be provided with two inlet ports 106 each having a respective gallon meter. In this alternate embodiment of the present invention, two supply hoses may be utilized from the ship's fire hydrant system to double the input flow into the apparatus 102 thereby decreasing the time required to filter and treat the ship's ballast water according to the various methods of the present invention discussed below in further detail.

Figure 3:
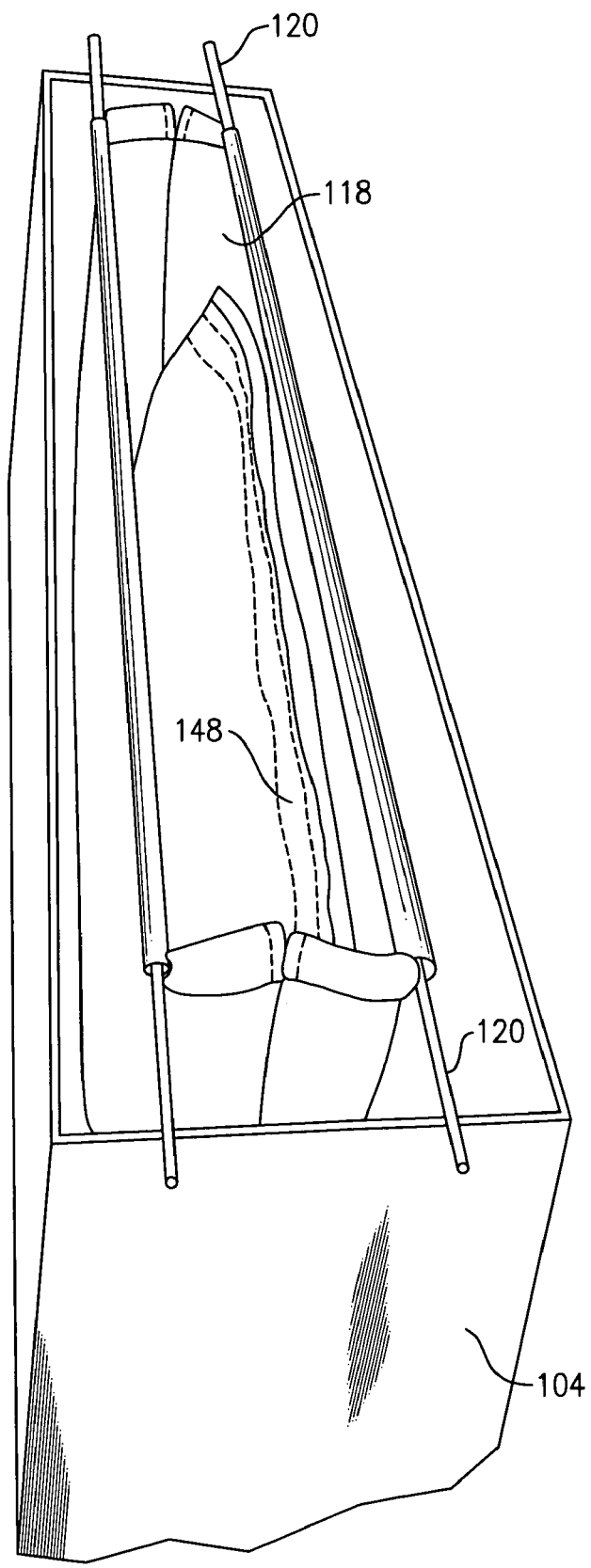
FIG. 3 is a top perspective view showing a filter bag assembly as employed in conjunction with different embodiments of the present invention.

With reference now to FIG. 3, there is shown a perspective top view of the ballast water treatment apparatus 102 according to the present invention. FIG. 3 also shows a top view of the filter apparatus 116 including filter bag 118 and support rods 120. As further shown in FIG. 3, the filter bag 118 is folded upwardly within the filter bag itself so that the bottom of the filter bag is situated some distance below the top edge of the filter bag 118. As further shown, the bottom of the filter bag 118 is provided with a change-filter indicator strip 148. In this manner, during use of the device when particulate matter is filtered from ballast water, the material forming the filter bag 118 will eventually collect an external layer of filtered particulate matter. As this layer of filtered particulate matter increases in thickness, the change-filter indicator strip 148 will eventually become fully covered by such filtered particulate matter. When this occurs, this is an indication that the filter bag 118 should be changed.

Figure 4:
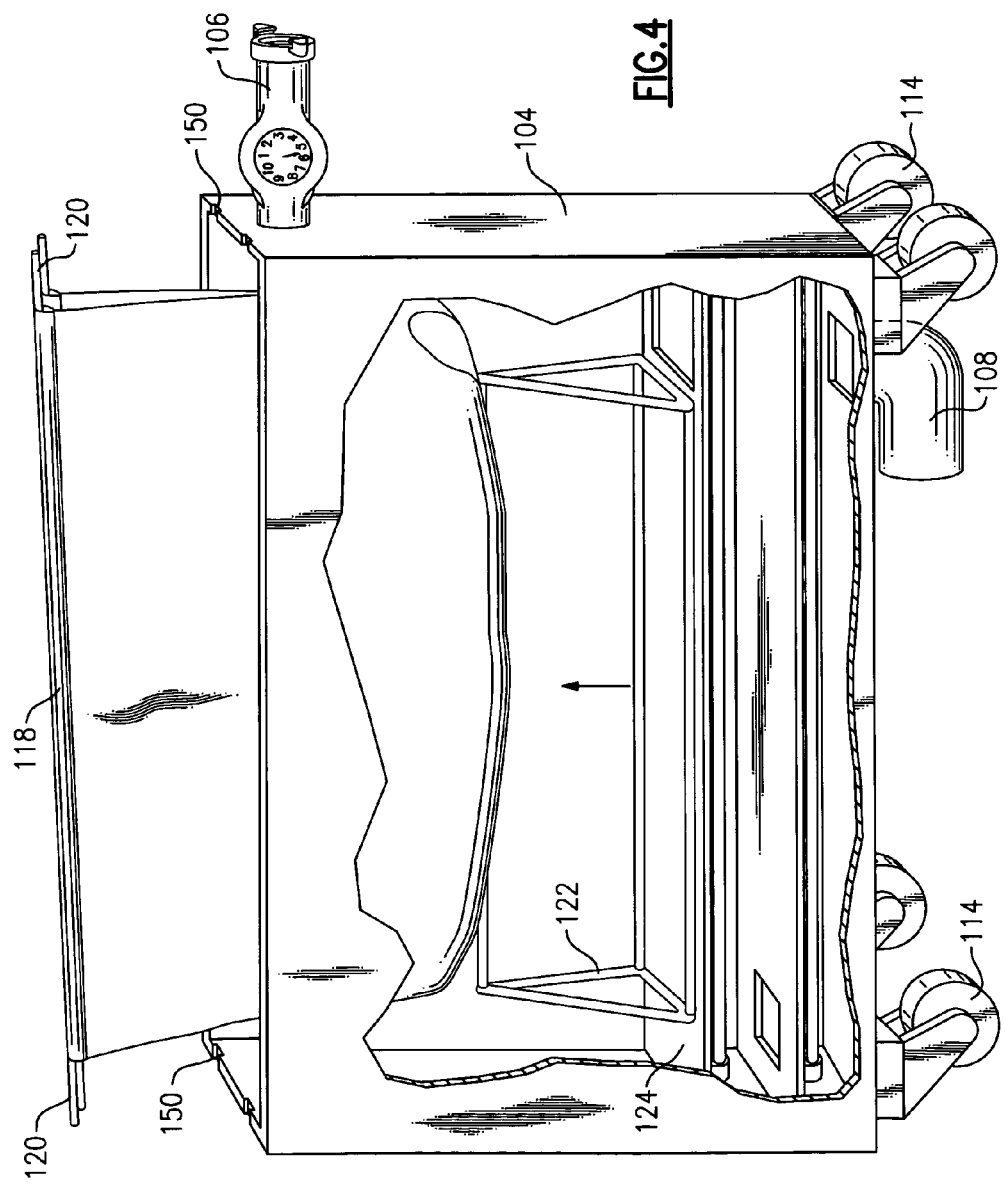
FIG. 4 is a perspective cut-away view showing a filter frame support structure according to one aspect of this invention and further illustrating removal of the filter bag assembly of FIG. 3.

FIG. 4 illustrates the process for changing the filter bag 118. As illustrated in FIG. 4, one or two crew members may grasp the support rods 120 and lift the filter bag 116 from the housing member 104. As further shown in FIG. 4, when filter bag 118 is removed from the housing member 104, the support frame 122 remains within the housing 104. The preferred shape of the support frame 122 is the A-frame style indicated in FIG. 4. In this manner, the support frame 122 provides the necessary elevation so that the end of the filtered bag and the change-filter indicator strip 148, FIG. 3, is situated at a desired height within the housing 104 so that it is substantially always submerged under ballast water during the filtration process to provide an accurate indication of the amount of particulate matter filtered during the filter operation.

As further illustrated in FIG. 4, the top edge of the housing member 104 is provided with support rod notches 150 that are located to position support rods 120 in a desired parallel fashion as indicated in FIG. 3. The support rod notches 150 also secure the rods during use of the device.

Figure 5:
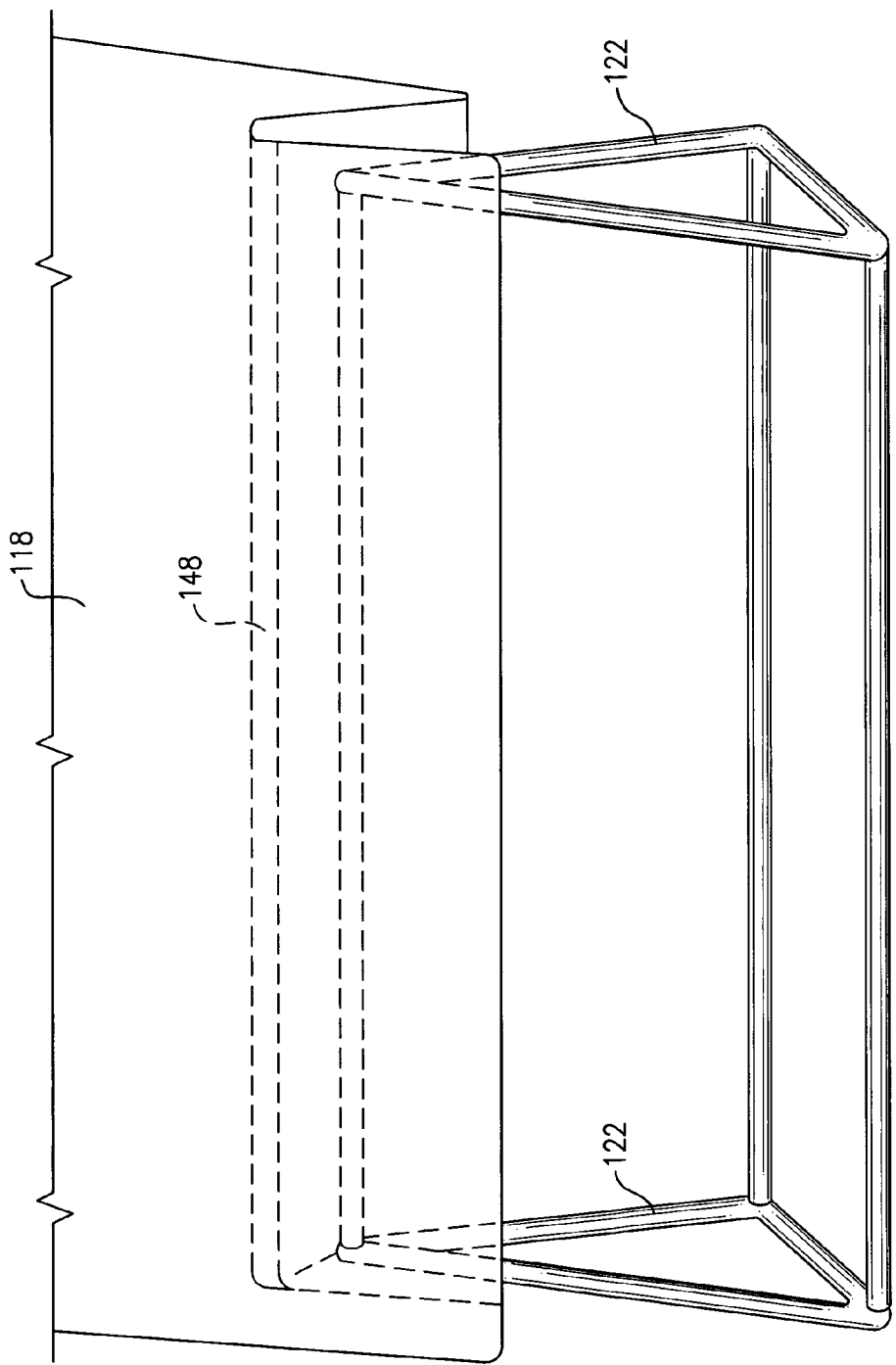
FIG. 5 is an enlarged detailed perspective view of the filter frame support structure and bag assembly illustrated in FIG. 4.

FIG. 5 is an enlarged detailed perspective view of the filter frame support structure 122 and filter bag 118. As illustrated, as the filter bag 118 is loaded into the apparatus, the support frame 122 provides a structure that positions the indicator strip 148 at a desired location above the first platform 124 shown, for example, in FIG. 4. In this manner, not only does the indicator strip 148 result in being positioned in a desired height above the first platform 124, the surface area of the filter bag is thereby increased thus giving increased flow-through and filtering effect during the filtering operation.

Figure 6:
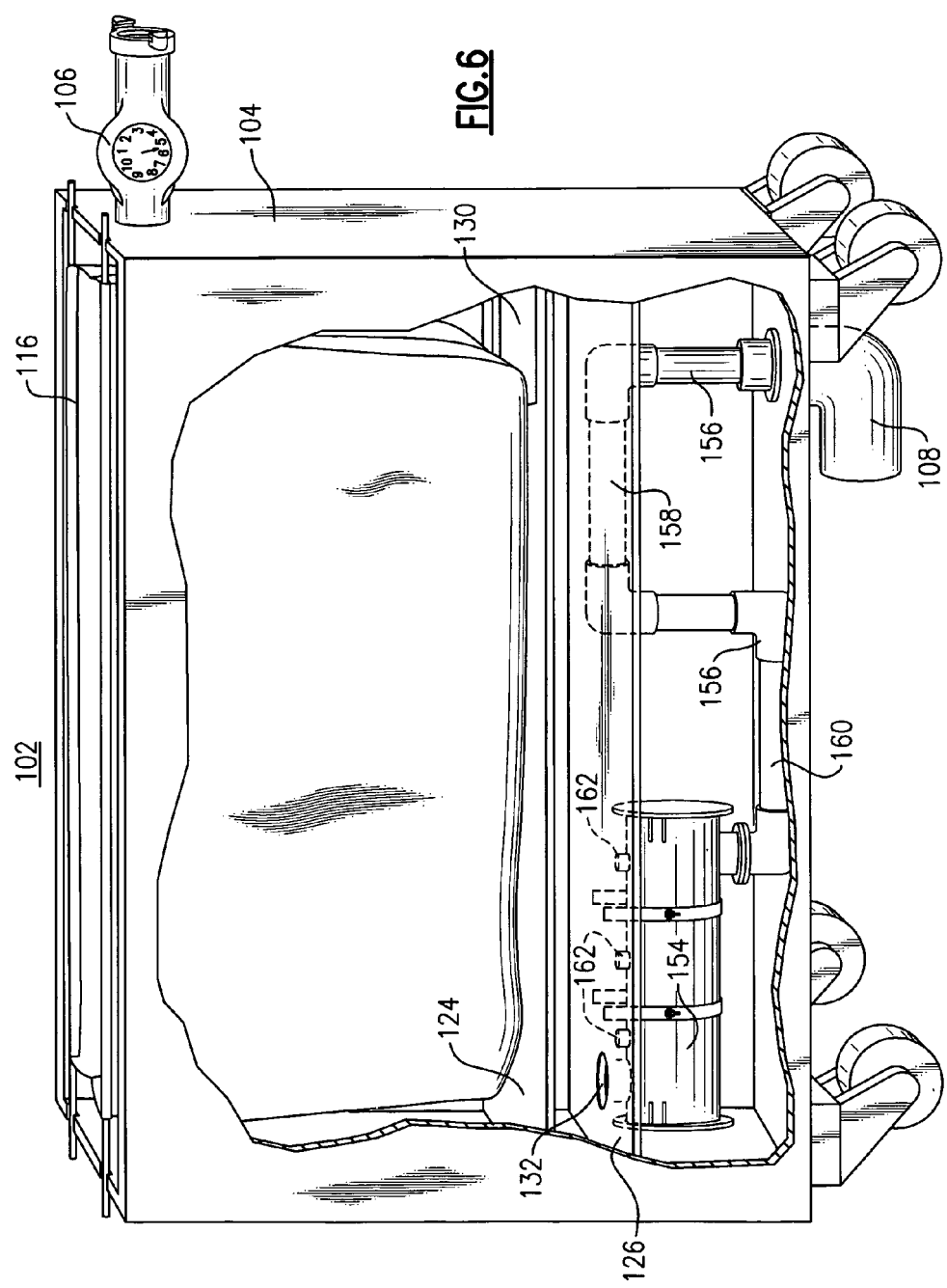
FIG. 6 is a perspective cut-away view of another embodiment of the ballast water treatment apparatus according to the present invention.
Figure 7:
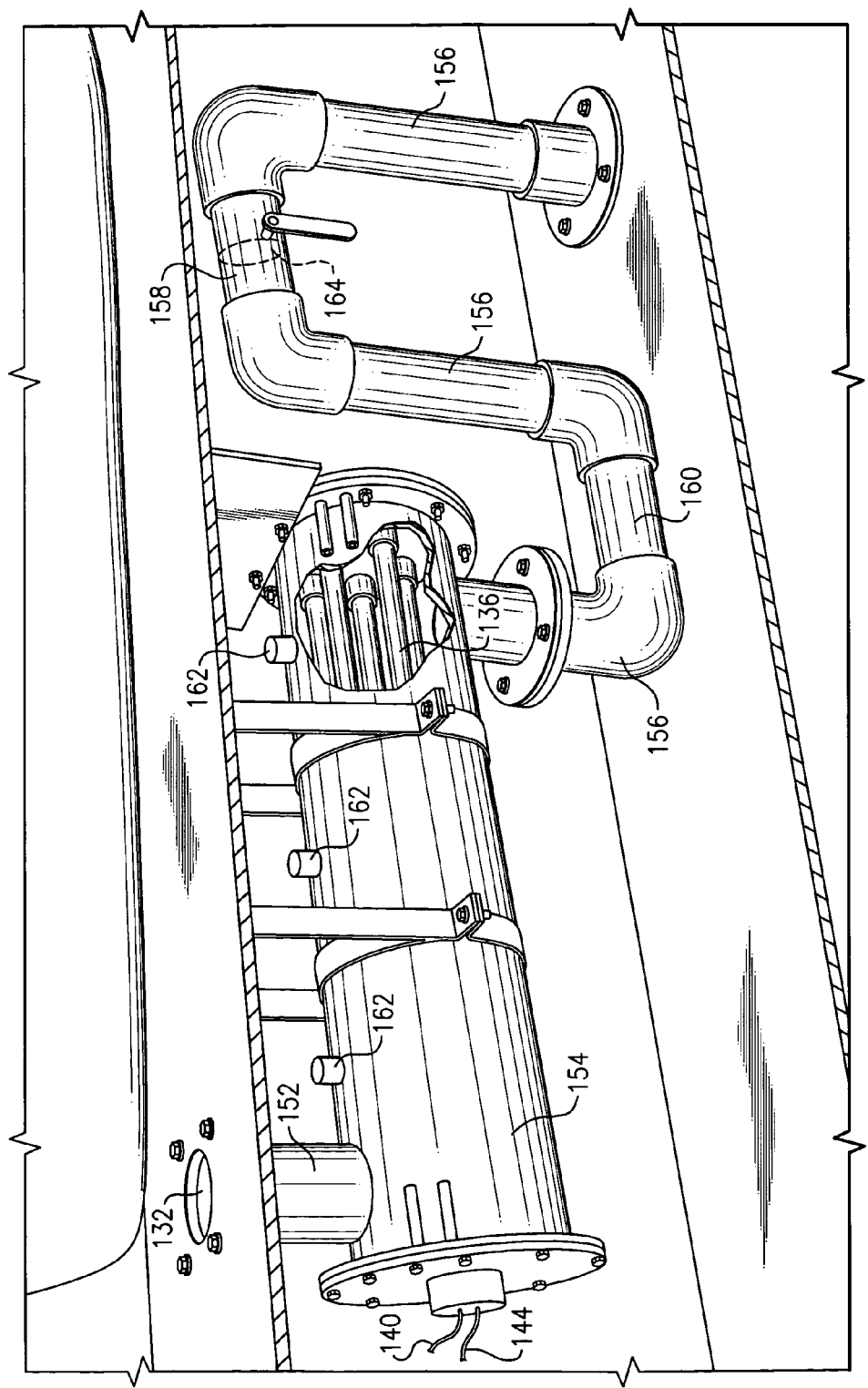
FIG. 7 is an enlarged detailed perspective view of a water treatment tank and related piping as utilized in conjunction with the embodiment of the present invention illustrated in FIG. 6.

With reference next to FIGS. 6 and 7, there is shown an alternate embodiment of the ballast water treatment apparatus 102 according to the present invention. In the embodiment illustrated in FIG. 6, the upper chamber is substantially similar to that discussed in connection with FIGS. 1-5. As illustrated, this embodiment of the apparatus 102 includes the filter apparatus 116, and the housing member 104 having an inlet port 106 and discharge port 108. This embodiment of the present invention also includes a first platform 124 and a second platform 126. This embodiment also similarly includes the first flow aperture 130 provided in the first platform 124 and a second flow aperture 132 formed in the second platform 126. As illustrated, the first flow aperture 130 is rectangular in shape while the second flow aperture 132 in this embodiment is circular to conform to an inlet pipe 152 shown in FIG. 7. As illustrated in FIGS. 6 and 7, this embodiment of the present invention includes a treatment tank 154. The treatment tank 154 includes the UV lamps 136. Depending on the application of the energy required, anywhere between one and eight UV lamps extending the entire length of the treatment tank 154 are preferably desired. The tank 154 is further provided with discharge piping 156. As illustrated in FIG. 6, the discharge piping 156 is fluidly connected to the discharge port 108. The discharge piping 156 includes a trap portion 158 which is situated above the highest water level attainable within the tank 154. In this manner during non-use, water will be maintained within a pipe segment 160 to thereby prevent undesired back-flow. The treatment tank 154 is similarly provided with an electrical power supply 144 and an electrical feedback connection 140. In this specific embodiment of the apparatus as illustrated in FIG. 7, the treatment tank 154 is further provided with heat sensors 162. The electrical feedback connection 144 and electrical power supply 144 are similarly connected to a control box 142 as illustrated in FIG. 2. In this embodiment, the heat sensors 162 are similarly connected to the control box 142. The heat sensors detect the temperature of the filtered water as it passes through the treatment tank 154. In one preferred embodiment, once the UV bulbs 136 reach a desired temperature, they will heat the water and thereby deactivate any biological organisms contained within the ballast water as it passes through the tank 154. In this embodiment, both UV radiation and heat are employed as indicated to deactivate any biological organisms contained within the ballast water.

To prevent premature discharge of filtered water from the treatment tank 154 through the discharge port 108, this embodiment of the present invention is provided with a solenoid-activated valve 164 which is similarly electrically connected to the control box 142. In this manner, the valve 164 is not opened until the water temperature within the tank 154 reaches a pre-determined processing temperature. In one preferred embodiment, the required bulb temperature for water treatment is 125° F. In this embodiment low pressure UV lamps are employed to achieve the desired temperature. In another preferred embodiment of this aspect of the present invention, high pressure UV lamps are utilized to achieved a water temperature of 400° F. Thus during use of the apparatus illustrated in FIGS. 6 and 7, discharge flow is not permitted until the temperature in tank 154 reaches a predetermined desired temperature set to effectively kill or otherwise deactivate any biological microorganisms contained within the ballast water. As with the embodiment of the ballast water treatment apparatus 102 discussed in connection with FIGS. 1-4, the UV lamps utilized in the embodiment shown in FIGS. 6 and 7 are preferably 2000 watts (2 KW) with an operating voltage of 1,454 AC running at 1.35 amps. In one specific implementation, six UV lamps of this particular rating are preferred.

Figure 8:
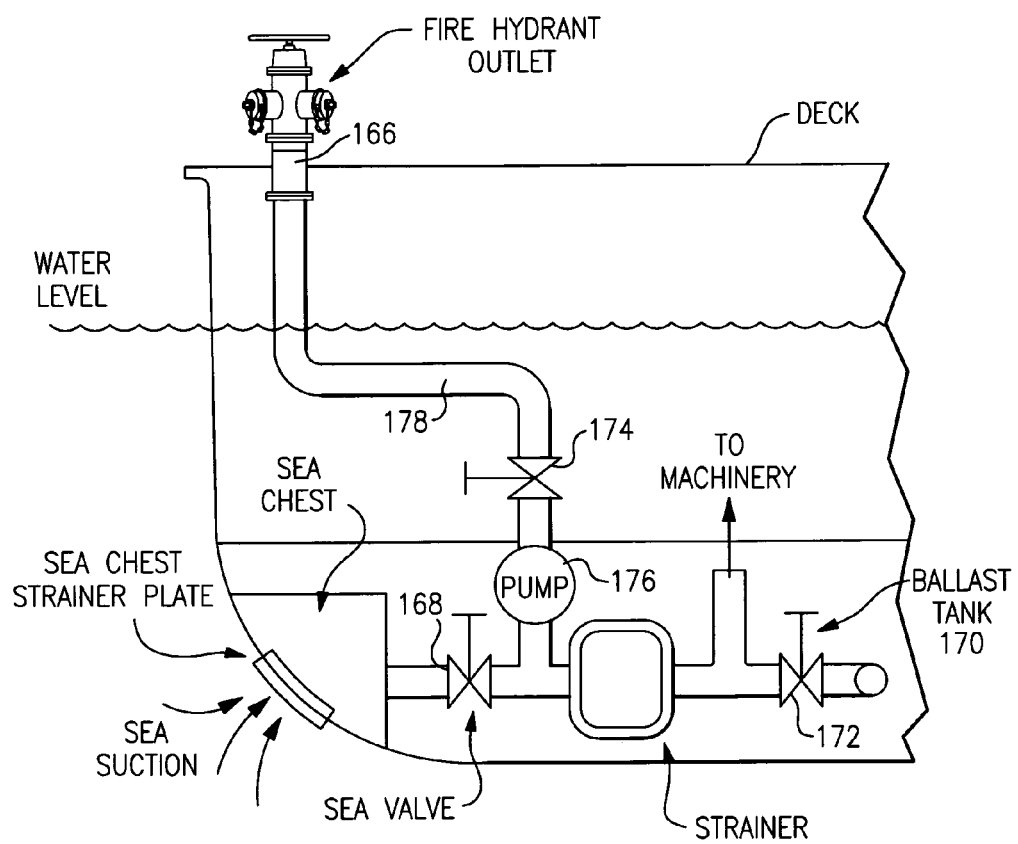
FIG. 8 is a typified diagrammatic cross-sectional representation of a ship's ballast tank and related mechanical piping as adapted for use with the ballast water treatment apparatus according to the present invention.

Referring now to FIG. 8, there is shown a schematic cross-sectional side view of a typical ship's ballast tank and first main deck. As represented schematically, the main deck includes a fire hydrant outlet 166 as indicated. During the process of loading sea water into the ship for ballast, the sea chest and sea valve 168 are open to allow sea water to enter the ballast tanks 170. To allow sea water into the ballast tank, ballast tank valve 172 is typically provided to control the flow of sea water into the ballast tank. A strainer is provided to remove any large particulate matter from the sea water as it enters the ballast tank 170 from the sea chest through the sea valve 168 and into the ballast tank 170 through the ballast tank valve 172. As indicated in FIG. 8, the sea water mechanical system also typically includes a fire hydrant system main valve 174. During use of the apparatus of the present invention, the sea valve 168 is closed while the ballast tank valve 172 is opened. A pump 176 is activated to pump sea water from the ballast tank 170 up through pump 176 and through the connecting piping 178 to feed the fire hydrant outlets 166 with sufficient pressure. Thus in this manner, the apparatus of the present invention may advantageously utilize the ballast water mechanical systems and the fire hydrant system of a ship to direct ballast water from the ballast tanks of a ship through the fire hydrant system to the fire hydrant outlets 166 on board the ship and then into the apparatus of the present invention.

Figure 9:
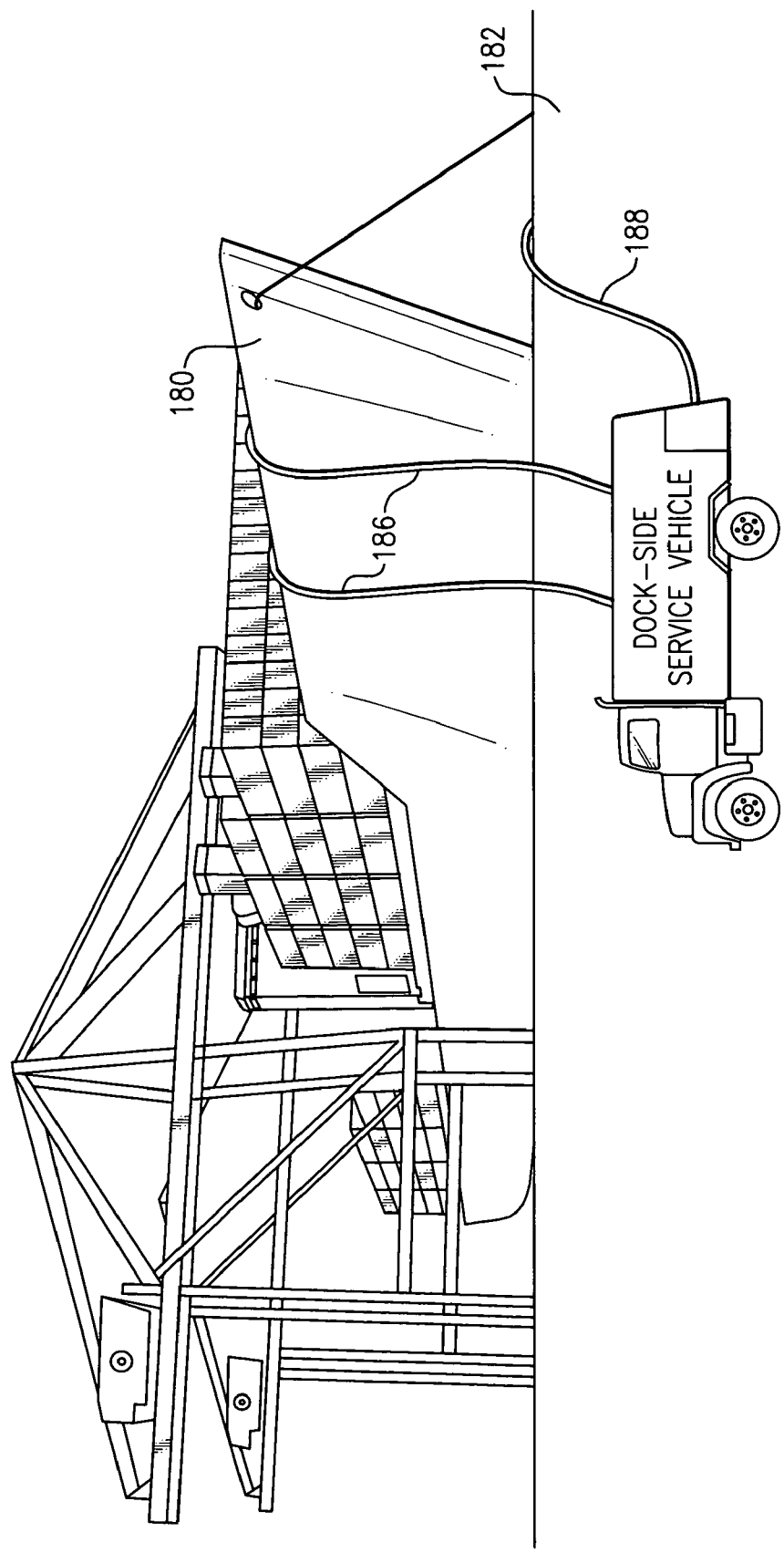
FIG. 9 is a perspective view of a container ship docked port-side for unloading that is also being serviced by a dock-side service vehicle according to the ballast water treatment aspects of the present invention and alternate methods relating thereto.

With reference now to FIG. 9, there is shown a typical container ship 180 docked in port alongside a dock 182. According to one aspect of the present invention, the ballast treatment apparatus 102 is mounted on a dock-side service vehicle 184. In accordance with one method of the present invention, the dock-side service vehicle 184 is positioned adjacent to the docked ship, in this case the container ship 180. Fire hoses 186 are then connected to the ship's fire hydrant outlets and directed overboard from the ship's deck to be secured to the ballast water treatment apparatus 102 contained on or secured to a suitable work space area provided preferably on the back of the dock-side service vehicle 184. The fire hoses 186 are then connected to the inlet ports 106 of the apparatus 102 and filtration and treatment of the ship's ballast water proceeds as described above. The dock-side service vehicle 184 contains a discharge pipe 188 which directs the filtered and treated water back into the harbor or port.

The inventors of the present invention have designed and contemplated many implementations of the ballast water treatment apparatus 102 for use in combination with the dock-side service vehicle 184. As indicated, the preferred embodiment of the dock-side vehicle 184 is a modified, small tank truck that has a filter apparatus contained therein and the UV lamps positioned within the truck-mounted tank or tanks. Thus in this manner, the truck-mounted tanks are completely self-contained and include a suitable number of inlet ports 106 designed to readily quick connect to the ends of fire hoses provided from the ship's fire hydrants.

With continuing reference to FIG. 9, the inventors hereof have specifically provided a method of treating discharged ballast water from the ship 180 using the dock-side service vehicle 184. This method includes the steps of providing a ballast water treatment apparatus on the dock-side service vehicle 184, positioning the service vehicle 184 adjacent the ship 180, and directing ballast water from a ballast tank of the ship 180 into the ballast water treatment apparatus on the dock-side service vehicle 184 to thereby treat the ship's ballast water before discharging the ship's ballast water into an open water environment. In this method, the respective ship's ballast water may be directed from the ballast tank through the ship's fire hydrant system and into the ballast water treatment apparatus on the dock-side service vehicle 184. The method may include the further step of connecting at least one fire hose 186 between a fire hydrant outlet on the deck of the ship 180 and an inlet port provided on the ballast water treatment apparatus on the dock-side service vehicle 184.

The inventors hereof have further provided a method of deriving financial revenue for services provided for treating discharged ballast water from the ship 180 using the dock-side service vehicle 184. This method includes the steps of (1) positioning the dock-side service vehicle 184 adjacent the ship 180, (2) directing ballast water from a ballast tank of a ship 180 into a ballast water treatment apparatus maintained on the dock-side service vehicle 184 to thereby treat the ship's ballast water before discharging the ship's ballast water into an open environment, (3) determining an amount of time required to treat the ship's ballast water, and (4) calculating a water treatment service fee based on the amount of time required to treat the ship's ballast water.

There is also provided another method of deriving financial revenue for services provided for treating discharged ballast water from a ship using the dock-side service vehicle 184. This method includes the steps of (1) positioning the dock-side service vehicle 184 adjacent ship 180, (2) directing ballast water from a ballast tank of the ship into a ballast water treatment apparatus maintained on the dock-side service vehicle 184 to thereby treat the ship's ballast water before discharging the ship's ballast water into an open environment, (3) determining a total volume of treated ballast water processed from the ship's ballast water tanks, and (4) calculating a water treatment service fee based on the total volume of treated ballast water.

Figure 10:
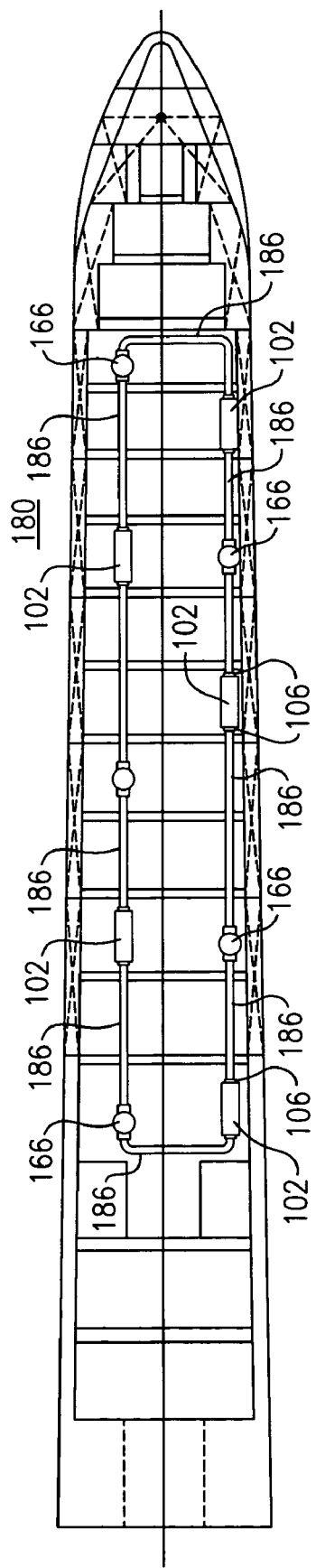
FIG. 10 is a deck plan of the container ship illustrated in FIG. 9 showing the location of the ship's second deck fire hydrants.
Figure 11:
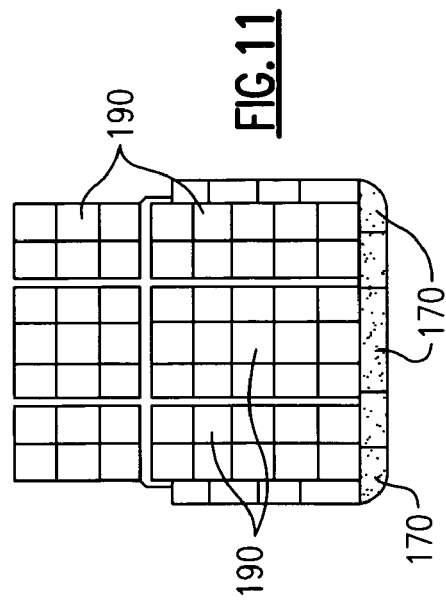
FIG. 11 is a cross-sectional view of the container ship illustrated in FIG. 9 showing the ballast tank area relative to cargo space.
Figure 12:
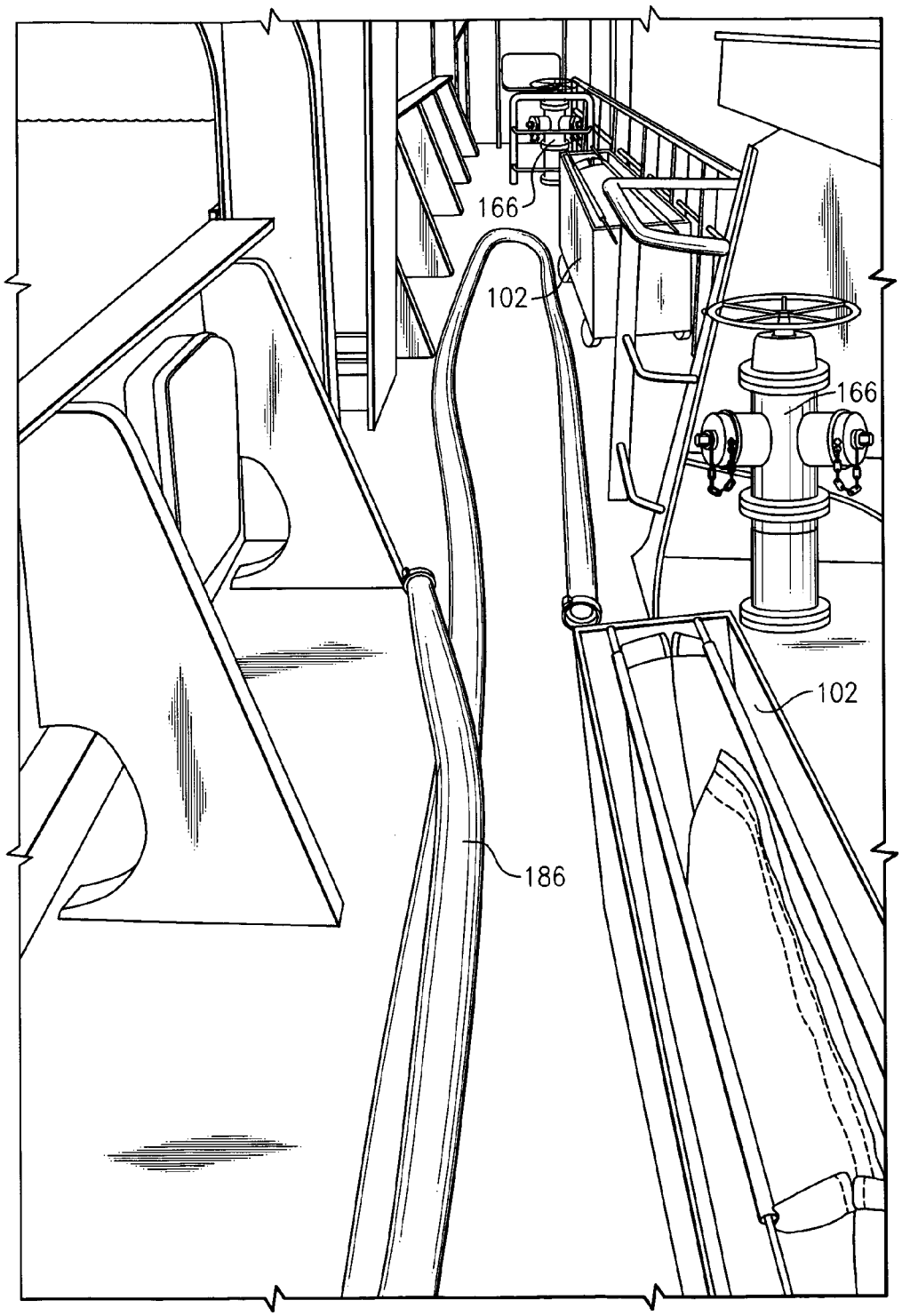
FIG. 12 is perspective view along the second deck of a typical container ship illustrating the placement of ballast water treatment apparatus according to the present invention.

Referring next to FIG. 10, there is shown the deck plan of the typical container ship 180 and the location of the fire hydrant outlets 166. FIG. 11 shows the ballast tank areas 170 relative to the cargo areas represented by reference numeral 190. The typical cargo container ship 180 will carry a known amount of sea water for ballast. Thus if it is desired to completely treat and filter the ballast water in accordance with the methods of the present invention, the number of available fire hydrant outlets 166 may be determined along with flow rates thereof and the known flow rates of the ballast water treatment apparatus 102 to completely filter the entire ship's ballast water within a predetermined maximum amount of time. As represented diagrammatically in FIG. 10, a number of ballast water treatment apparatus 102 are distributed around the ship's main deck or second deck adjacent fire hydrant outlets 166. The ship's fire hydrant as indicated in FIG. 8 typically includes one outlet. According to one aspect of the present invention, ships with one outlet fire hydrants many be equipped with a Y-adaptor to thereby provide two outlets. Both of these outlets may be employed to direct ballast water into the ballast water treatment apparatus 102. Alternatively one outlet may be employed with the apparatus 102 while the other is reserved for use in case it is needed in a fire emergency. Thus according to one preferred method of this invention, two hoses may be connected to each of the fire hydrants 166 and directed to adjacent ballast water treatment devices 102 as inter-connected by the ship's fire hoses 186. As represented in FIG. 10, the series connected arrangement of fire hydrants 166 feeding two adjacent ballast water treatment apparatus 102 will utilize the full flow-through rate of the fire hydrant system of the ship to filter and treat the ship's ballast water according to this aspect of the present invention in a minimum amount of time. FIG. 12 next illustrates a perspective pictorial representation of this multi-hydrant and multi-apparatus method.

Figure 13:
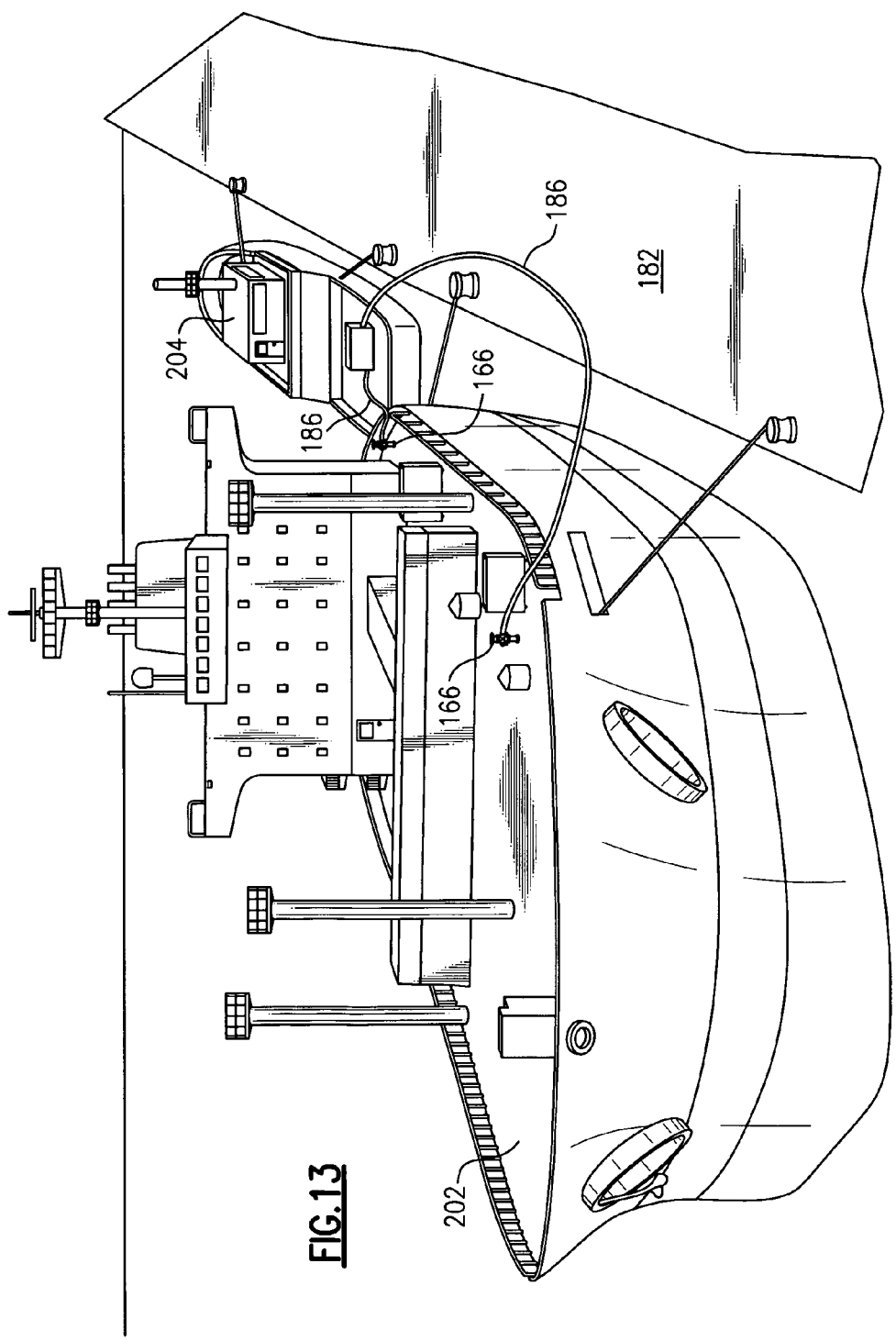
FIG. 13 is a perspective view of a tanker docked port-side for loading or unloading that is also being serviced by an in-port service vessel according to the ballast water treatment aspects of the present invention and additional methods relating thereto.

Turning now to FIG. 13, there is shown a perspective view of a typical tanker 202 situates dockside in a port-of-call. As indicated in FIG. 13, the main deck of the tanker 202 includes a number of fire hydrant outlets 166. In accordance with another aspect of the present invention, there is provided an in-port service vessel 204 which is outfitted with a ballast water treatment apparatus 102 according to the present invention. Thus in accordance with alternate methods of the present invention, the in-port service vessel 204 may be employed to pull alongside a docked ship and provide ballast water filtration and treatment services. For example, as illustrated in FIG. 13, a tanker 202 may be required by local, state, national, or international regulations to have the ship's ballast water treated before its ballast water is discharged into the port or harbor. Thus in accordance with this method of the present invention, the ship's fire hoses 186 are connected to the main deck's fire hydrants 166 and directed to the in-port service vessel 204 as represented in FIG. 13. The in-port service vessel 204 may be a barge type vessel or tug boat type vessel utilized to provide the water filtering and treating service to a ship. According to alternate methods of this embodiment, neither the ship nor the service vessel 204 need necessarily be dockside. The ship may be anchored in port or alternatively, even serviced in this manner in open waters or on the high seas before entering port.

Thus in continuing reference to FIG. 13, the inventors hereof have provided a method of treating discharged ballast water from a ship using the in-port service vessel 204. This method includes the steps of (1) providing a ballast water treatment apparatus 102 on board the service vessel, (2) positioning the service vessel adjacent the ship 202 requiring ballast water treatment, (3) and directing ballast water from a ballast tank of the ship 202 into the ballast water treatment apparatus 102 on board the service vessel 204 to thereby treat the respective ship's ballast water before discharging the ship's ballast water. In this method, the ship's ballast water is directed from the ballast tank through the ship's fire hydrant system and into the ballast water treatment apparatus on board the service vessel 204. The method may include the further step of connecting at least one fire hose 186 between the fire hydrant outlet 166 on the deck of the ship 202 and an inlet port provided on the ballast water treatment apparatus on board the service vessel.

Accordingly, there is also provided a method of deriving financial revenue for services provided for treating discharged ballast water from a ship using the in-port service vessel 204. This method includes the steps of positioning the service vessel 204 adjacent the ship 202 requiring ballast water treatment; directing ballast water from a ballast tank of the ship 202 into a ballast water treatment apparatus maintained on board the service vessel 204 to thereby treat the ship's ballast water before discharging the ship's ballast water into the environment; determining an amount of time required to treat the ship's ballast water; and calculating a water treatment service fee based on the amount of time required to treat the ship's ballast water.

There is further provided another method of deriving financial revenue for services provided for treating discharged ballast water from the ship 202 using the in-port service vessel 204. This method includes the steps of positioning the service vessel 204 adjacent the ship 202 requiring ballast water treatment; directing ballast water from a ballast tank of the ship 202 into a ballast water treatment apparatus maintained on board the service vessel 204 to thereby treat the respective ship's ballast water before discharging the ship's ballast water into the environment; determining a total volume of treated ballast water processed from the respective ship's ballast water tanks; and calculating a water treatment service fee based on the total volume of treated ballast water.

Figure 14:
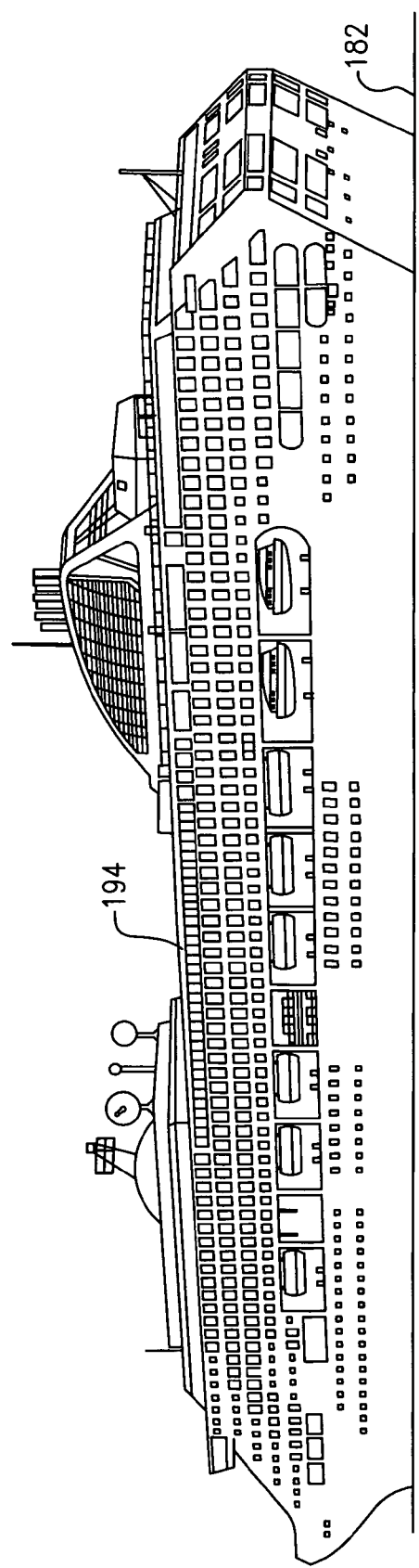
FIG. 14 is a perspective view of a passenger cruse ship docked port-side for loading or unloading.

Referring next to FIG. 14, there is shown a perspective view of a typical cruise ship 194 in port dockside for loading or unloading passengers, cargo, and supplies. As discussed in connection with FIGS. 9, 10, and 11, the cruise ship 184 may be similarly serviced by the dock-side service vehicle 184 or alternatively carry on-board a desired number of ballast water treatment apparatus 102 for on-ship deck hands to filter and treat the ship's ballast water according to the methods discussed above. In addition thereto, cruise ship 194 may have its ballast water treated by the in-port service vessel 204 discussed above.

Figure 15:
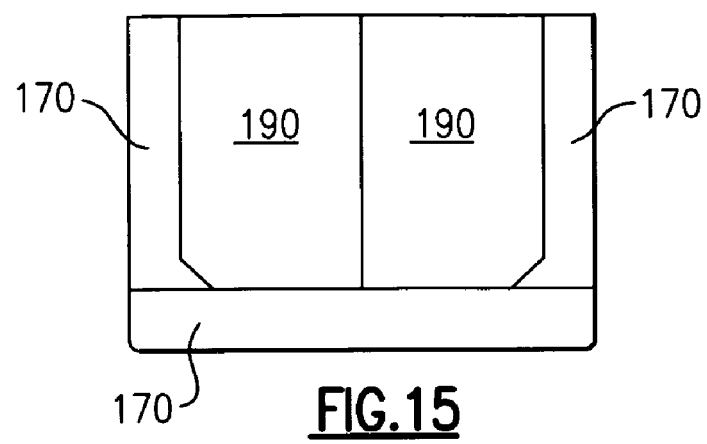
FIG. 15 is a cross-sectional view of the tanker shown in FIG. 13 illustrating the ballast tank area relative to cargo space.
Figure 16:
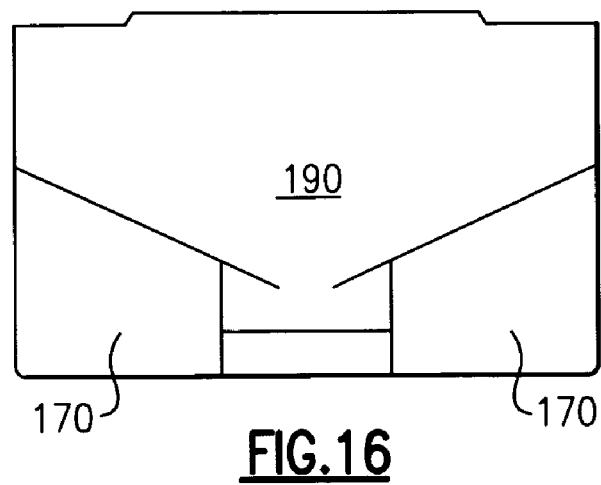
FIG. 16 is a cross-sectional view of an intermediate class Great Lakes bulk vessel showing the ballast tank area relative to cargo space.
Figure 17:
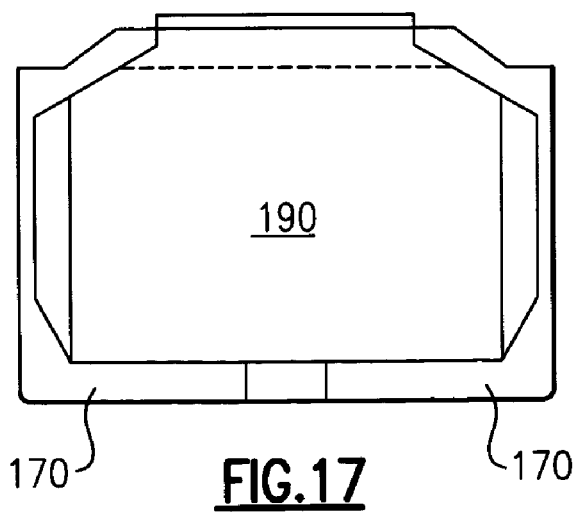
FIG. 17 is a cross-sectional view of a Panamax size oil bulk ore carrier representing the ballast tank area relative to cargo space.

FIG. 15 is a cross-sectional view of the tanker illustrated in FIG. 13 illustrating the ballast tank area 170 relative to cargo space 190. FIG. 16 is a cross-sectional view of an intermediate class Great Lakes bulk vessel showing the ballast tank area 170 relative to cargo space 190. FIG. 17 is a cross-sectional view of a Panamax size oil bulk ore carrier representing the ballast tank area 170 relative to cargo space 190. In each of these three different types of ships, typically the weight of the cargo loaded on or off the ship is approximately made equal to the weight of ballast water used to counter-balance the ship in accordance with known methods for loading and unloading ships. In these types of ships, ordinarily, a relatively larger volume of ballast water is discharged during loading as compared to the typical container ship illustrated, for example, in FIG. 9. Nonetheless, the apparatus 102 and methods of the present invention utilizing either the dock-side service vehicle 184 or the in-port service vessel 204 may be readily scaled up to meet the volume of ballast water typically discharged by these types of ships.

Figure 18:
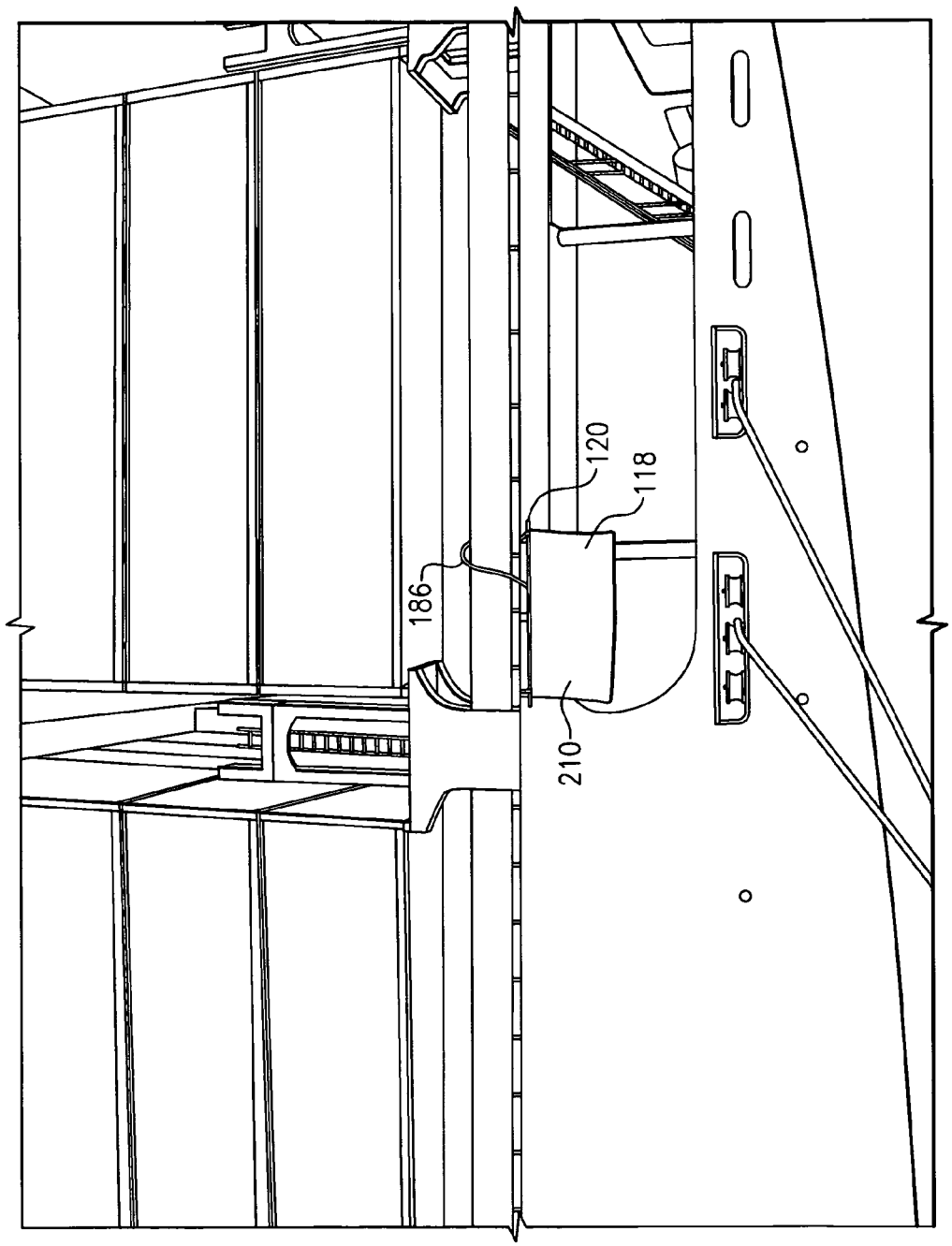
FIG. 18 is a perspective view of another embodiment of the present invention illustrating the use thereof as positioned on the side of a typical container ship.

With reference now to FIG. 18, there is shown an alternate embodiment of the ballast water treatment apparatus of the present invention. A ballast water filtration apparatus 210 is shown in FIG. 18. The ballast water filtration device 210 similarly includes a filter bag 118 and support rods 120. In this embodiment, the support rods 120 are provided with members to hook over the side of the ship as illustrated in FIG. 18. In use, a fire hose 186 is connected to the fire hydrant on the ship's deck and the open end of the fire hose 186 is simply placed in the filter bag 118 as illustrated. Thus in this embodiment of the present invention, there is provided a very simply and economically cost effective filtration apparatus and method.

Figure 19:
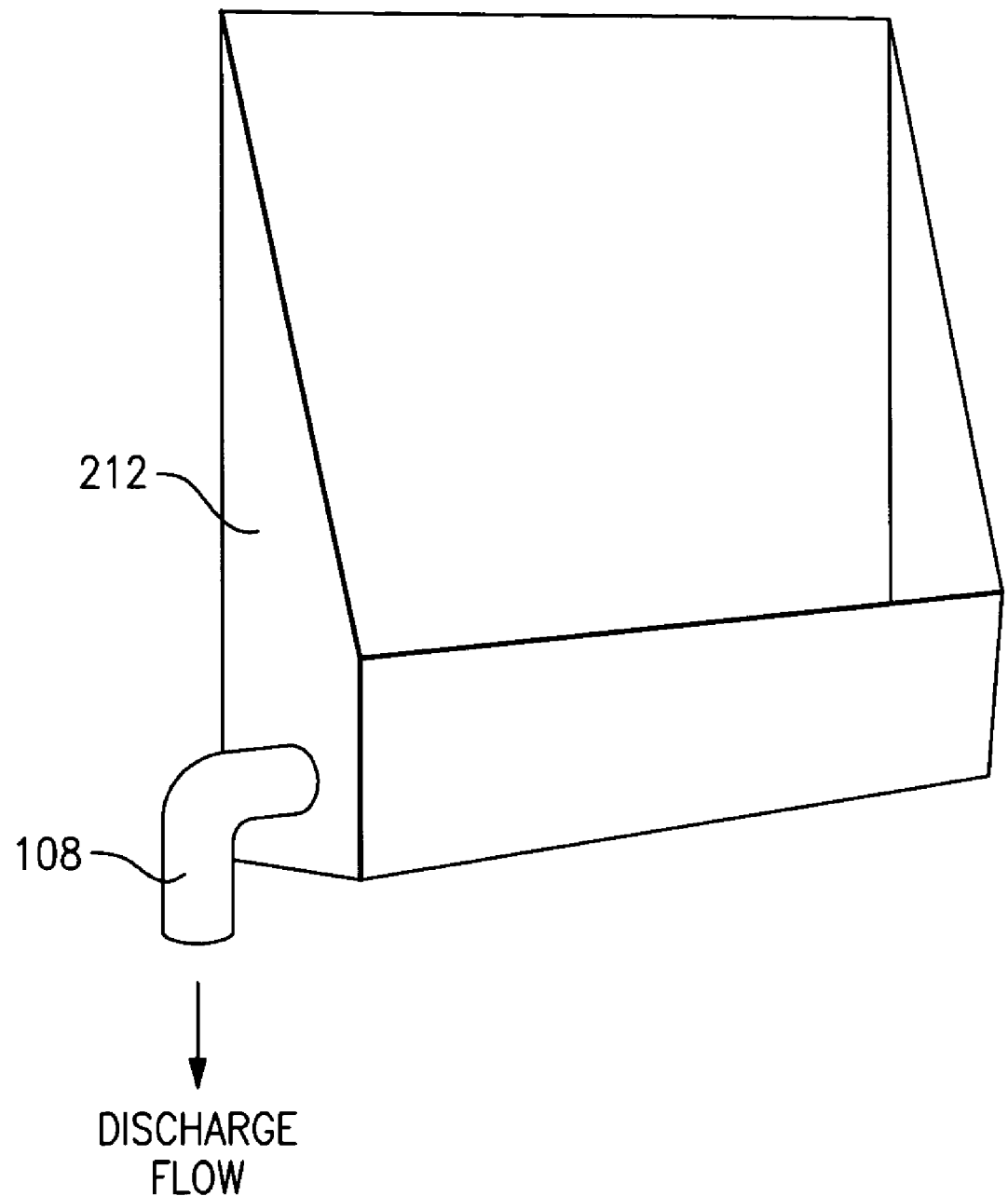
FIG. 19 is a perspective view of a half-face housing member that may be employed in combination with the ballast water treatment apparatus illustrated in FIG. 18.

FIG. 19 shows a half-face housing member for the ballast water filter apparatus 210 illustrated in FIG. 18. The half-face housing member 212 illustrated in FIG. 19 may be employed in conjunction with the ballast water filter apparatus 210 shown in FIG. 18 to provide a directed outlet flow as indicated in FIG. 19. The half-faced housing is similarly provided with the discharge port 108 to direct the water downwardly into the harbor. The discharge port 108 may similarly have adapted thereto the discharge hose 110 illustrated in FIG. 1 to thereby further direct the filtered ballast water into the open water environment of the harbor or port.

Figure 20:
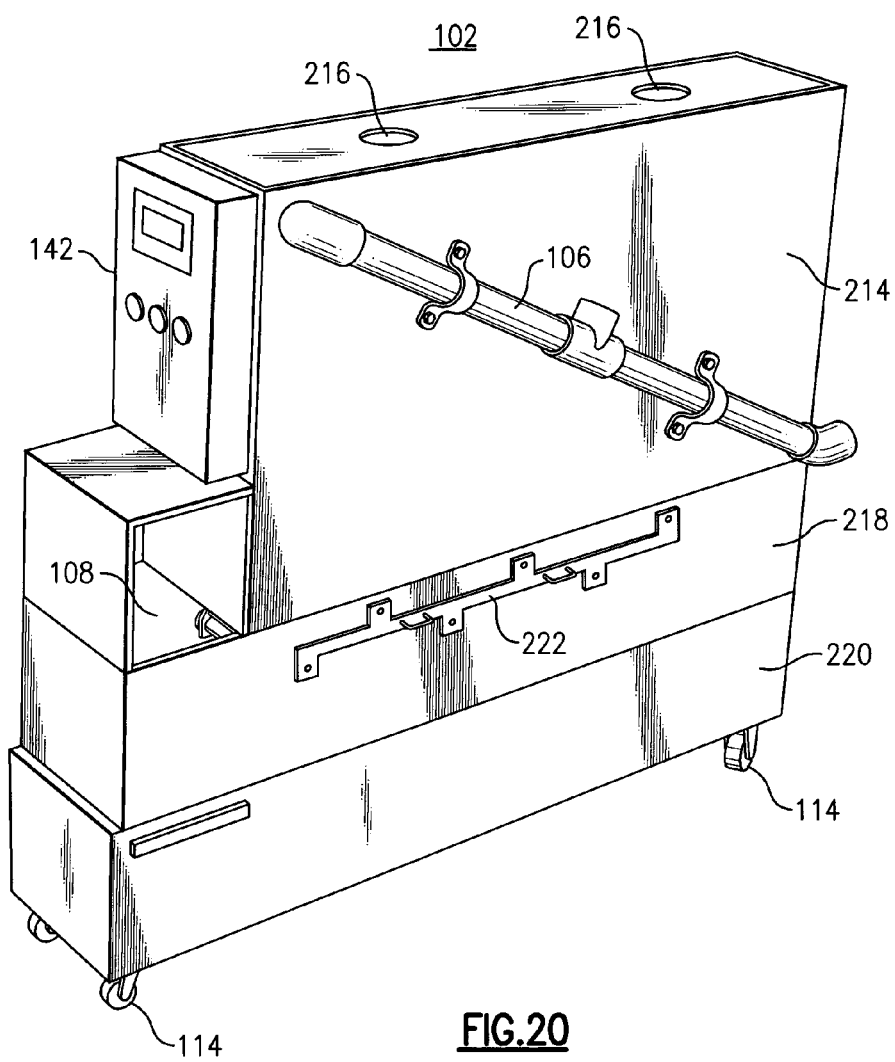
FIG. 20 is a perspective view of yet another embodiment of the ballast water treatment apparatus according to the present invention.
Figure 21:
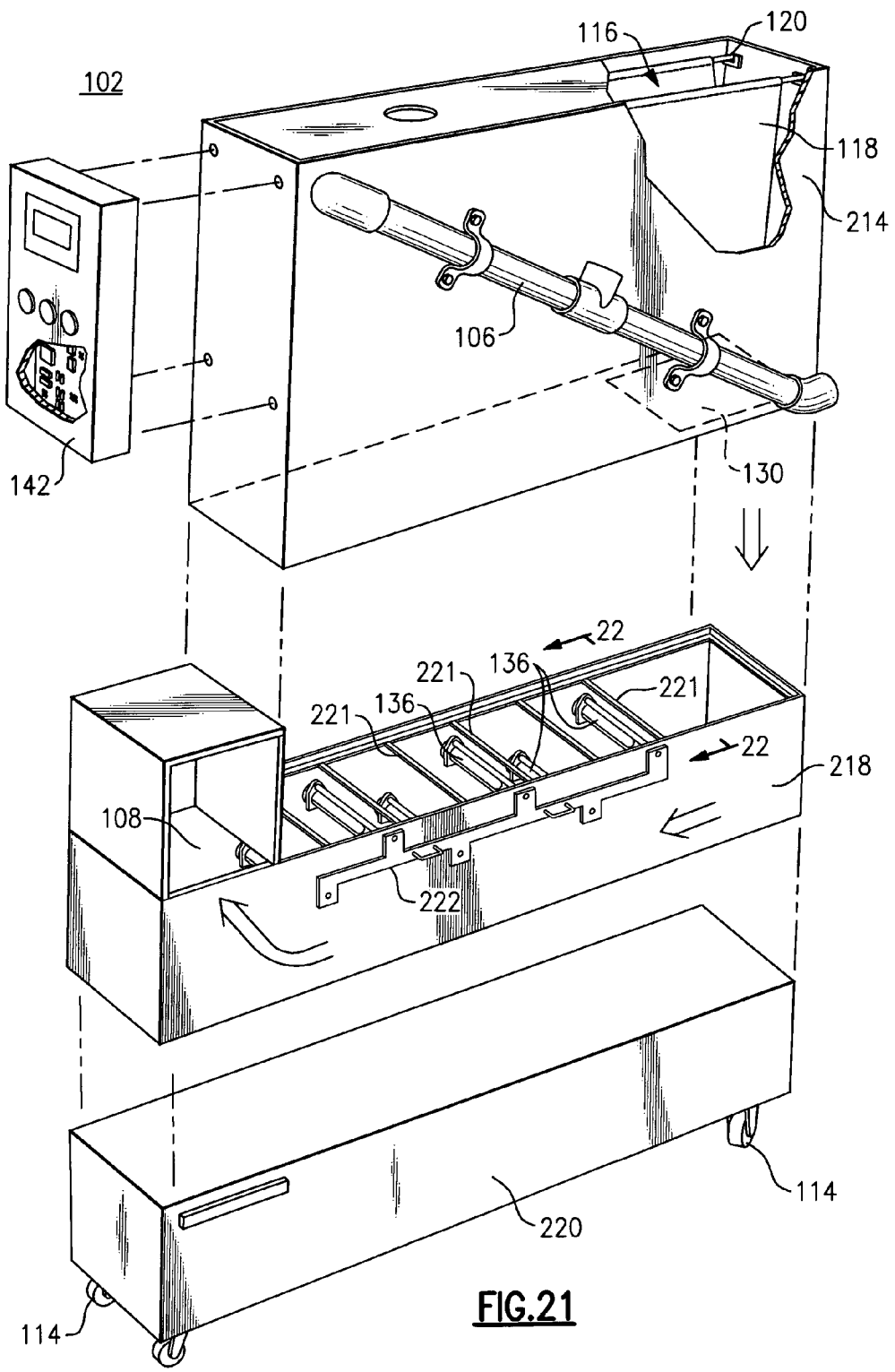
FIG. 21 is an exploded view of the ballast water treatment apparatus illustrated in FIG. 20 including break-away sections to show interior elements of principal components of the apparatus.

With reference next to FIGS. 20 and 21, there is shown a perspective view of yet another embodiment of the ballast water treatment apparatus 102 according to the present invention. FIG. 21 in particular is an exploded view of the ballast water treatment apparatus 102 illustrated in FIG. 20 including break-away sections to show interior elements of principal components of the apparatus 102. In this embodiment shown in FIGS. 20 and 21, the apparatus 102 includes a filtration unit 214, a UV containment vessel or compartment 218, and an electrical compartment 220. As illustrated, the filtration unit 214 includes a cap member having view ports 216. When in use, the cap member prevents ballast water from splashing out of the apparatus 102 while the view ports 216 provide viewing access to the interior of the filtration unit 214 during filtration operations. As further illustrated in FIG. 20, the filtration unit 214 includes the inlet port and associated piping 106 which may be implemented with a gallon meter at the T-junction shown. To further increase the intake flow, the filtration unit 214 may be outfitted with two inlet ports and associated piping 106, one such situated as illustrated and the other similarly installed on the reverse-side or back-side of the unit 214 as shown. The UV compartment 218 includes the UV lamps 136 which in this embodiment are positioned within the UV compartment 218 by use of a pair of UV bulb mounting brackets 222.

As shown in FIG. 21, the UV compartment 218 includes UV sensors 221 which are employed to detect the UV output of the bulbs 136. As shown, the apparatus 102 illustrated in FIGS. 20 and 21 includes the control box 142 that is implemented to similarly control operations of the apparatus as discussed above in connection with the embodiment of the apparatus 102 illustrated in FIGS. 1-5. In the embodiment illustrated in FIGS. 20 and 21, the electrical compartment may include additional components to provide further operations and functions to the apparatus 102.

In operation, a fire hose connected to the ship's fire hydrant at one end is connected at its other end to the inlet piping 106. Ballast water then travels from the lower right area of the filtration unit 214 as illustrated to the upper left thereof to then be directed and discharged into the filter apparatus 116. The ballast water then drains through the filter 116 to thereby remove particulate matter as small as 1 micron. The filtered ballast water then exits the filtration unit 214 through the first flow aperture 130 and is directed into the UV compartment 218 for UV treatment. As the UV compartment 218 fills with filtered ballast water at one end, filtered water is then directed to the other end thereof toward the discharge port 108. As the filtered water flows along in the UV compartment 218 toward the discharge port 108, the UV lamps are activated to treat the filtered water so that any micro-organisms, viruses, or bacteria that may have remained in the ballast water after the filtration step are thereby deactivated by UV treatment. The general direction of flow is indicated by the wide arrows shown in FIG. 21.

In the embodiment illustrated in FIGS. 20 and 21, the UV lamps 136 are situated substantially perpendicular to the flow of ballast water. In one particular preferred embodiment of the UV compartment 218, the UV lamps 136 utilized therein are 3000 KW lamps operating at 220 VAC and 30 Amps. In one such preferred embodiment, six UV lamps 136 are employed. While in other embodiments, the number of UV lamps 136 may vary depending on the desired flow rate, type of ballast water, and desired deactivation or "kill" effectiveness.

FIG. 22 is a detailed partial plan view of a UV lamp assembly utilized in conjunction with the ballast water treatment apparatus shown in FIGS. 20 and 21. FIG. 22 illustrates build-up of UV-irradiated biological material on the lamp assembly. FIG. 23 is a view similar to FIG. 22 showing a tube wiper system and actuator assembly 226 cleaning the build-up of UV-irradiated biological material on the lamp assembly according to another aspect of the present invention. FIG. 24 is a view similar to FIG. 23 showing the lamp assembly in a fully cleaned or wiped condition after full activation of the tube wiper system 226. FIG. 25 is a detailed isolated elevation view of a wiper or face plate 228 employed in the tube wiper system 226 illustrated in FIGS. 22-24.

As illustrated in FIGS. 22-24, each UV lamp 136 is enclosed in a transparent sleeve 224. When the filtered ballast water is treated in the UV compartment, deactivated particulate matter may build up on the transparent sleeves 224. As this build-up of particulate matter increases in thickness, the effect of the UV lamps will be diminished. Thus the UV sensors 221 are employed to detect the UV output of each associated bulb. Once the UV lamp output decreases below a certain set threshold, the cleaning actuator 226 is activated to wipe clean the transparent lamp sleeves 224. This wiping effect is achieved by use of a rubber wiper washer 230, FIG. 25, which snuggly fits around the sleeve 224 as illustrated. After activation, the sleeve is wiped clean and the UV effectiveness is returned to a maximum. The control box 142 and electrical compartment 220, FIGS. 21 and 22, are implemented with operational features that control sleeve cleaning or wiping in a desired manner.

To accommodate the need to treat larger volumes of ballast water, additional methods and embodiments of the present invention may be utilized in conjunction with ballast water discharged through the typical discharge port in various seagoing ships. Compared with the fire hydrant outlet 166 (FIG. 12) in the typical ship-board fire hydrant system, the ballast water discharge port in the side of the ship's hull is typically larger thus providing greater fluid volume flow. The size of the ballast water discharge port in the side of the ship's hull can rage up to 18 to 24 inches in the largest of sea-going ships. Thus the present invention includes additional methods, apparatus, systems and related aspects and functionalities thereof directed to large volume through-put filtration ballast water filtration systems.

Figure 26:
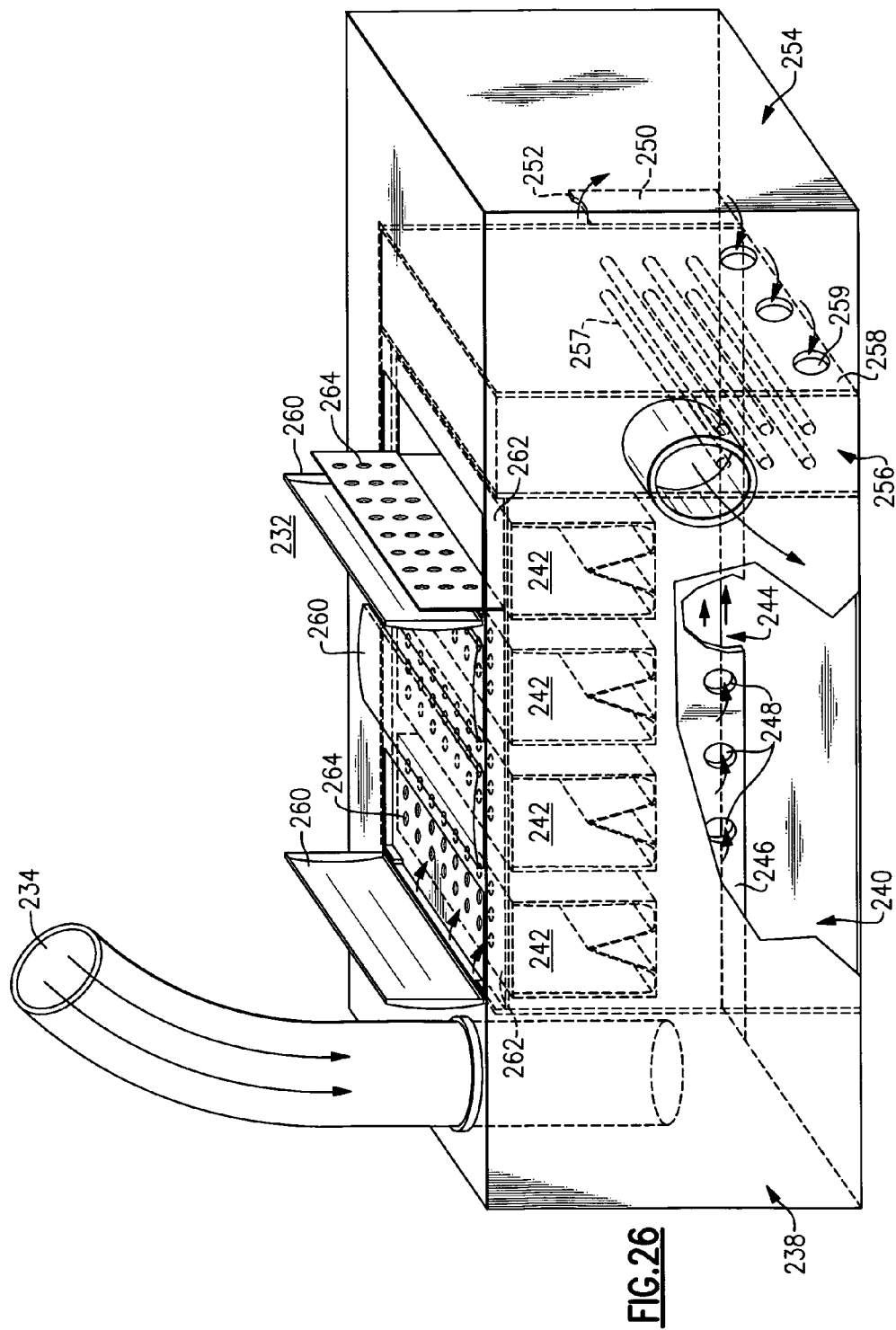
FIG. 26 is a perspective schematic representation including detail cut-way views of a large volume through-put filtration system employing several filter modules and UV irradiation according to alternate embodiments of the present invention.
Figure 28:
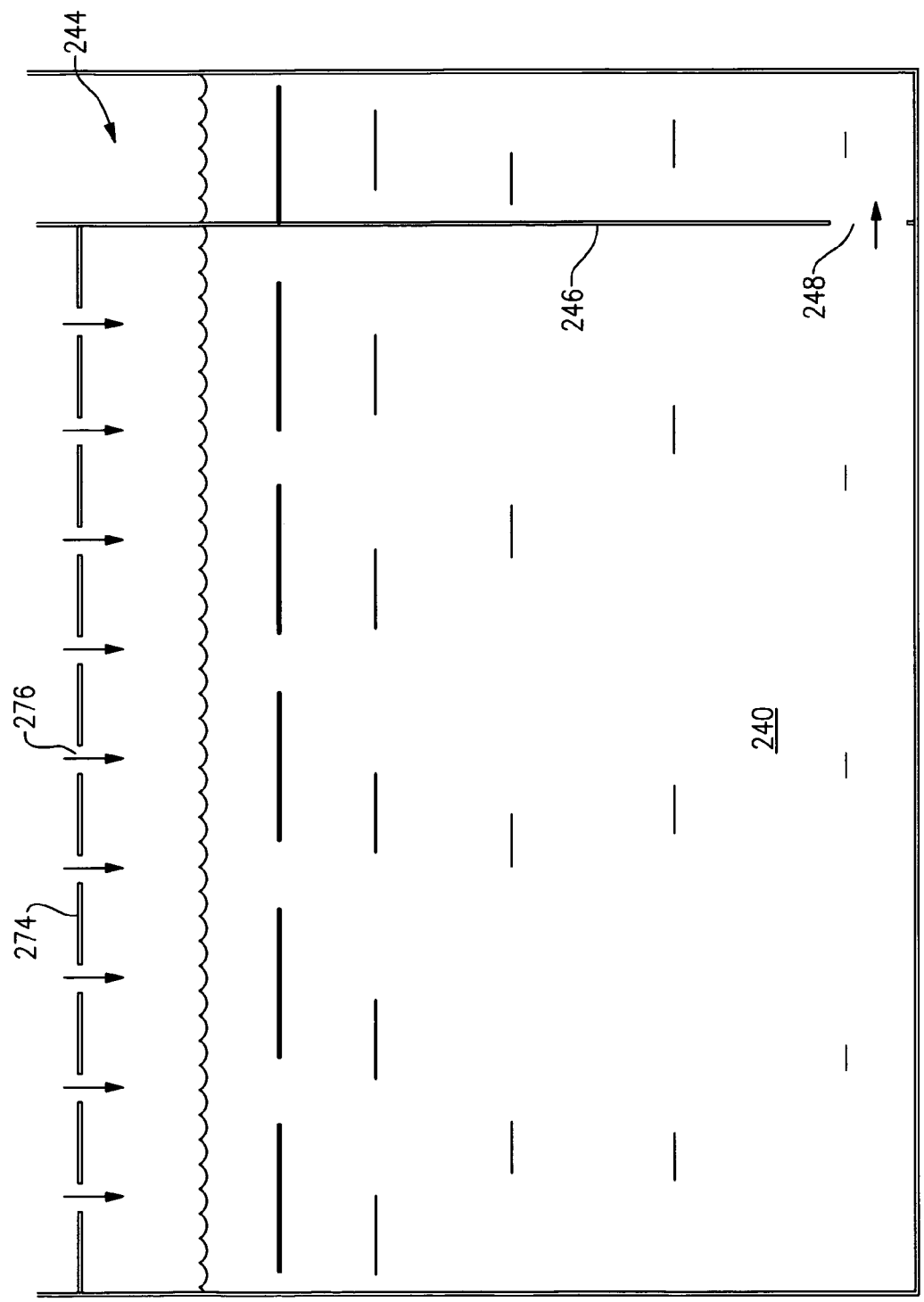
FIG. 28 is a schematic side-view elevation diagram of a lower portion of the main tank of FIG. 26 further illustrating an associated fill tank of the present invention.

Now turning to FIG. 26, there is shown a perspective schematic representation including detail cut-way views of a large volume through-put filtration system 232 employing several filter modules and UV irradiation according to alternate embodiments of the present invention. The filtration system 232 includes an input port 234 and a discharge port 236. In operation, the input port is 234 is connected to the ballast water discharge port of a ship described in further detail below. As shown in FIG. 26, the input port is 234 is connected to an inlet reservoir 238. The inlet reservoir 238 is in fluid communication with a main tank 240 which includes a plurality of filter bag assemblies or modules 242. In the illustrated preferred embodiment hereof, the filter bag modules 242 are positioned in the upper portion of the main tank 240 so the lower portion thereof may fill with treated ballast water that has been filtered through the filter bag modules 242 as described in further detail below. The main tank 240 is in fluid communication with a side channel tank 244 as shown in FIGS. 26 and 28. The main tank 240 and the side channel tank 244 are separated from each other by a dividing wall 246 which includes flow holes 248 position in the lower part of the dividing wall 246 as shown in both FIGS. 26 and 28. The side channel tank 244 includes an end wall 250 which is provided with a lip edge 252 as shown in FIG. 26. Thus in operation, as the side channel tank 244 fills with filtered ballast water, it will eventually fill to the level of the lip edge 252 and then filtered water from the side channel tank 244 will spill into a side fill tank 254 as illustrated. The filtration system 232 also includes a UV containment chamber 256 which is configured to include UV bulbs or lamps 257. As shown, the side fill tank 254 and the UV containment chamber 256 are separated by a common wall 258 which includes flow holes 259 in the bottom thereof. As further illustrated in FIG. 26, each filter bag module 242 is associated with a hatch cover 260 and the main tank 240 is provided with a manifold plate 262 including flow holes 264. As shown in this embodiment, the manifold plate 262 is positioned above the filter bag modules 242. In this particular embodiment, the manifold plate 262 is divided into manifold section doors 266 that correspond in size to the hatch covers 260 so that during maintenance, a workman may open a hatch cover 260 and a corresponding manifold door 266 to change and replace a used filter bag with a new one.

Figure 27A:
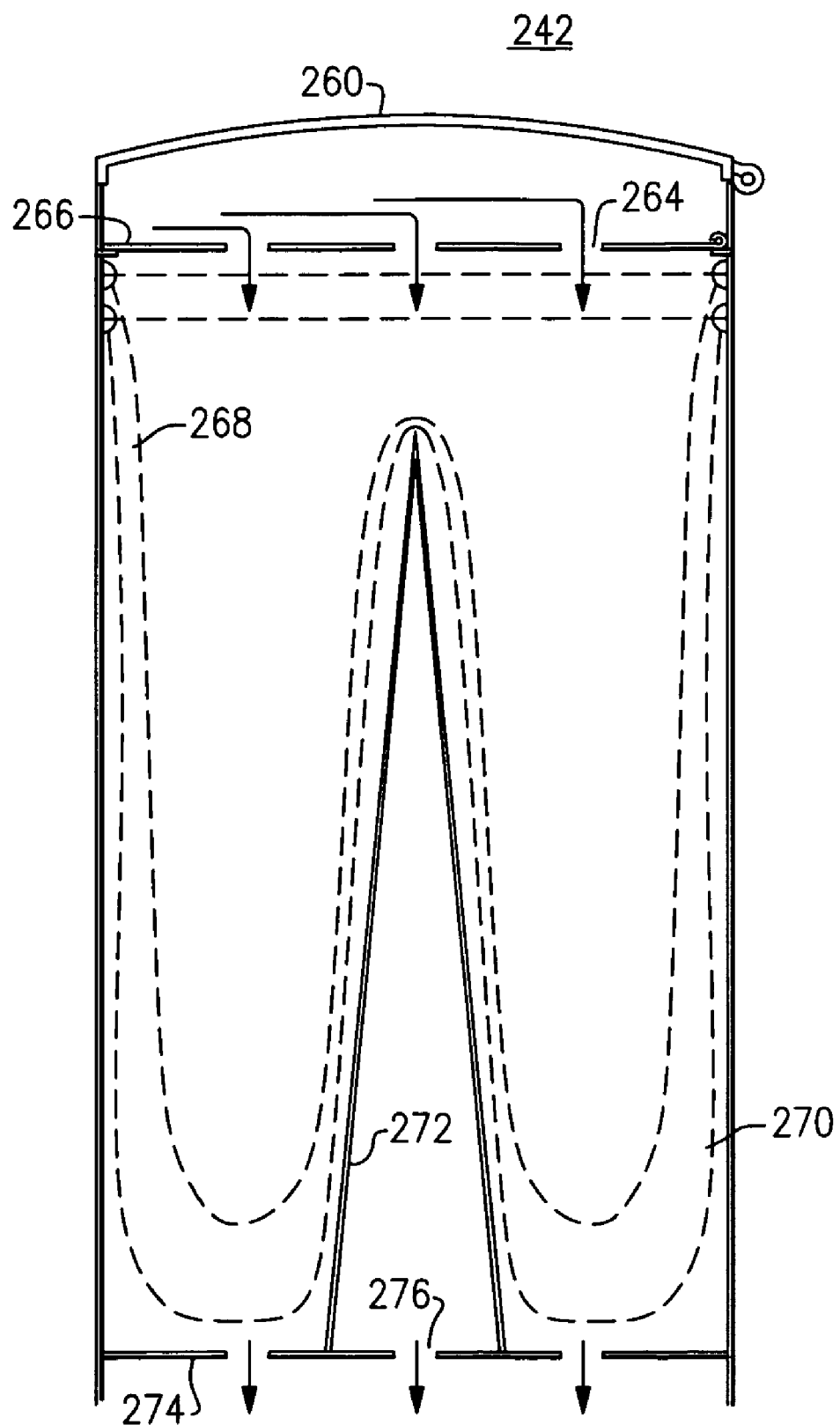
FIG. 27A is a schematic end-view elevation diagram of a filter bag assembly positioned in the upper main tank of the system represented in FIG. 26.

With reference next to FIG. 27A, there is shown a schematic end-view elevation diagram of the filter bag module 242 which is positioned in the upper portion of the main tank 240 discussed above in connection with FIG. 26. Now as illustrated in FIG. 27A, the filter bag module 242 in this particular embodiment includes a first filter bag 268 and a second filter bag 270. Thus in this manner during operation, a workman may open the hatch cover 260 and the manifold door 266 and change a used first filter bag 268 with a new clean filter bag without interrupting the overall flow of ballast water through the system so that filtering operation may continue. This is achieved by leaving in place the second filter bag 270 while the first filter bag 268 is changed out with a new first bag. As further illustrated in FIG. 27A, the filter bag module 242 may include an A-frame support member 272 similar to the support frame 122 discussed above in conjunction with FIGS. 4 and 5. In this manner when using both the first and second filter bags 268 and 270 in this embodiment, the filter area may be increased four-fold when the A-frame support member 272 is made to extend to just below the top edge of the bags 268 and 270 as illustrated. As further shown here in FIG. 27A, the filter bag module 242 may include a bottom screen plate 274 including flow holes 276. The first and second filter bags 268 and 270 may have any desired manufacture and sizing as needed for the various applications hereof. Each of the filter bags 268 and 270 may preferably be formed of material having porosity on the order of microns and more preferably in the range of 10 to 200 microns. It is desired that the filter bags filter out various biological material including plankton and in particular zooplankton which has an average size of 50 microns. Thus in one preferred embodiment, the filter bags are made from material capable of filtering participles of about 25 microns or larger.

Figure 27B:
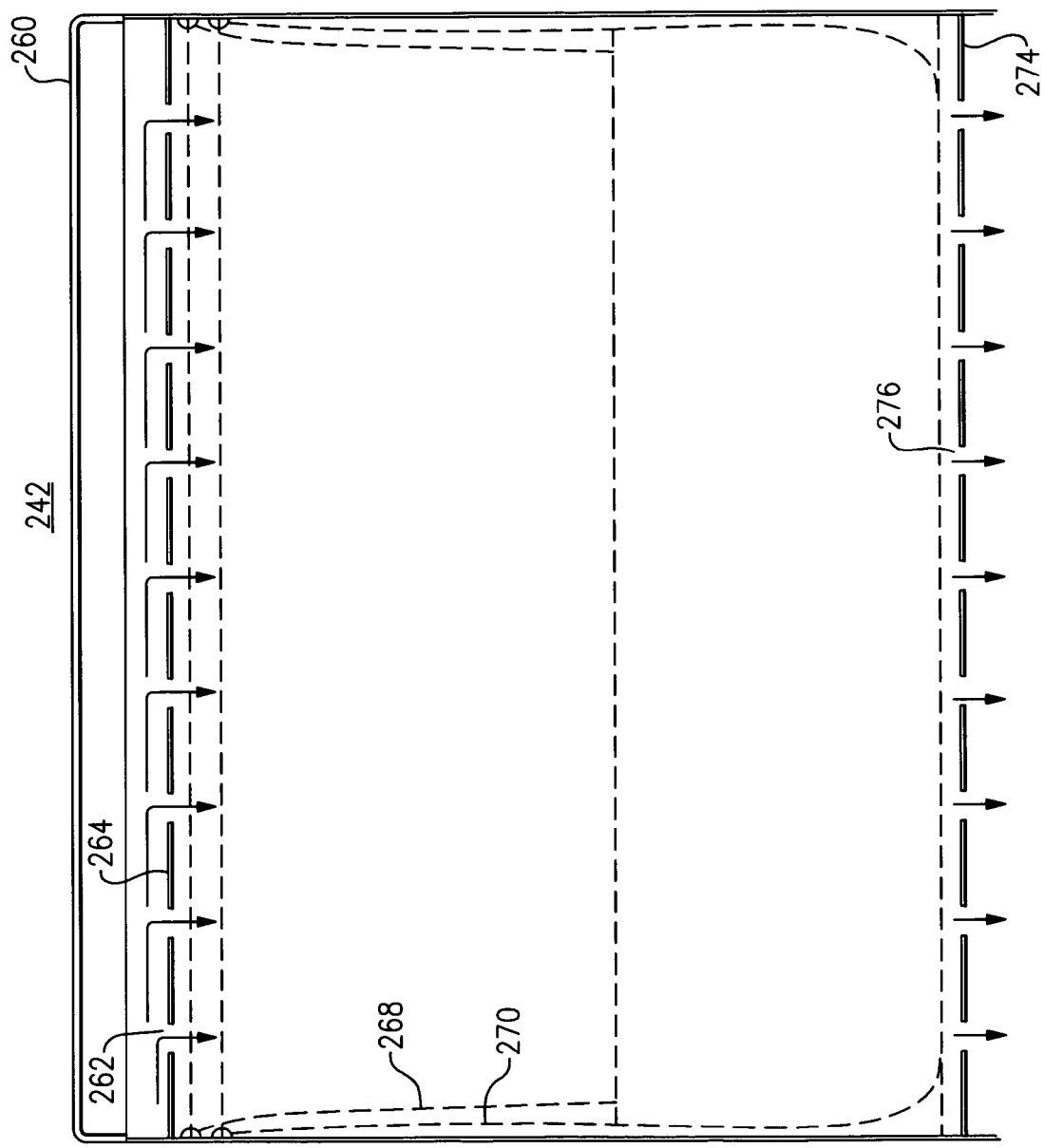
FIG. 27B is a schematic side-view elevation diagram of the filter bag assembly of FIG. 27A.

FIG. 27B is a schematic side-view elevation diagram of the filter bag module 242 of FIG. 27A. Here as illustrated, incoming untreated ballast water is shown flowing over the manifold plate 262 and falling through the flow holes 264 into the first and second filter bags 268 and 270. Thereafter, the filtered ballast water is shown flowing out of the bottom of the first and second filter bags 268 and 270 onto the screen plate 274 and then through the flow holes 276 as provided in the screen plate 274.

Continuing next with FIG. 28, there is illustrated a schematic side-view elevation diagram of the lower portion of the main tank 240 of FIG. 26 and the associated side channel tank 244. As shown, the filtered ballast water from the above the first and second filter bags 268 and 270, FIG. 27A, flows through the flow holes 276 as provided in the screen plate 274 into the bottom of the main tank 240.

With reference now back to FIG. 26 here taken in conjunction with FIGS. 27A, 27B, and 28, operation of the filtration system 232 is next described in detail. As briefly mentioned above, the input port is 234 is connected to the ballast water discharge port of a ship to begin the filtration method according to this aspect of the present invention. As represented in FIG. 26, when unfiltered ballast water enters the input port is 234 the inlet reservoir 238 begins to fill. When the water in the inlet reservoir 238 reaches the level of the manifold plate 262, the water will spill out over onto the manifold plate 262 and drain down through the flow holes 264 into the filter bag modules 242. Thereafter, incoming untreated ballast water flows into the first and second filter bags 268 and 270. Next, the filtered ballast water flows out of the bottom of the first and second filter bags 268 and 270 onto the screen plate 274 and then through the flow holes 276 in the screen plate 274. As the bottom of the main tank 240 fills, filtered water will pass through flow holes 248 in the dividing wall 246 positioned between the main tank 240 and the side channel tank 244 as shown best in FIG. 28. As would be readily understood by those of skill in the art, the water level in the bottom of the main tank 240 and that in the side channel tank 244 will be the same and rise at the same time since they are in fluid communication by the flow holes 248 so positioned in the bottom of the dividing wall 248. Now as the water level in the side channel tank 244 reaches the level of the lip edge 252 in the end wall 250, FIG. 26, filtered water will proceed to overflow into the side fill tank 254. And then as side fill tank 254 fills; the UV containment chamber 256 will fill by virtue of the flow holes 259 positioned in the bottom of the common wall 258. As shown in FIG. 26, the discharge port 236 is preferably position above the highest level of the UV lamps 257 so that the UV lamps 257 are fully submerged in filtered ballast water in the UV containment chamber 256 before water begins to flow out the discharge port 236. Thus in operation, the out flowing filtered ballast water is irradiated by UV energy to deactivate any living biological organisms remaining in the water after filtration. The lamp cleaning system shown and discussed above in reference to FIGS. 22-25 may be readily adapted to the UV lamps 257 utilized here in the UV containment chamber 256.

It should thus be apparent to those skilled in the art, given the present disclosure, that water flow in the filtration system 232 is achieved by gravity and that electric pumps are not required in this embodiment. Thus water flow rates through the present system may be adjusted by design parameters relating to the size of tanks, the height of tanks, the size of overflow gaps, lips, and holes as well as the number of filter modules employed and the flow rate through the filter bags.

Figure 29:
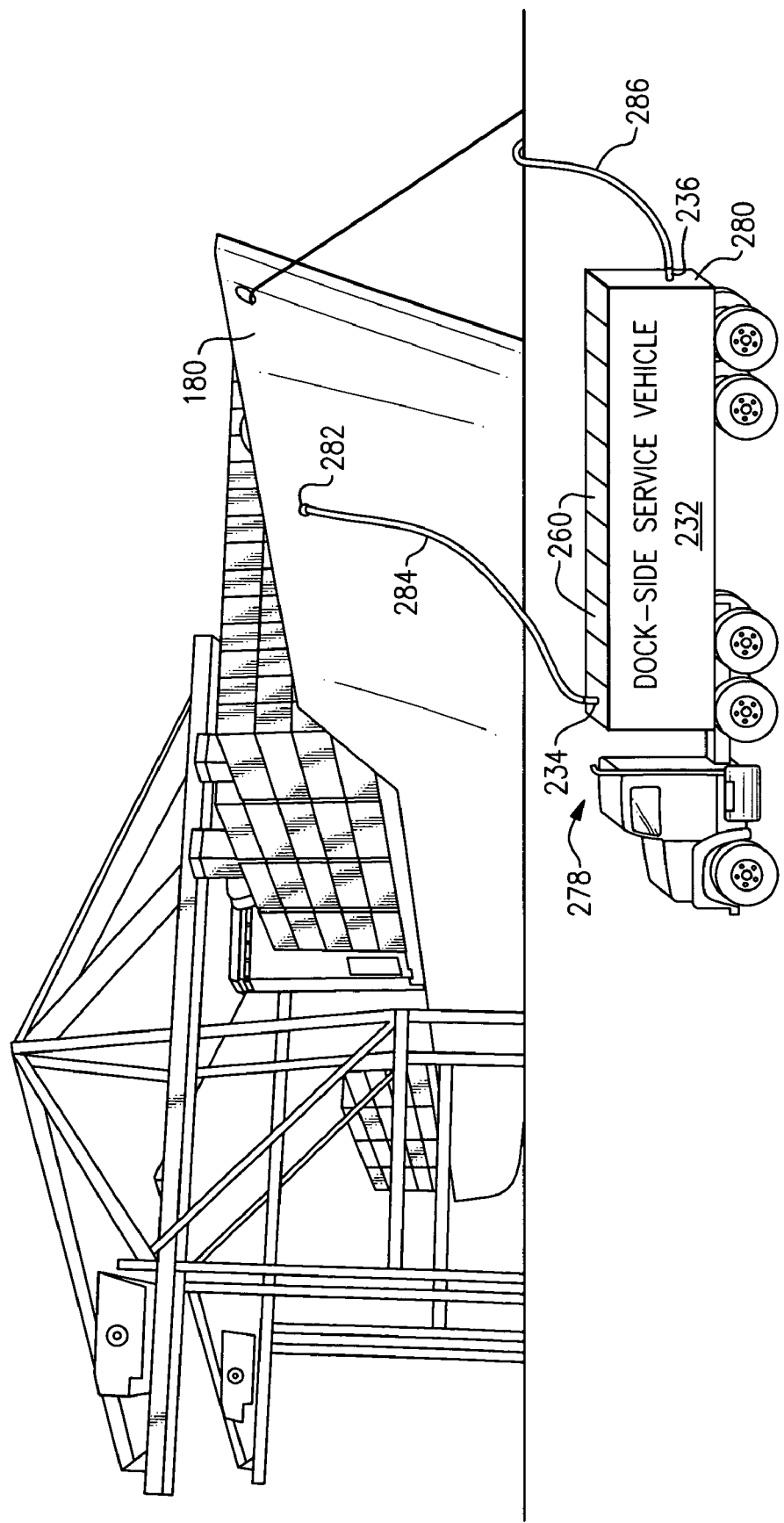
FIG. 29 is a perspective view of a container ship docked port-side for unloading that is being serviced by a dock-side service vehicle according to an alternate ballast water treatment aspect of the present invention utilizing the ballast water discharge port of the ship.

Turning now to use of the filtration system 232 of FIGS. 26-28 in the shipping and marine environment, reference is had next to FIG. 29 which is a perspective view of a container ship 180 docked port-side being serviced by a dock-side service vehicle 278. As illustrated, the service vehicle 278 includes a trailer 280 which is adapted to include the system 232. In this integrated embodiment, the hatch covers 260 are implemented in the top of the trailer 280 as shown. The trailer 280 is also adapted to include the inlet port 234 of the system 232 in the top of the trailer 280 and the discharge port 236 of the system 232 in the side of the trailer 280 at an appropriate height level given the gravity-feed aspects of this particular embodiment. As further illustrated, the inlet port 234 is connected to a ballast water discharge port 282 in the ship 180 by a supply or discharge hose 284, and the discharge port 236 of the system 232 is connected to a discharge hose 286 to transfer filtered and UV treated water from the trailer 280 back into the harbor environment. Thus in this manner there is provided an integrated vehicle and ballast water treatment system that does not require any substantial modifications to the ship 180.

Figure 30:
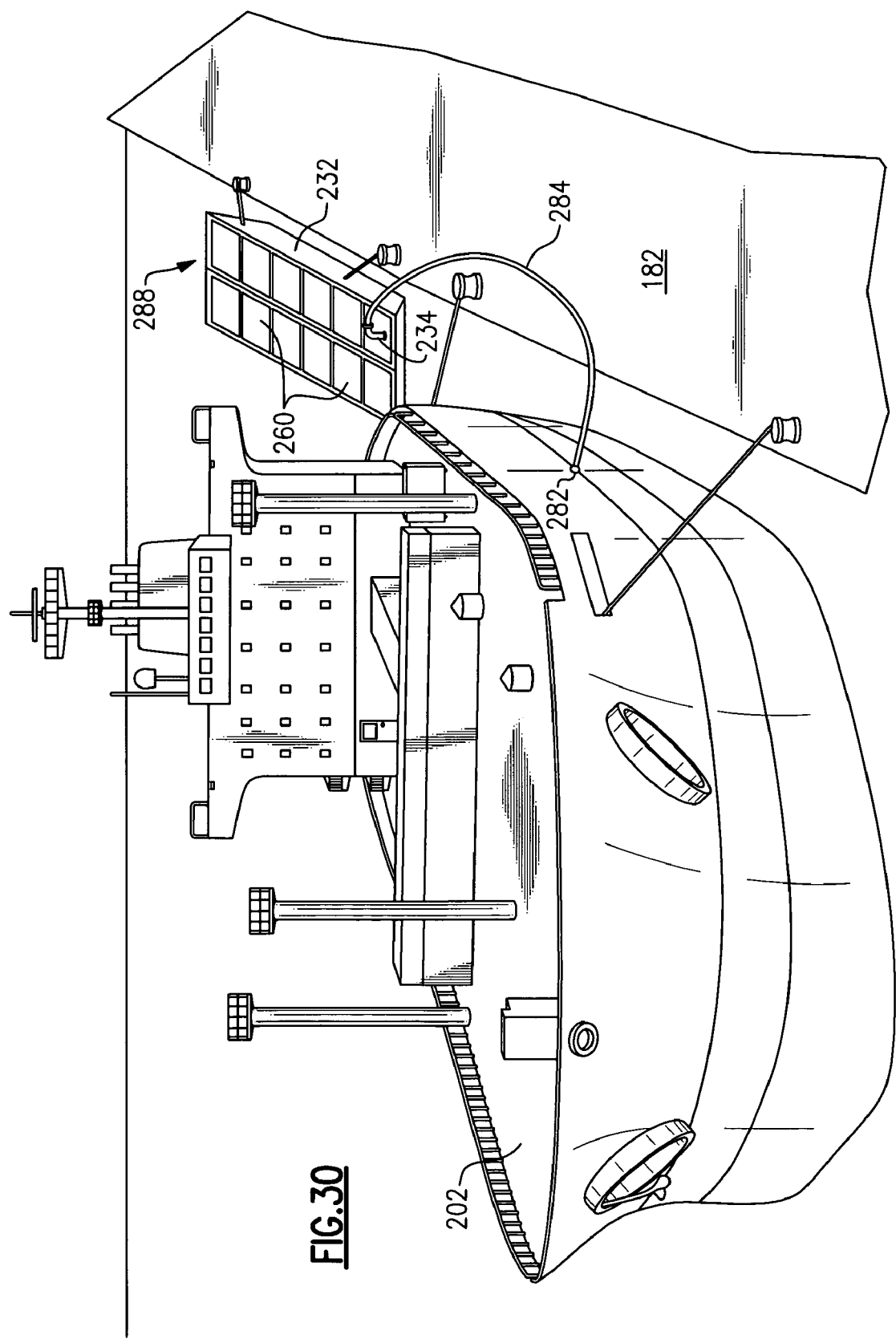
FIG. 30 is a perspective view of a tanker docked port-side for loading or unloading that is being serviced by an in-port service barge according to aspects of the present invention that utilize the ballast water discharge port.

FIG. 30 is a perspective view of a tanker 202 docked at the dock 182 for loading or unloading. The tanker 202 is being serviced by an in-port service barge 288 according to additional aspects of the present invention that utilize the ballast water discharge port 282. Here in FIG. 30, in similar fashion to the container ship 180 of FIG. 29, the discharge port 282 of the tanker 202 is connected to the supply hose 284 which in turn is connected to the inlet port 234 of the system 232 as configured to reside in the service barge 288. The service barge 288 preferably includes a discharge port 236 (not shown here) for the system 232 so that filtered and UV treated ballast water from the ship may be discharged back into the marine environment. However in this barge configuration, the various tanks of the system 232 may be made large enough such that filtration and UV treatment need not be performed in a continuous real-time manner but, for example, unfiltered water, filtered water, or otherwise partially treated water may be stored in the barge 288 for further processing at a later time such as after the tanker 202 has left port. Thus in this manner, several ships may be serviced before any discharge of any fully treat ballast water becomes necessary.

Figure 31A:
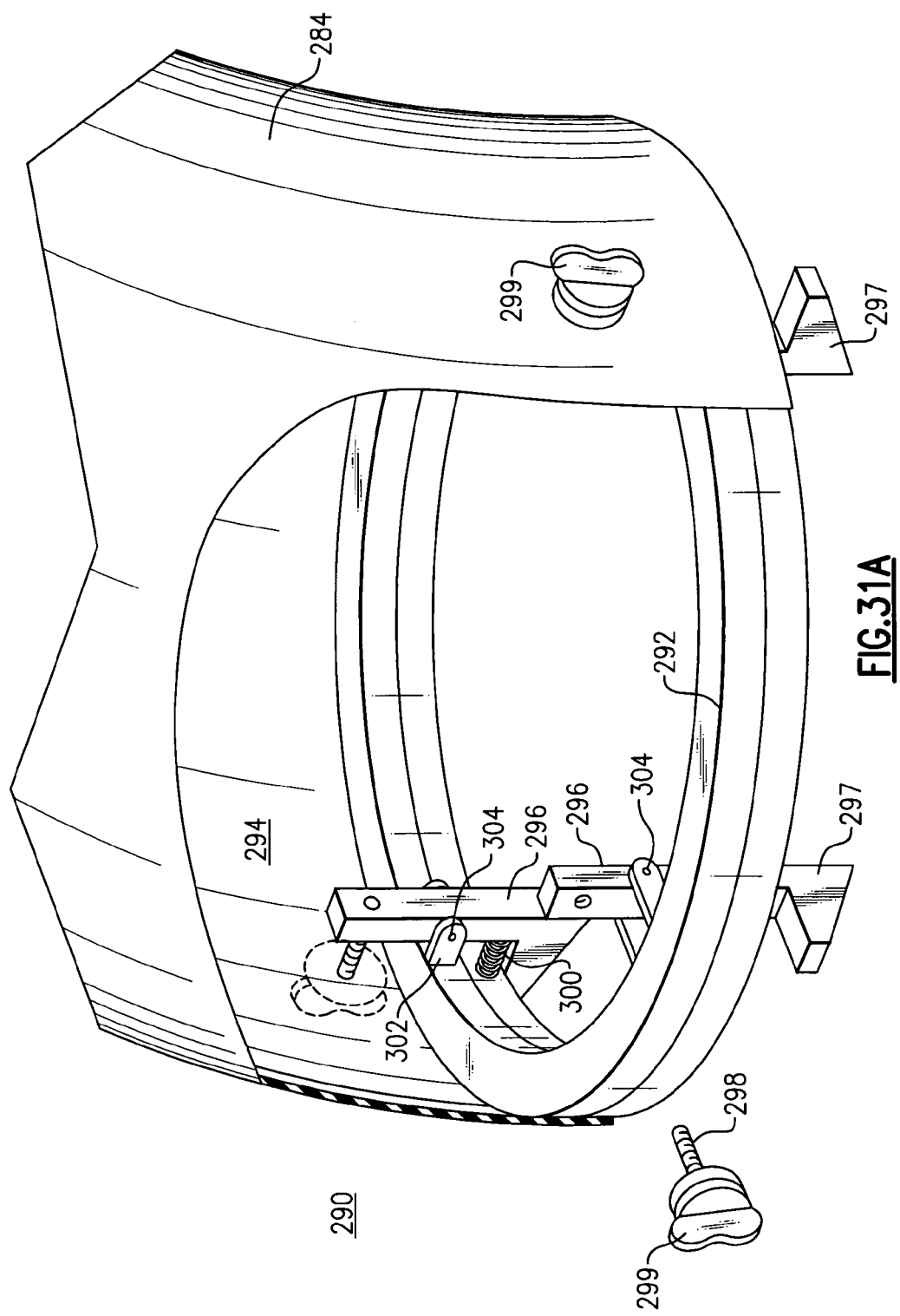
FIG. 31A is a perspective view of a connector ring assembly according to one aspect of the present invention employed to couple a discharge hose to the ballast water discharge port of a ship.

With reference next to FIG. 31A, there is shown a perspective view of a connector ring assembly 290 according to one aspect of the present invention employed to couple the supply hose 284 to the ballast water discharge port of a ship. The connector ring assembly 290 includes a main ring member 292 that is provided with a plurality of hook assemblies 294 distributed around the main ring member 292. Each hook assembly 294 includes a hook arm 296 with a hook head 297, a fastening bolt 298 with a wing nut head 299, a return spring 300, and a rocker arm 302 and a hinge pin 304. As illustrated, the rocker arm 302 is secured to the main ring member 292 at one end and operatively engaged with the hook arm 296 by use of the hinge pin 304. Additional aspects hereof will be described in further detail below with regard to FIGS. 32A-32D and 33.

Figure 31B:
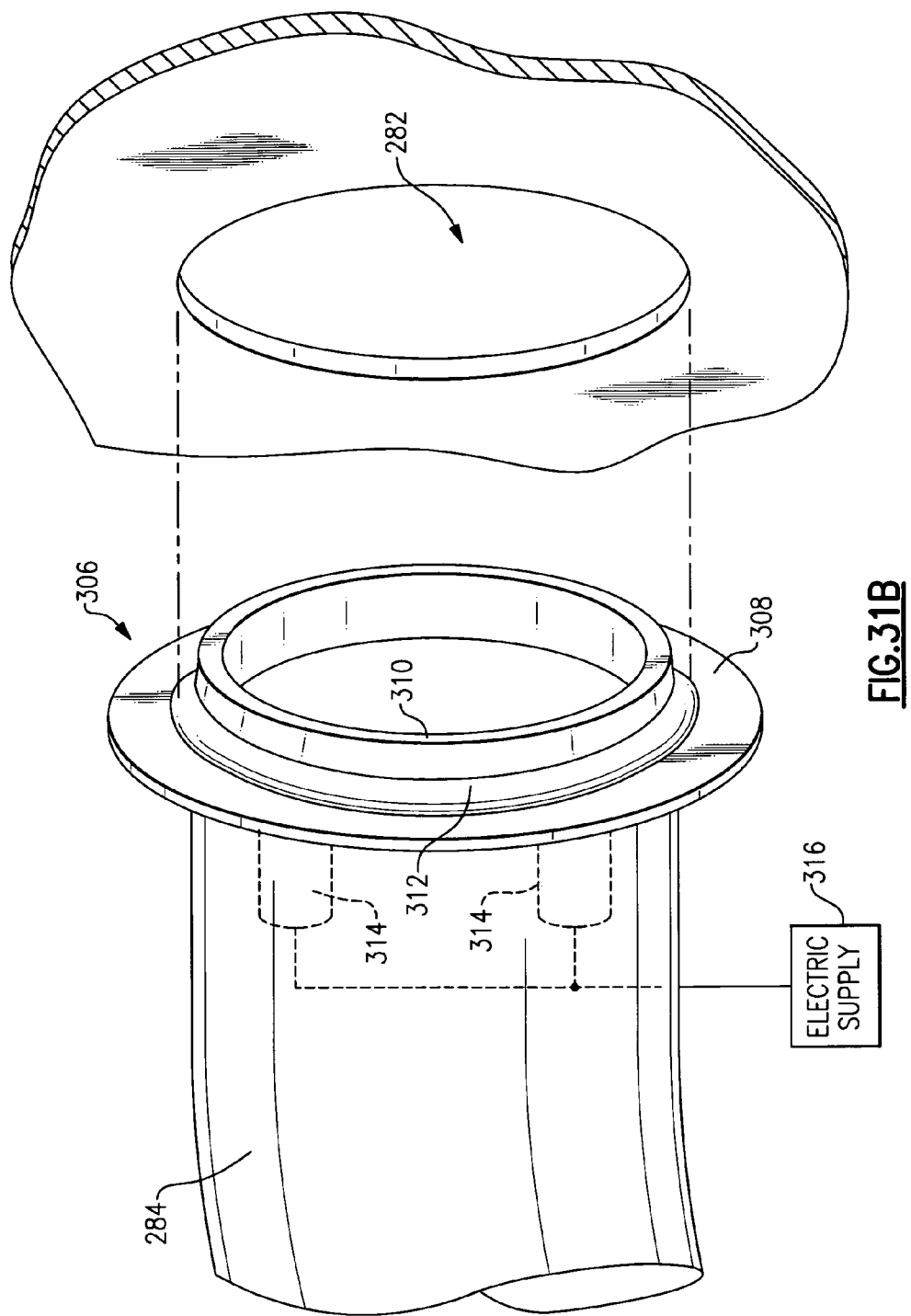
FIG. 31B is a perspective view of an alternate connector ring assembly according to the present invention employed to couple the discharge hose to the ballast water discharge port of a ship.

FIG. 31B is a perspective view of an alternate connector ring assembly 306 coupled to the discharge supply hose 284 for mating to the ballast water discharge port 282 of a ship. In this embodiment, the connector ring assembly 306 includes a flange member 308 and an extending nipple member or connector 310. Positioned adjacent the flange member 308 and the nipple connector 310 is a rubber O-ring. This embodiment of the connector ring assembly 306 further includes electromagnets 314 which are operatively connected to a suitable electric supply 316. In this manner, the nipple member 310 of the connector ring assembly 306 may be inserted into the ballast water discharge port 282 in the ship and the electromagnets activated to cause an attracting magnetic force between the assembly ring and the ship's hull to thereby compress the rubber O-ring 312 against the side of the ship adjacent the discharge port 282 to thereby further cause a water tight seal between the assembly and the discharge port of the ship. In an alternate embodiment hereof, the electromagnets are not included and the water-tight seal is achieved by maintaining mechanical presser on the ring assembly while inserted into the discharge port 282. Additional aspects hereof will be described in further detail below with regard to FIG. 38.

Figure 32A:
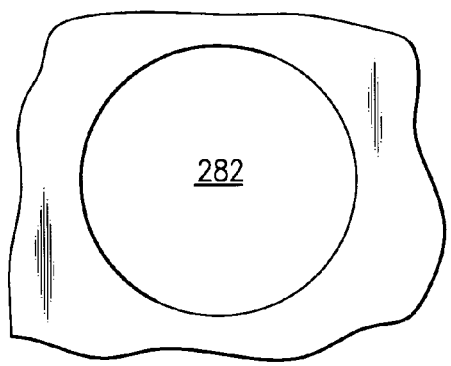
FIG. 32A is a cut-away side elevation view of a typical ballast water discharge port.
Figure 32B:
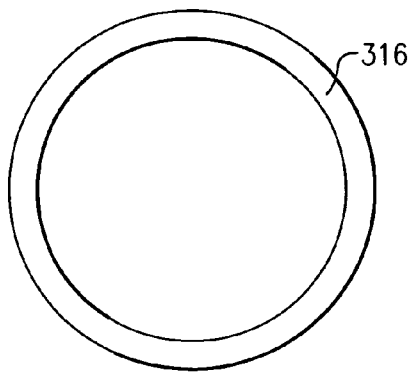
FIG. 32B is a plan view of an annular insert or retainer ring used to retro-fit the typical ballast water discharge port according to one aspect of the present invention.
Figure 32C:
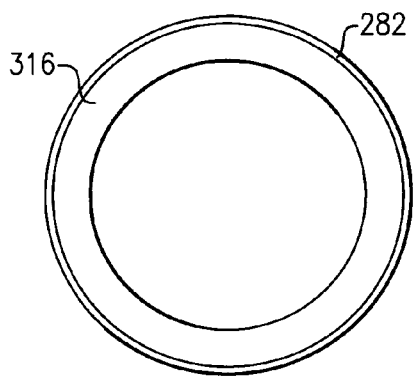
FIG. 32C is a cut-away side elevation view of a ballast water discharge port after the annular insert ring of FIG. 32B has been welded therein according to certain aspects of this invention.
Figure 32D:
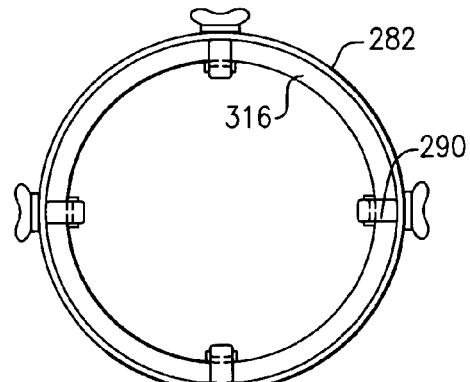
FIG. 32D is cut-away side elevation view of the ballast water discharge port of FIG. 32C including the connector ring assembly of FIG. 31A.

FIGS. 32A to 32D relate to retro-fitting a ship so that it is made compatible with certain aspects of the present invention and methods associated therewith. This retro-fit is simple and inexpensive and thus should be easily implemented by ship owners. Thus FIG. 32A is presented as an isolated cut-away side elevation view of a typical ballast water discharge port 282 before being retro-fitted according to this aspect of the present invention. FIG. 32B shows a plan view of a flat annular insert or retainer ring 316 used to retro-fit the typical ballast water discharge port 282 according hereto. Now so that the ship is rendered compatible with the connector ring assembly 290 shown FIG. 31A, the flat annular ring 316 of FIG. 32B is sized to fit into the discharge port 282 and welded therein as shown in FIG. 32C. Thus in this manner the connector ring assembly 290 shown FIG. 31A may operatively connect with the discharge port 282 as represented in FIG. 32D.

Figure 33:
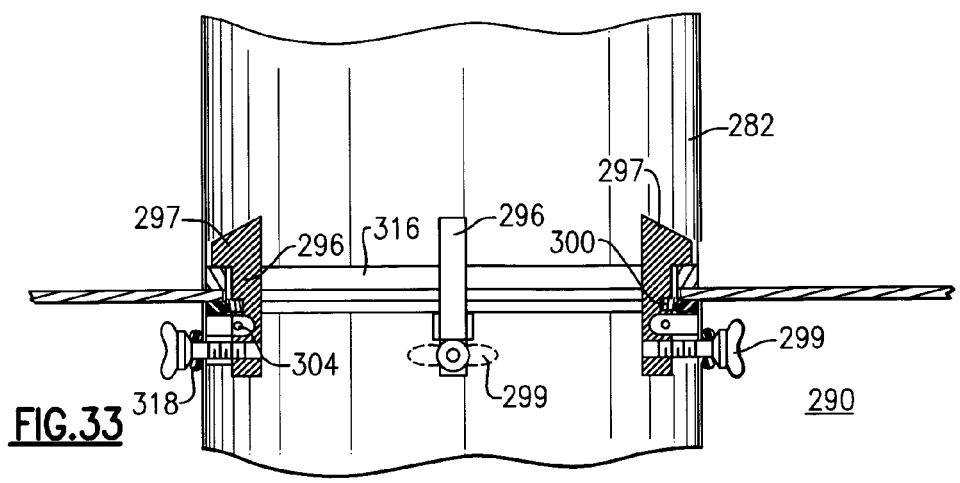
FIG. 33 is a cut-away section view of the connector ring assembly of FIG. 31A shown locked into position in the discharge port of a ship to illustrate certain detail mechanical aspects thereof.

More particularly now with reference to FIG. 33, there is shown a cut-away section view of the connector ring assembly 290 locked into position in the discharge port 282 of a ship to illustrate certain detail mechanical aspects thereof. As shown, when the wing nut heads 299 are tightened down, the hook heads 297 will engage the annular ring 316 and provide a water-tight fit between the supply hose 284 and the ship's discharge port 282 so that the ship's ballast water may be directed to the filtering and treatment apparatus according to other aspects of this invention. When the discharge of ballast water is complete, the wing nut heads may be loosened and the springs 300 will then push the hook heads 297 away from the annular retainer ring 316 by having the hook arms 296 pivot about the hinge pins 304. In this manner, the supply hose 284 including the connector ring assembly 290 may be quickly and easily removed from the ship's ballast water discharge port 282.

Figure 34:
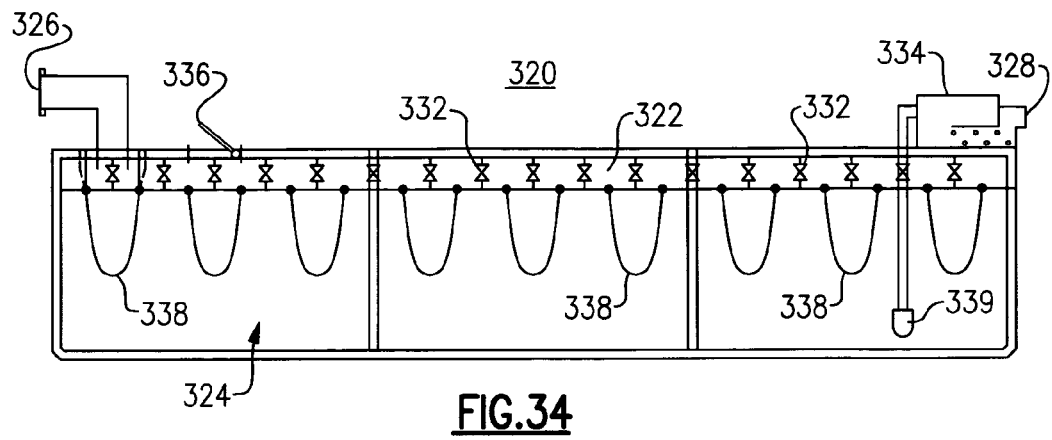
FIG. 34 is a side elevation schematic view of an alternate large volume through-put ballast water treatment system employing several filter modules and UV irradiation according to additional embodiments of the present invention.

Next with reference to FIG. 34, there is illustrated a side elevation schematic view of an alternate large volume through-put treatment system 320 employing several filter modules and multiple UV irradiation units according to additional embodiments of the present invention. The ballast water treatment system 320 includes an upper flow chamber 322 and a lower tank chamber 324. This system is similarly provided with an inlet port 326 and at least one discharge port 328. As shown in the top view of FIG. 35, the upper flow chamber 322 is formed of a multitude of individual filter bag compartments 330. In the upper flow chamber, each filter bag compartment is 330 fluidly isolated from all adjacent chambers 330 by use of flow shut-off or cut-off valves 332. The individual filter bag compartments 330 may be clustered into cooperative groups such as, for example, the 3-by-3 groupings illustrated. In this manner, both the upper flow chamber 322 and the lower tank chamber 324, FIG. 34, may be subdivided into cooperative sub-chambers with associated flow valves. The system 320 is further provided with UV irradiation water treatment tanks or units 334 with an inlet 335 that will be described in further detail below with reference to FIG. 37.

Figure 36:
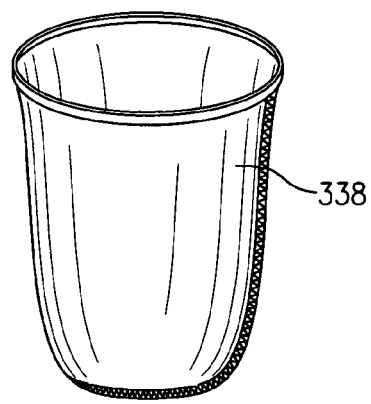
FIG. 36 is a perspective view of a filter bag used in the system of FIG. 34.
Figure 35:
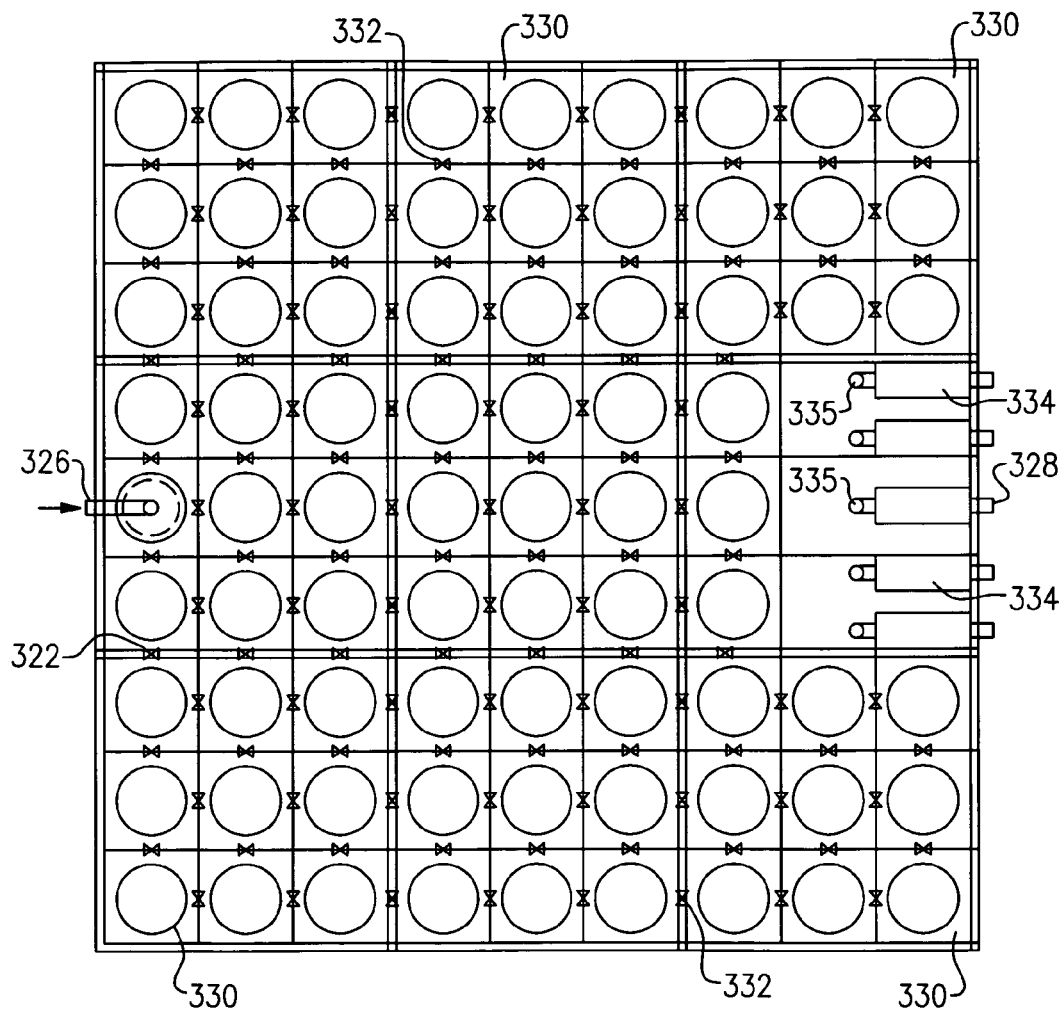
FIG. 35 is a top view of the large volume through-put treatment system of FIG. 34.

Now with continuing reference to both FIGS. 34 and 35, the shut-off valves 332 may be employed to shut off the flow of ballast water into a respective individual filter bag compartment 330. Each compartment 330 is provided with a hatch cover 336 so that the compartment 330 may be accessed from the top. As shown further, each compartment 330 includes a filter bag 338 illustrated in perspective view in FIG. 36. Thus when an individual bag needs to be changed, the shut-off valves 332 around the respective compartment 330 may be closed, the corresponding hatch 336 opened, and then the bag 338 changed as needed. Thereafter, the shut-off valves 332 are opened and the individual compartment 330 with a new bag is brought back into service. FIG. 35 also shows that each UV treatment unit 334 is associated with a pump 339 positioned in the bottom of the lower tank chamber 324. In this manner, the filtered ballast water collected in the bottom of the tank chamber 324 may be pumped into a respective UV treatment unit 334. In an alternate embodiment hereof, the UV tanks 334 are located below the bottom of the lower tank chamber 324 so that filtered ballast water from the tank chamber 324 may flow by force of gravity into the tank 334 for further UV treatment. Thus in this embodiment, the pump 339 is not required.

As with the first and second filter bags 268 and 270 discussed above, here the filter bag 338 may have any desired manufacture and sizing as needed for the various applications hereof. And similarly here, the filter bag 338 may be preferably formed of material having porosity on the order of microns and more preferably in the range of 10 to 200 microns. It is desired that the filter bags 338 filter out various biological material including plankton and in particular zooplankton which has an average size of 50 microns. Thus in one preferred embodiment, the filter bags 338 are also made from material capable of filtering participles of about 25 microns or larger.

Figure 37:
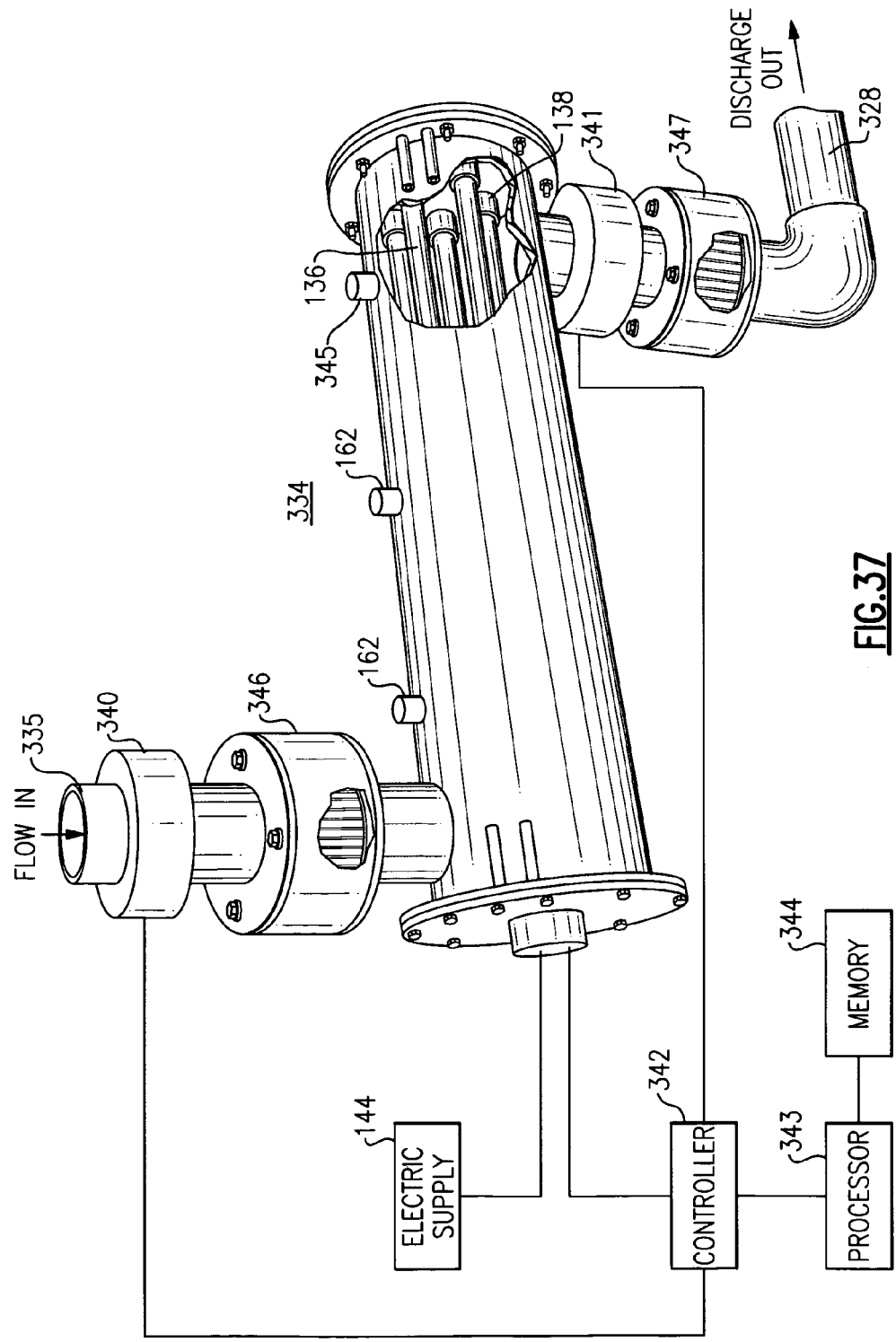
FIG. 37 is an enlarged detailed perspective view and block diagram of a UV irradiation water treatment tank system and related piping as utilized in conjunction with various embodiments of the present invention.

FIG. 37 is an enlarged detailed perspective view including a cut-away detail of the UV treatment tank or unit 334 and related piping. FIG. 37 also includes in block diagram form various electronic components of the present UV lamp system. This UV lamp system may be readily adapted to perform with any of the filtration systems disclosed herein and for purposes of illustrating its functionally and principal components by way of example application, this system will be described as implemented with the filtration system of FIG. 34. Thus proceeding, the inlet 335 to the unit 334 is connected to the pump 339 or gravity-feed discharge, FIG. 34, and the outlet or discharge port 328 may be directed into the marine environment by hose connection. Alternatively all the discharge ports 328 from each of the UV units 334 any be ganged together by use of suitable piping to form only one downstream discharge port 328 which may in turn be connected to a single discharge hose. The UV unit 334 includes UV lamps 136 electrically connected to the lamp sockets 138, and the power supply 144 to supply electric current to the lamps 136 and associated electronic circuits. In some embodiments, the heat sensors 162 may be employed as described above. The UV lamps 136 here are employed generally in the various embodiments hereof as described above and may further advantageously include the wiper cleaning system shown in FIGS. 22 to 25. As further illustrated in the particular exemplary embodiment FIG. 37, the inlet 335 is provided with an electronically activated inlet control valve 340 and the discharge 328 is similarly provided with a discharge control valve 341. As illustrated, the UV unit 334 is operatively connected electronically to a controller 342, a processor 343, and a memory 344. The unit 344 is further provided with a pressure sensor 345 to sense the water pressure within the tank and as also illustrated, the unit 334 includes an in-line inlet filter 346 and an in-line discharge filter 347. These filters may have any desired manufacture and sizing as desired or needed for the applications hereof. Each of the filters 346 and 347 may preferably be formed of material having porosity on the order of microns and more preferably in the range of 10 to 200 microns. In one preferred embodiment, the filters include material designed to filter out particles of about 25 microns or larger.

As enabled with the controller 342, the processor 343, and the memory 344, the unit 334 may be programmed in any manner needed or desired for various and particular applications. Such functionalities and applications include, for example, opening and closing the inlet and discharge valves 340 and 341 to either prevent ballast water from entering when inlet valve 340 is closed, filling the tank 334 with water when inlet valve 340 is open and discharge valve 341 is closed so that, for example, water contained in the unit may be heated by the lamps 136, or allowing flow through the unit when both valves 340 and 341 are open. The valves 340 and 341 may also be controlled to stop water flow so that the filters 346 and 347 may be changed as needed. The processor 343 and controller 342 are also operatively connected with the lamps 136 to turn them on and off, for example, and record their usage of time. Thus the memory 344 is provided, for example, to maintain a record of hours of service for each lamp. The memory 344 may also store a record of lamp changes and other system data as needed or desired of the various applications hereof. The UV lamps 136 here are also further implemented according to the methods described below in FIGS. 40 and 41.

Figure 38:
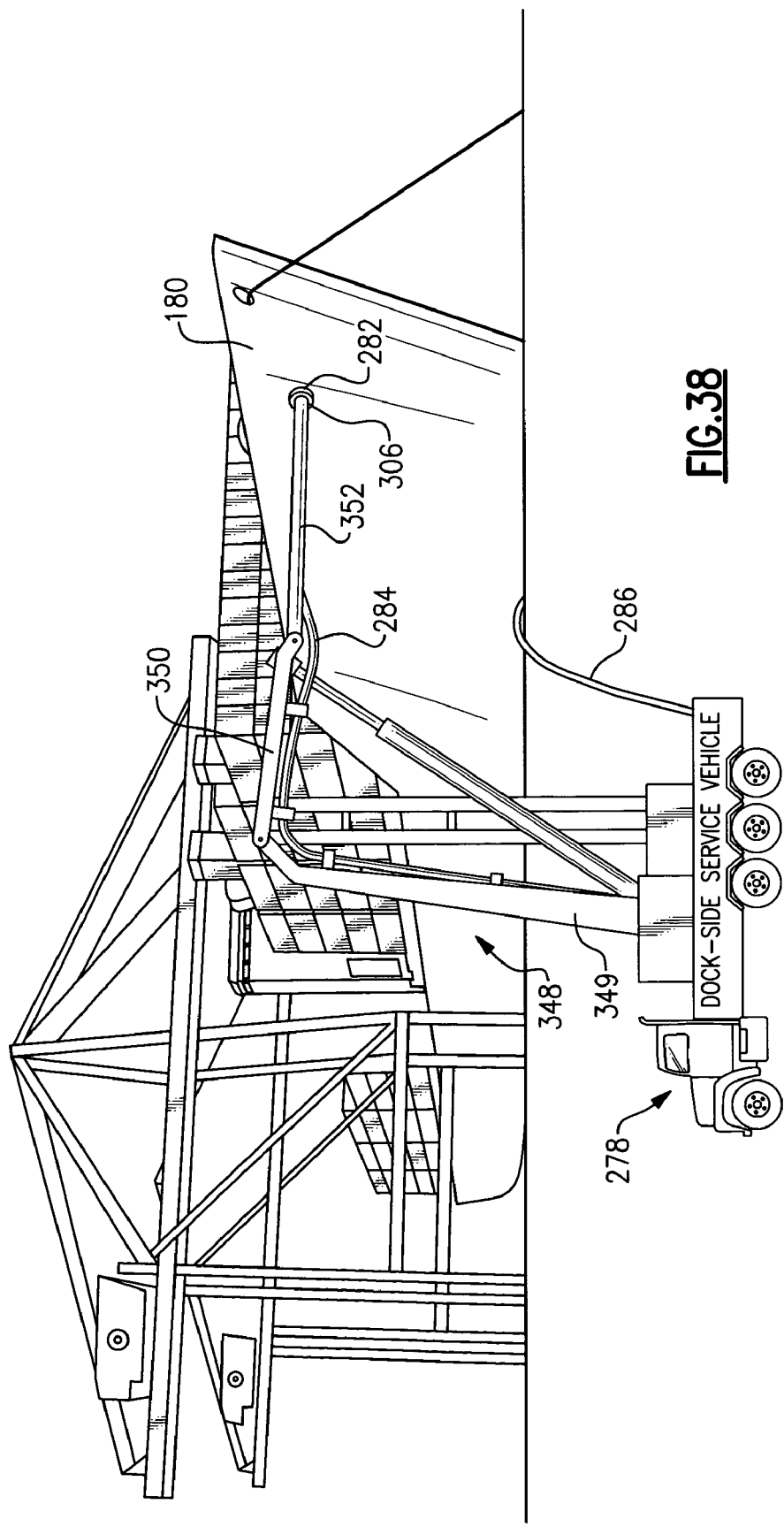
FIG. 38 is a perspective view of the container ship and dock-side service vehicle of FIG. 29 further illustrating use of an articulating arm for positioning and maintaining the discharge hose in cooperative engagement with the ship.

FIG. 38 is a perspective view of the container ship 180 and an alternate embodiment of the dock-side service vehicle 278 of FIG. 29 further illustrating use of an articulating arm 348 for positioning and maintaining the supply hose 284 in cooperative engagement with the ballast water discharge port 282 of the ship 180. This service vehicle 278 may utilize either the system 232 described in reference to FIG. 26 or the alternate system 320 of FIGS. 34 and 35. In this particular embodiment, the articulating arm 348 includes three segments. These segments include a base segment 349, an extension segment 350, and an end segment 352. The end segment 352 is formed from rigid pipe. Here in this embodiment of the service vehicle 278, the flexible supply hose 284 is connected into the rigid pipe forming the end segment 352 and the distal end thereof is outfitted with the connector ring assembly 306 of FIG. 31B. The connector ring assembly 306 as implemented here may not require the electro-magnets 314, FIG. 31B, since the articulating arm 348 may be employed to provide sufficient presser on the ring assembly 306 against the side of the ship's hull to thereby provide the desired water-tight seal between the assembly and ship. Alternatively, the electro-magnets 314 may be readily employed here when desired and their needed electric supply may be supplied and controlled from the vehicle 278. Once the connector ring assembly 306 is engaged with the ship's ballast water discharge port 282, any of the filtration and treatment process described above may begin. This includes utilizing either the system 232 described in reference to FIG. 26 or the alternate system 320 of FIGS. 34 and 35.

Figure 39:
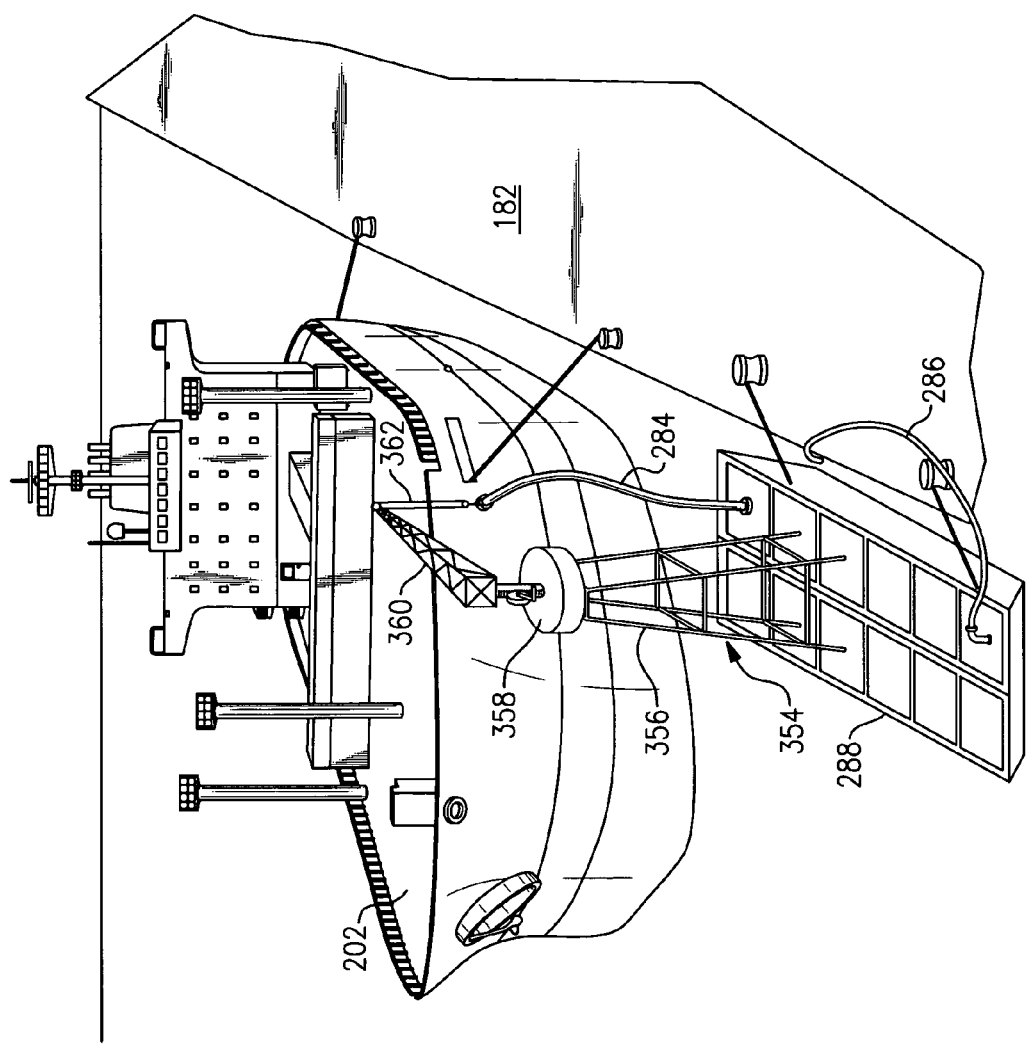
FIG. 39 is a perspective view of the tanker and in-port service barge of FIG. 30 further illustrating use of a hoisting derrick system for positioning and maintaining the discharge hose in cooperative engagement with the ship.

With reference next to FIG. 39, there is shown a perspective view of the tanker 202 and an augmented embodiment of the in-port service barge 288 of FIG. 30 further illustrating use of a hoisting derrick system 354 for positioning and maintaining the supply hose 284 in cooperative engagement with the ship 202. The hoisting derrick system 354 includes a tower member 356, and operator's platform 358, and a crane type boom arm 360. In this embodiment, the distal end of the boom arm 360 is outfitted with block and tackle rigging 362 so that an operator positioned on the platform 358, the ship's deck, or the dock 182 may easily hoist the end of the supply hose 284 up to the ballast water discharge port of the ship. As with the service vehicle 278 described above in connection with FIG.

38, the in-port service barge 288 here may utilize either the filtration and treatment system 232 described in reference to FIG. 26 or the alternate system 320 of FIGS. 34 and 35. The supply hose 284 may preferably here include either of the connector ring assemblies 290 of FIG. 31A or 306 of FIG. 31B.

Figure 40:
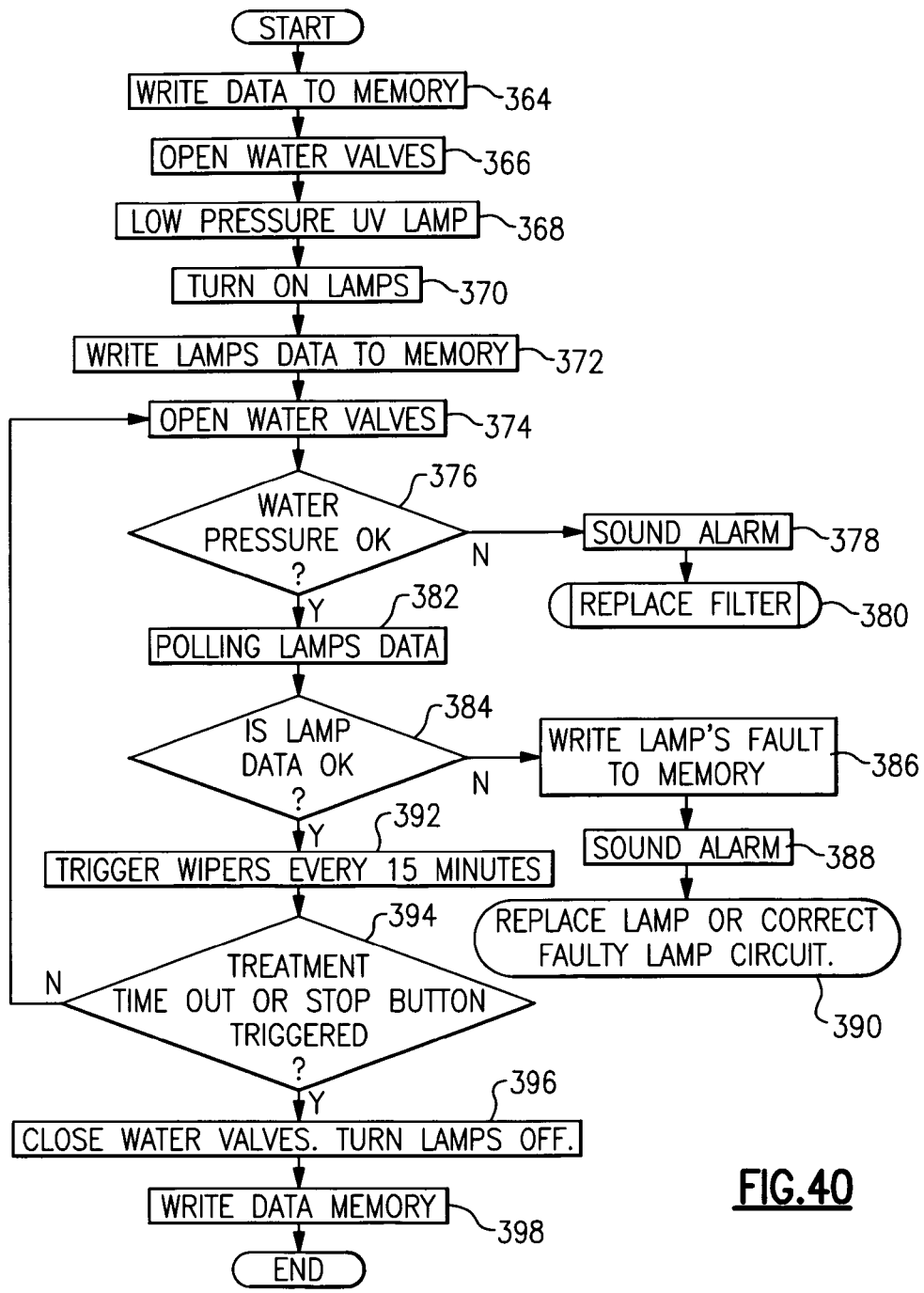
FIG. 40 is a logic flow chart illustrating one method according to the present invention for as employed with low pressure UV lamps.

Now continuing with reference to FIG. 40, there is shown a logic flow chart illustrating one method according to the present invention as employed with low pressure UV lamps. This method includes some steps performed by the electronic components shown in FIG. 37 and thus the following method is presented with reference to both FIGS. 37 and 40. The method begins with the step 364 where data is written to the memory 344. This data may include date, time, and any other desired information. At step 366 both water valves 340 and 341 are opened. Next at step 366, the system verifies that low pressure UV lamps are being used. Then at step 370 the lamps 136 are turned on, and again at step 372 lamp data are written to the memory 344. At step 374, the system runs a self check to insure the valves remain open. At the next step 376 a continuous check of the tank water pressure is performed by use of the pressure sensor 345. If the pressure increases above or decreases below pre-determined thresholds then the method proceeds to step 378 where an alarm is sounded and an indication to check and change either or both of the filters 346 and 347 is provided at step 380. As long as the tank pressure is maintained within operating parameters, the system proceeds to step 382 where the lamps are polled and data is updated to memory 344. As indicated at step 384, lamp status is also continuously monitored. If the lamp status becomes negative, the method proceeds to step 386 where the memory 344 is updated, then at step 388 the alarm is sounded, and lastly at step 390 the lamp is replaced or the system is otherwise checked as needed. As long as the lamps 136 are operating properly, the system proceeds to step 392 where the lamps are wiped clean by the wiper system discussed in regard to FIGS. 22-25. During normal operation the water flow may be timed out or otherwise the flow stops when the full amount of water is treated as needed. Thus at step 394 the system inquires whether there has been a timeout or the process is completed for the current session. If the session is to continue, the method proceeds back to step 374 to keep the valves open and continue with water flow and treatment. On the other hand, if there is a timeout or the system is stopped, the method proceeds to step 396 where the valves 340 and 341 are closed and the lamps 136 are turned off. Then next at step 398 the memory 344 is updated and the session ends.

Figure 41:
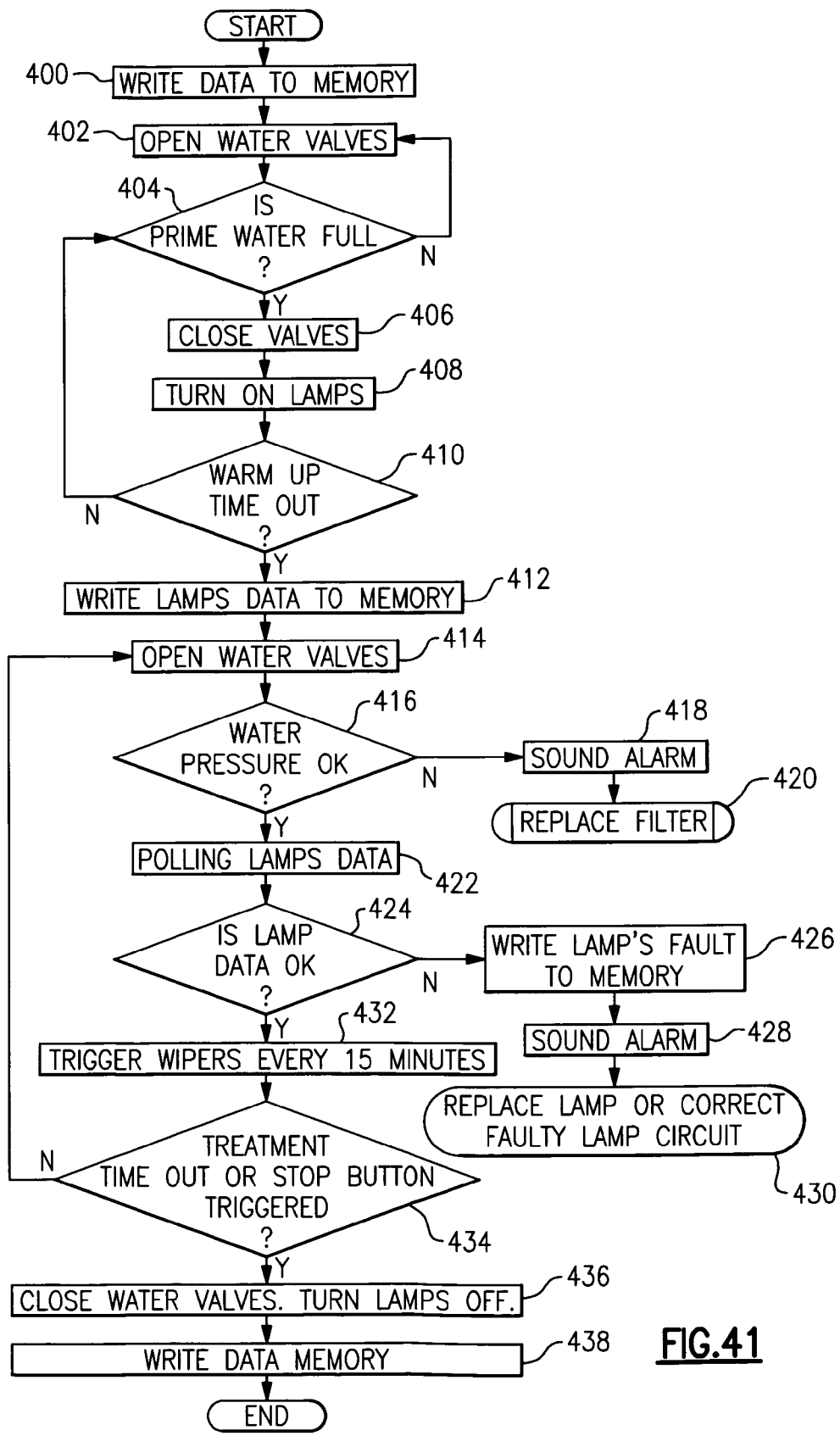
FIG. 41 is another logic flow chart illustrating one method according to the present invention for as employed with medium pressure UV lamps.

FIG. 41 is another logic flow chart illustrating one method according to the present invention as employed with medium pressure UV lamps. As with the method above, this method includes some steps performed by the electronic components shown in FIG. 37 and thus the following method is presented with reference to both FIGS. 37 and 41. The method begins with the step 400 where data is written to the memory 344. This data may include date, time, and any other desired information. At step 402 water valve 340 is opened. Next at step 404, the system determines whether the tank 334 is full of water. If not, then valve 340 remains open. When the tank is full, the system proceeds to step 406 where both valves are close. Thus here at step 406 the tank is full and water flow has stopped. Then at step 408 the lamps 136 are turned on, and at step 410 the lamps are allowed to warm up. If the lamps do not warm as intended the system proceeds back to step 404 as indicated. When the lamps reach operating temperature, the method proceeds to step 412 and lamp data is written to the memory 344. At step 414, both valves are opened to allow flow full through after the lamps have warmed to operating temperature. At the next step 416 a continuous check of the tank water pressure is performed by use of the pressure sensor 345. If the pressure increases above or decreases below pre-determined thresholds then the method proceeds to step 418 where an alarm is sounded and an indication to check and change either or both of the filters 346 and 347 is provided at step 420. As long as the tank pressure is maintained within operating parameters, the system proceeds to step 422 where the lamps are polled and data is updated to memory 344. As indicated next at step 424, lamp status is also continuously monitored. If the lamp status becomes negative, the method proceeds to step 426 where the memory 344 is updated, then at step 428 the alarm is sounded, and lastly at step 430 the lamp is replaced or the system is otherwise checked as needed. As long as the lamps 136 are operating properly, the system proceeds to step 432 where the lamps are wiped clean by the wiper system discussed in regard to FIGS. 22-25. During normal operation the water flow may be timed out or otherwise the flow stops when the full amount of water is treated as needed. Thus at step 434 the system inquires whether there has been a timeout or the process is completed for the current session. If the session is to continue, the method proceeds back to step 414 to keep the valves open and continue with water flow and treatment. On the other hand, if there is a timeout or the system is stopped, the method proceeds to step 436 where the valves 340 and 341 are closed and the lamps 136 are turned off. Then next at step 438 the memory 344 is updated and the session ends.

While this invention has been described in detail with reference to certain and various preferred embodiments along with aspects, functionalities, and characteristics thereof, it should be appreciated that the present invention is not limited to those precise embodiments. Rather, in view of the present disclosure which describes the current best mode for practicing the invention, many modifications and variations would present themselves to those of skill in the art without departing from the scope and spirit of this invention. The scope of the invention is, therefore, indicated by the following claims rather than by the foregoing description. All changes, modifications, and variations coming within the meaning and range of equivalency of the claims are to be considered within their scope.

What is claimed is:

1. An in-port service barge for treating discharged ballast water from a ship, said barge comprising:
   a ballast water treatment apparatus on board said service barge, said apparatus including an inlet port, a discharge port, means for filtering ballast water, and means for directing UV energy at said ballast water; and
   a hoisting system for positioning a supply hose between a ballast water discharge port of the ship and said inlet port of said ballast water treatment apparatus.

2. A dock-side service vehicle for treating discharged ballast water from a ship in port, said vehicle comprising:
   a water treatment processing platform accessible to a respective ship docked in port;
   a housing tank positioned within said water treatment processing platform, said housing tank having at least one inlet port and one discharge port, said at least one inlet port being adapted to receive ballast water from a ballast discharge port of said respective ship by connecting a hose between the ballast discharge port on said respective ship and said at least one inlet port of said housing tank;

a filter positioned within said housing tank, said filter employed to filter particulate matter from said ballast water received from said respective ship's ballast discharge port;

a source of electromagnetic radiation maintained within said housing tank for irradiating said ballast water to thereby deactivate biological organisms contained therein; and an articulating arm for positioning a respective connection hose between the ballast discharge port on said respective ship and said at least one inlet port of said housing tank.

3. A ballast water filtration and treatment system, said system comprising:

an inlet reservoir having an inlet port;

a main tank member fluidly connected to said inlet reservoir, said main tank member having filter means positioned in an upper portion thereof;

a side channel tank in fluid communication with said main tank member;

a side fill tank in fluid communication with said side channel tank; and a UV containment chamber in fluid communication with said side fill tank, said UV containment chamber including a source of UV light directed into filtered ballast water contained in the chamber.

4. A ballast water filtration and treatment system, said system comprising;

an upper flow chamber for receiving ballast water and including a plurality of filter bag compartments, each filter bag compartment including valve means to fluidly isolate a respective filter bag compartment from ballast water maintained within said upper flow chamber;

a filter bag associated with each of said of filter bag compartments;

a lower tank chamber in fluid communication with said upper flow chamber, each of said filter bags depending downwardly from a respective filter bag compartment into said lower tank chamber; and at least one UV tank fluidly connected to said lower tank chamber implemented so that ballast water filtered through said filter bags is directed into said least one UV tank for further treatment.

5. The system according to claim 4 wherein said at least one UV tank fluidly is positioned below said lower tank chamber so that filtered ballast in said lower tank chamber is moved by gravity to flow from said lower tank chamber into said at least one UV tank.

6. The system according to claim 4 further including a pump to move filtered ballast in said lower tank chamber into said at least one UV tank.

7. The in-port service barge according to claim 1 wherein said means for filtering ballast water includes at least one filter bag.

8. The in-port service barge according to claim 1 wherein said means for filtering ballast water includes a plurality of filter bags each being associated with a filter bag module.

9. The in-port service barge according to claim 8 wherein each filter bag includes a first filter bag positioned within a second filter bag so that said first filter bag may be removed and changed while said second filter bag continues to filter ballast water.

10. The in-port service barge according to claim 8 wherein each filter bag module includes a valve for controlling water flow.

11. The in-port service barge according to claim 10 wherein said valve is enabled to discontinue water flow into its respective filter bag module so that said filter bag may be changed while other filter bag modules continue to process ballast water.

12. The dock-side service vehicle according to claim 2 wherein said filter is comprised of at least one filter bag positioned within a corresponding filter bag module.

13. The dock-side service vehicle according to claim 12 wherein each of said at least one filter bags includes a first filter bag positioned within a second filter bag so that said first filter bag may be removed and changed while said second filter bag continues to filter ballast water.

14. The dock-side service vehicle according to claim 12 wherein said filter bag module includes a valve for controlling water flow.

15. The dock-side service vehicle according to claim 14 wherein said valve is enabled to discontinue water flow into its respective filter bag module so that said filter bag may be changed while any other available filter bag modules continue to process ballast water.

16. The ballast water filtration and treatment system according to claim 3 wherein said filter means includes at least one filter bag positioned within a corresponding filter bag module.

17. The ballast water filtration and treatment system according to claim 16 wherein each of said at least one filter bags includes a first filter bag positioned within a second filter bag so that said first filter bag may be removed and changed while said second filter bag continues to filter ballast water.

18. The ballast water filtration and treatment system according to claim 16 wherein said filter bag module includes a valve for controlling water flow.

19. The ballast water filtration and treatment system according to claim 18 wherein said valve is enabled to discontinue water flow into its respective filter bag module so that said filter bag may be changed while any other available filter bag modules continue to process ballast water.

20. The system according to claim 4 wherein said valve means includes a valve enabled to discontinue water flow into its respective filter bag compartment so that said filter bag associated therewith may be changed while any other available filter bag compartments continue to process ballast water.

21. The system according to claim 4 wherein each filter bag includes a first filter bag positioned within a second filter bag so that said first filter bag may be removed and changed while said second filter bag continues to filter ballast water.

22. An in-port service barge for treating discharged ballast water from a ship, said barge comprising:

a ballast water treatment apparatus on board said service barge, said apparatus including an inlet port, a discharge port, at least one filter for filtering ballast water, and an energy source for directing electromagnetic energy at said ballast water; and a hoisting system for positioning a supply hose between a ballast water discharge port of the ship and said inlet port of said ballast water treatment apparatus.

23. The in-port service barge according to claim 22 wherein said energy source for directing electromagnetic energy includes a UV light source.

24. The in-port service barge according to claim 22 wherein said at least one filter for filtering ballast water includes a filter bag.

25. The in-port service barge according to claim 24 wherein said filter bag includes a first filter bag positioned within a second filter bag so that said first filter bag may be removed and changed while said second filter bag continues to filter ballast water.

26. The in-port service barge according to claim 22 wherein said at least one filter for filtering ballast water includes a plurality of filter bags each being associated with a filter bag module.

27. The in-port service barge according to claim 26 wherein each filter bag module includes a valve for controlling water flow.

28. The in-port service barge according to claim 27 wherein said valve is enabled to discontinue water flow into its respective filter bag module so that said filter bag may be changed while other filter bag modules continue to process ballast water.

29. A ballast water filtration and treatment system, said system comprising:
an inlet reservoir having an inlet port;
a main tank member fluidly connected to said inlet reservoir, said main tank member having at least one filter positioned in an upper portion thereof;
a side channel tank in fluid communication with said main tank member;
a side fill tank in fluid communication with said side channel tank; and
a containment chamber in fluid communication with said side fill tank, said containment chamber including a source of electromagnetic energy directed into filtered ballast water contained in the chamber.

30. The ballast water filtration and treatment system according to claim 29 wherein said source of electromagnetic energy includes a UV light source.

31. The ballast water filtration and treatment system according to claim 29 wherein said at least one filter includes a filter bag positioned within a corresponding filter bag module.

32. The ballast water filtration and treatment system according to claim 31 wherein said filter bag includes a first filter bag positioned within a second filter bag so that said first filter bag may be removed and changed while said second filter bag continues to filter ballast water.

33. The ballast water filtration and treatment system according to claim 29 wherein said at least one filter includes a plurality of filter bags each positioned within a corresponding filter bag module.

34. The ballast water filtration and treatment system according to claim 33 wherein each of said filter bag modules includes a valve for controlling water flow.

35. The ballast water filtration and treatment system according to claim 34 wherein said valve is enabled to discontinue water flow into its respective filter bag module so that said filter bag may be changed while any other available filter bag modules continue to process ballast water.

36. A ballast water filtration and treatment system, said system comprising;
an upper flow chamber for receiving ballast water and including a plurality of filter bag compartments, each filter bag compartment including a valve to fluidly isolate a respective filter bag compartment from ballast water maintained within said upper flow chamber;
a filter bag associated with each of said of filter bag compartments;
a lower tank chamber in fluid communication with said upper flow chamber, each of said filter bags depending downwardly from a respective filter bag compartment into said lower tank chamber; and
at least one treatment tank fluidly connected to said lower tank chamber implemented so that ballast water filtered through said filter bags is directed into said at least one treatment tank for further processing.

37. The system according to claim 36 wherein said at least one treatment tank is positioned below said lower tank chamber so that filtered ballast in said lower tank chamber is moved by gravity to flow from said lower tank chamber into said at least one treatment tank.

38. The system according to claim 36 further including a pump to move filtered ballast in said lower tank chamber into said at least one treatment tank.

39. The system according to claim 36 wherein said valve is enabled to discontinue water flow into its respective filter bag compartment so that said filter bag associated therewith may be changed while any other available filter bag compartments continue to process ballast water.

40. The system according to claim 36 wherein each filter bag includes a first filter bag positioned within a second filter bag so that said first filter bag may be removed and changed while said second filter bag continues to filter ballast water.

* * * * *